US007047196B2

(12) United States Patent
Calderone et al.

(10) Patent No.: US 7,047,196 B2
(45) Date of Patent: May 16, 2006

(54) SYSTEM AND METHOD OF VOICE RECOGNITION NEAR A WIRELINE NODE OF A NETWORK SUPPORTING CABLE TELEVISION AND/OR VIDEO DELIVERY

(75) Inventors: Theodore Calderone, San Carlos, CA (US); Paul M. Cook, Woodside, CA (US); Mark J. Foster, Palo Alto, CA (US)

(73) Assignee: AgileTV Corporation, Menlo Park, CA (US)

( * ) Notice: Subject to any disclaimer, the term of this patent is extended or adjusted under 35 U.S.C. 154(b) by 1138 days.

(21) Appl. No.: 09/785,375

(22) Filed: Feb. 16, 2001

(65) Prior Publication Data

US 2001/0056350 A1     Dec. 27, 2001

Related U.S. Application Data

(63) Continuation-in-part of application No. 09/708,315, filed on Nov. 7, 2000, now Pat. No. 6,480,703, and a continuation-in-part of application No. 09/679,115, filed on Oct. 4, 2000, and a continuation-in-part of application No. 09/664,874, filed on Sep. 19, 2000, now abandoned, and a continuation-in-part of application No. 09/661,486, filed on Sep. 14, 2000.

(60) Provisional application No. 60/210,440, filed on Jun. 8, 2000.

(51) Int. Cl.
*G10L 21/00*     (2006.01)
(52) U.S. Cl. .................. 704/270.1; 704/201; 704/231; 715/719; 715/512; 715/726; 709/217
(58) Field of Classification Search ........ 704/270–278, 704/231, 251, 246, 201; 715/719, 512, 513, 715/716, 721, 723, 726, 733; 709/217
See application file for complete search history.

(56) References Cited

U.S. PATENT DOCUMENTS 4,506,387 A     3/1985 Walter ....................... 455/612

FOREIGN PATENT DOCUMENTS

EP     0 782 337     7/1997     .................... 7/173

(Continued)

OTHER PUBLICATIONS

*ACTV Awarded Three Key Digital Television Patents: Coverage Extended to ACTV's Core Technology for Eliminating Video Switching Delay*; May 8, 2001; PRNewswire.

(Continued)

*Primary Examiner*—Vijay Chawan
(74) *Attorney, Agent, or Firm*—Michael A. Glenn; Glenn Patent Group

(57) ABSTRACT

A method and system of speech recognition presented by a back channel from multiple user sites within a network supporting cable television and/or video delivery is disclosed. The preferred embodiment of the invention comprises ans system and method of using a back channel containing a multiplicity of identified speech channels from a multiplicity of user sites presented to a speech processing system at a wireline node in a network that supports at least one of cable television delivery and video delivery. One embodiment of the invention comprises a method having the steps of receiving the back channel to create a received back channel; partitioning the received back channel into a multiplicity of received identified speech channels; processing the multiplicity of received identified speech channels to create a multiplicity of identified speech content; and responding to the identified speech content to create an identified speech content response that is unique, for each of the multiplicity of identified speech contents.

66 Claims, 35 Drawing Sheets

U.S. PATENT DOCUMENTS

| | | | |
|---|---|---|---|
| RE32,012 E | 10/1985 | Pirz et al. | 381/43 |
| 4,633,499 A | 12/1986 | Nishioka et al. | 381/43 |
| 4,653,045 A | 3/1987 | Stanley et al. | 370/62 |
| 4,757,541 A | 7/1988 | Beadles | 381/43 |
| 4,780,906 A | 10/1988 | Rajasekaran et al. | 381/43 |
| 4,783,809 A | 11/1988 | Glinski | 381/43 |
| 4,797,910 A | 1/1989 | Daudelin | 379/67 |
| 4,821,027 A | 4/1989 | Mallory et al. | 340/521 |
| 4,827,520 A | 5/1989 | Zeinstra | 381/43 |
| 4,837,830 A * | 6/1989 | Wrench et al. | 704/238 |
| 4,847,885 A | 7/1989 | Vittorelli | 379/6 |
| 4,907,079 A | 3/1990 | Turner et al. | 358/84 |
| 4,931,950 A | 6/1990 | Isle et al. | 364/513 |
| 4,959,855 A | 9/1990 | Daudelin | 379/213 |
| 4,972,485 A | 11/1990 | Dautrich et al. | 381/43 |
| 4,991,217 A | 2/1991 | Garrett et al. | 381/43 |
| 5,006,987 A | 4/1991 | Harless | 364/419 |
| 5,125,024 A | 6/1992 | Gokcen et al. | 379/88 |
| 5,127,003 A | 6/1992 | Doll, Jr. et al. | 370/110.1 |
| 5,155,760 A | 10/1992 | Johnson et al. | 379/67 |
| 5,163,083 A | 11/1992 | Dowden et al. | 379/88 |
| 5,165,095 A | 11/1992 | Borcherding | 379/88 |
| 5,181,237 A | 1/1993 | Dowden et al. | 379/88 |
| 5,197,005 A | 3/1993 | Shwartz et al. | 364/419 |
| 5,199,062 A | 3/1993 | Von Meister et al. | 379/67 |
| 5,208,848 A | 5/1993 | Pula | 379/67 |
| 5,220,657 A * | 6/1993 | Bly et al. | 711/152 |
| 5,231,670 A | 7/1993 | Goldhor et al. | 381/43 |
| 5,247,347 A | 9/1993 | Litteral et al. | 358/85 |
| 5,255,305 A | 10/1993 | Sattar | 379/34 |
| 5,271,088 A | 12/1993 | Bahler | 395/2 |
| 5,274,560 A | 12/1993 | LaRue | 364/444 |
| 5,325,421 A | 6/1994 | Hou et al. | 379/67 |
| 5,329,608 A | 7/1994 | Bocchieri et al. | 395/2.52 |
| 5,333,237 A | 7/1994 | Stefanopoulos et al. | 395/12 |
| 5,335,276 A | 8/1994 | Thompson et al. | 380/21 |
| 5,345,538 A | 9/1994 | Narayannan et al. | 395/2.84 |
| 5,349,678 A | 9/1994 | Morris et al. | 395/800 |
| 5,353,336 A | 10/1994 | Hou et al. | 379/67 |
| 5,369,575 A | 11/1994 | Lamberti et al. | 364/419.08 |
| 5,386,556 A | 1/1995 | Hedin et al. | 395/600 |
| 5,434,777 A | 7/1995 | Luciw | 364/419.13 |
| 5,442,749 A | 8/1995 | Northcutt et al. | 395/200.09 |
| 5,446,489 A | 8/1995 | Egendorf | 348/3 |
| 5,475,792 A | 12/1995 | Stanford et al. | 395/2.42 |
| 5,500,920 A | 3/1996 | Kupiec | 395/2.79 |
| 5,513,298 A | 4/1996 | Stanford et al. | 395/2.52 |
| 5,519,608 A | 5/1996 | Kupiec | 364/419.08 |
| 5,526,034 A | 6/1996 | Hoarty et al. | 348/7 |
| 5,550,578 A | 8/1996 | Hoarty et al. | 348/7 |
| 5,553,119 A | 9/1996 | McAllister et al. | 379/67 |
| 5,564,001 A | 10/1996 | Lewis | 395/154 |
| 5,566,271 A | 10/1996 | Tomitsuka et al. | 395/2.84 |
| 5,585,858 A | 12/1996 | Harper et al. | 348/485 |
| 5,602,963 A | 2/1997 | Bissonnette et al. | 395/2.84 |
| 5,608,448 A | 3/1997 | Smoral et al. | 348/7 |
| 5,608,624 A | 3/1997 | Luciw | 395/794 |
| 5,615,296 A | 3/1997 | Stanford et al. | 395/2.1 |
| 5,625,814 A | 4/1997 | Luciw | 395/605 |
| 5,634,086 A | 5/1997 | Rtischev et al. | 395/2.79 |
| 5,642,519 A | 6/1997 | Martin | 395/759 |
| 5,664,061 A | 9/1997 | Andreshak et al. | 704/275 |
| 5,666,400 A | 9/1997 | McAllister et al. | 379/67 |
| 5,668,929 A | 9/1997 | Foster, Jr. | 704/273 |
| 5,671,225 A | 9/1997 | Hooper et al. | 370/468 |
| 5,671,328 A | 9/1997 | Fitzpatrick et al. | 395/2.55 |
| 5,719,921 A | 2/1998 | Vysotsky et al. | 379/88 |
| 5,721,827 A | 2/1998 | Logan et al. | 395/200.47 |
| 5,721,902 A | 2/1998 | Schultz | 395/604 |
| 5,721,938 A | 2/1998 | Stuckey | 395/754 |
| 5,726,984 A | 3/1998 | Kubler et al. | 370/349 |
| 5,729,659 A | 3/1998 | Potter | 395/2.79 |
| 5,732,216 A | 3/1998 | Logan et al. | 395/200.33 |
| 5,737,495 A | 4/1998 | Adams et al. | 395/615 |
| 5,748,841 A | 5/1998 | Morin et al. | 395/2.66 |
| 5,748,974 A | 5/1998 | Johnson | 395/759 |
| 5,752,232 A | 5/1998 | Basore et al. | 704/275 |
| 5,752,246 A | 5/1998 | Rogers et al. | 707/10 |
| 5,774,525 A | 6/1998 | Kanevsky et al. | 379/88 |
| 5,774,841 A | 6/1998 | Salazar et al. | 704/225 |
| 5,774,859 A | 6/1998 | Houser et al. | 704/275 |
| 5,774,860 A | 6/1998 | Bayya et al. | 704/275 |
| 5,777,571 A | 7/1998 | Chuang | 341/176 |
| 5,794,050 A | 8/1998 | Dahlgren et al. | 395/708 |
| 5,794,205 A | 8/1998 | Walters et al. | 704/275 |
| 5,802,526 A | 9/1998 | Fawcett et al. | 707/104 |
| 5,805,775 A | 9/1998 | Eberman et al. | 395/12 |
| 5,809,471 A | 9/1998 | Brodsky | 704/275 |
| 5,812,977 A | 9/1998 | Douglas | 704/275 |
| 5,819,220 A | 10/1998 | Sarukkai et al. | 704/243 |
| 5,819,225 A | 10/1998 | Eastwood et al. | 704/275 |
| 5,821,508 A | 10/1998 | Willard | 235/51 |
| 5,822,727 A | 10/1998 | Garberg et al. | 701/243 |
| 5,826,267 A | 10/1998 | McMillan | 707/9 |
| 5,832,063 A | 11/1998 | Vysotsky et al. | 379/88 |
| 5,832,439 A | 11/1998 | Cox, Jr. et al. | 704/275 |
| 5,855,002 A | 12/1998 | Armstrong | 704/270 |
| 5,860,059 A | 1/1999 | Aust et al. | 704/231 |
| 5,864,815 A | 1/1999 | Rozak et al. | 704/275 |
| 5,864,819 A | 1/1999 | De Armas et al. | 704/275 |
| 5,867,817 A | 2/1999 | Catallo et al. | 704/255 |
| 5,874,939 A | 2/1999 | Galvin | 345/156 |
| 5,884,265 A | 3/1999 | Squitteri et al. | 704/275 |
| 5,885,083 A | 3/1999 | Ferrell | 434/156 |
| 5,890,122 A | 3/1999 | Van Kleeck et al. | 704/275 |
| 5,890,123 A | 3/1999 | Brown et al. | 704/275 |
| 5,892,813 A | 4/1999 | Morin et al. | 379/88.01 |
| 5,893,063 A | 4/1999 | Loats et al. | 704/275 |
| 5,903,870 A | 5/1999 | Kaufman | 704/275 |
| 5,915,001 A | 6/1999 | Uppaluru | 379/88.22 |
| 5,917,891 A | 6/1999 | Will | 379/88.03 |
| 5,920,841 A | 7/1999 | Schottmuller et al. | 704/275 |
| 5,923,738 A | 7/1999 | Cardillo, IV et al. | 379/93.25 |
| 5,929,850 A | 7/1999 | Broadwin et al. | 345/327 |
| 5,930,341 A | 7/1999 | Cardillo, IV et al. | 379/93.25 |
| 5,933,835 A | 8/1999 | Adams et al. | 707/104 |
| 5,937,041 A | 8/1999 | Cardillo, IV et al. | 379/93.25 |
| 5,946,050 A | 8/1999 | Wolff | 348/553 |
| 5,953,700 A | 9/1999 | Kanevsky et al. | 704/246 |
| 5,960,399 A | 9/1999 | Barclay et al. | 704/270 |
| 5,963,940 A | 10/1999 | Liddy et al. | 707/5 |
| 5,970,457 A | 10/1999 | Brant et al. | 704/275 |
| 5,974,385 A | 10/1999 | Ponting et al. | 704/275 |
| 5,991,365 A | 11/1999 | Pizano et al. | 379/88.13 |
| 5,991,719 A | 11/1999 | Yazaki et al. | 704/251 |
| 5,999,970 A | 12/1999 | Krisbergh et al. | 709/217 |
| 6,003,072 A | 12/1999 | Gerritsen et al. | 709/218 |
| 6,009,398 A | 12/1999 | Mueller et al. | 704/275 |
| 6,009,470 A | 12/1999 | Watkins | 709/231 |
| 6,012,030 A | 1/2000 | French-St. George et al. | 704/275 |
| 6,018,711 A | 1/2000 | French-St. George et al. | 704/275 |
| 6,021,371 A | 2/2000 | Fultz | 701/200 |
| 6,026,388 A | 2/2000 | Liddy et al. | 707/1 |
| 6,034,678 A | 3/2000 | Hoarty et al. | 345/327 |
| 6,035,267 A | 3/2000 | Watanabe et al. | 704/1 |
| 6,035,275 A | 3/2000 | Brode et al. | 704/275 |
| 6,084,572 A | 7/2000 | Yaniger et al. | 345/159 |
| 6,100,883 A | 8/2000 | Hoarty | 345/327 |
| 6,173,279 B1 | 1/2001 | Levin et al. | 707/5 |
| 6,181,334 B1 | 1/2001 | Freemen et al. | 345/327 |
| 6,192,338 B1 | 2/2001 | Haszto et al. | 704/257 |
| 6,198,822 B1 | 3/2001 | Doyle et al. | 380/210 |

| | | | | |
|---|---|---|---|---|
| 6,204,843 | B1 | 3/2001 | Freemen et al. | 345/327 |
| 6,205,582 | B1 | 3/2001 | Hoarty | 725/93 |
| 6,215,484 | B1 | 4/2001 | Freemen et al. | 345/327 |
| 6,225,976 | B1 | 5/2001 | Yates et al. | 345/156 |
| 6,480,703 | B1 * | 11/2002 | Calderone et al. | 455/118 |
| 6,573,907 | B1 * | 6/2003 | Madrane | 715/719 |
| 6,785,653 | B1 * | 8/2004 | White et al. | 704/270.1 |

FOREIGN PATENT DOCUMENTS

| | | | | |
|---|---|---|---|---|
| WO | 98/26595 | 6/1998 | | 7/173 |
| WO | 99/30501 | 6/1999 | | 7/173 |
| WO | 00/24198 | 4/2000 | | 7/173 |

OTHER PUBLICATIONS

*Sprint Begins Voice-Activated E-Mail*; May 23, 1001; Associated Press-New York Times.

John Dowding, Jean Mark Gawron, Doug Appelt, John Bear, Lynn Cherny, Robert Moore, and Douglas Moran; *Gemini: a Natural Language System for Spoken-Language Understanding*.

*Info Wiz: An Animated Voice Interactive Information System*; http://www.ai.sri.com/~oaa/infowiz.html.

Robert Moore, Douglas Appelt, John Dowding, J. Mark Gawron, and Douglas Moran; *Combining Linguistic and Statistical Knowledge Sources in Natural-Language Processing for ATIS*.

Amanda Stent, John Dowding, Jean Mark Gawron, eleizabeth Owen Bratt, and Robert Moore; *The CommandTalk Spoken Dialogue System*.

John Dowding, Elizabeth Owen Bratt and Sharon Goldwater;*Interpreting Language in Context in CommandTalk* Feb. 5, 1999.

Robert Moore, John Dowding, Harry Bratt, J. Mark Gawron, Yonael Gorfu, and Adam Cheyer; *CommandTalk: A Spoken-Language Interface for Battlefield Simulations*; Oct. 23, 1997.

John Dowding, Robert Moore, Francois Andry, and Douglas Moran; *Interleaving Syntax and Semantics in an Efficient Bottom-Up Parser*.

Robert C. Bedichek; *The Meerkat Multicomputer: Tradeoffs in Multicomputer Architecture*; Dissertatioin Given and University of Washington, 1994.

James Karney; *A Sound Proposition Even Early on, There are Already Ways to Voice-enable a Site*; Jan. 15, 2001; Internet World.

Sarah Roberts-Witt; *Talking to the Web*; Jan. 15, 2001; Internet World.

Hand out from SRI International; *Simple Ui to Retrieve Favorites*.

Email dated Jan. 15, 2001; Subject *Fwd: Large Linux Cluster*.

Email: *Cray inc. Announces Plans for Alpha Linux Supercluster System*; Feb. 12, 2001.

Email: *Fwd: Re: One Voice Technologies*; Feb. 15, 2001.

Email: *Fwd: Ars Technica: Inside the KLAT2 Supercomputer—p. 1-*.

53 Page printout from: http://www.ai.sri.com CommandTalk.

Printout: http://www.speech.sri.com/demos/atis.html.

Bruce Meyerson. *Vice Recognition Still Selective*, Jan. 15, 2000, Yahoo! News Alerts.

*Where can I get an inVoca?*, http://invoca.com/home/htm.

*Integrated Audio-Graphics User Interface.*, Apr. 1991, IBM Technical Disclosure Bulletin.

Stephanie Miles, *Will Microsoft's next OS run your TV?*, Sep. 5, 2000, Yahoo! Daily News.

* cited by examiner

SYSTEM AND METHOD OF VOICE RECOGNITION NEAR A WIRELINE NODE OF A NETWORK SUPPORTING CABLE TELEVISION AND/OR VIDEO DELIVERY

This application claims priority from Provisional Patent Application No. 60/210,440, entitled Method and Apparatus for Centralized Voice-Driven Natural Language Processing, filed 8 Jun. 2000.

This application is a continuation in part from application Ser. No. 09/679,115, entitled System and Method of a Multi-dimensional Plex Communication Network, filed 4 Oct. 2000;

Application Ser. No. 09/664,874, entitled Increased Bandwidth In Aloha-Based Frequency-Hopping Transmission Systems, filed 19 Sep. 2000 now Abandoned;

Application Ser. No. 09/661,486, entitled N-way Demultiplexor, filed 14 Sep. 2000; and Application Ser. No. 09/708,315, entitled Common Carrier, Multiple Output RF Upconverter, filed 7 Nov. 2000 now U.S. Pat. No. 6,480,703.

BACKGROUND OF THE INVENTION

1. Technical Field

This invention relates to speech recognition performed near a wireline node of a network supporting cable television and/or video delivery.

2. Background Art

Currently, speech operated functions using the latest speech recognition technologies are limited to a handful of applications, such as toys, appliances, some computers, speech dictation, cellular phones, and speech control of one's home. Most of these applications use speech recognition technology running on a computer or speech recognition chip technology. These speech recognition systems typically offer only a limited number of commands and the recognition efficiency is only fair and often require speech training.

There have been numerous patents issued regarding speech recognition. Many apply in a telephone context or other dial-up context such as an Automated Teller machine (ATM), including the following: Rabin, *Voice command control and verification system*, U.S. Pat. No. 6,081,782, issued Jun. 27, 2000, Basore, et al, *Voice activated device and method for providing access ro remotely retrieved data*, U.S. Pat. No. 5,752,232, issued May 12, 1998, and Kowalkowski, et al, *Voice-control integrated field support data communications system for maintenance, repair and emergency services*, U.S. Pat. No. 5,924,069, issued Jul. 13, 1999.

There is, however, another class of speech recognition technology referred to as natural language, which requires state of the art processing software and hundreds of megabytes of RAM to support. Natural language recognition is currently being used in high end systems, such as billing applications for utility companies and the New York Stock Exchange, because of its ability to recognize spoken words from any speech. Some natural language systems claim to be totally user independent and are also capable of recognizing speech in several different languages.

However, the problems of speech recognition at a centralized wireline node in a network supporting video delivery or cable television delivery have not been addressed by such prior art. For the purposes of the discussion herein, a centralized wireline node refers to a network node providing video or cable television delivery to multiple users using a wireline physical transport between those users at the node.

FIG. 1 depicts a typical network as found in a cable television and/or video delivery network employing a Hybrid Fiber-Coaxial (HFC) wiring scheme as disclosed in the prior art.

Each user site contains a Set Top Box, such as STB 180, coupling to the network through a coaxial cable 172, which interfaces 170 to a collective coaxial cable 160 which couples to a Node 126. The interface 170 may include bi-directional signal amplification and possibly further include the filtering and/or frequency shifting of these signals.

The Node 126 is hierarchically coupled 128 to a Headend 104, which in most cable television networks serves as the source of television programming and other signaling. The signals are sent through the Node 126 and couplings 160-170-172 to provide the STB 180 and others, with the television signaling. In certain large towns and cities, there may be a further hierarchical layer including a Metropolitan Headend 10 coupled 106 to Headend 104. These higher layers of the network use fiber optics for the physical transport of couplings 102, 106 and 108, as well as for 122, 126 and 128.

The couplings between STB 180 and Node 126 support bi-directional communication. The couplings between STB 180, Node 126 and Headend 104 may also support bi-directional communication. Such bi-directional communication allows the STB 180 to receive multiple television channels. This bi-directional communication allows STB 180 to signal at least limited information to the Node 126 and/or the Headend 104. Such information in either case may support management of Pay-per-View and other services.

User site accounting information usually resides at the highest level of the network, which tends to be either the Headend 104 or Metropolitan Headend 10.

In cable systems, several downstream data channels that send channel and synchronization information are often transmitted in a previously reserved band of frequencies. They are typically assigned for re-broadcasting FM channels over cable in the United States. Currently, most cable systems reserve some of the 88 to 108 MHz FM spectrum for set-top data transmission. The unused portion of that spectrum are left for barker channels or for additional video channels. The Open Cable Standard requires that the 70 to 130 MHz band be available for what's called Out-of-Band or (OOB) or Downstream transmission.

Most current cable systems use the popular HFC architecture so that the downstream video signals, digital or analog, are sent from the Headend to hubs or nodes via fiberoptic cable. At the receiving side of the node, the optical signal from the fiber gets converted to an electrical signal containing all of the analog, digital video RF carriers and program/service information. This signal, in turn, is amplified and distributed via coaxial cable to the appropriate subscribers connected to the node.

A major design objective for existing cable television set-top boxes was efficient downstream information delivery, i.e. from cable plant to subscriber. Provision for upstream data transmission, i.e. from subscriber to cable plant, is much more restrictive, supporting only limited bandwidth. As new classes of interactive services become available, efficient use of upstream transmission bandwidth grows in importance. For example, if it is necessary to pass information from the subscriber to the cable headend (also known as the headend), sufficient upstream bandwidth must be made available.

One of the most popular digital set-top boxes, the General Instruments (now Motorola) DCT-2000, is a useful example. When this box was first deployed, upstream transmissions were restricted to user pay-per-view requests, and other simple, infrequent transmissions. As a consequence, the transmission format used for upstream transmissions was not required to be very efficient, and in fact, is not.

In this set-top box, the transmission hardware is capable of selecting twenty different 256K bps channels, each of which uses QPSK transmission coding. While the hardware is capable of frequency-hopping to avoid channels which are subject to interference, the scheme used is fairly static, with typical deployments only using two active upstream communications channels. This leads to an aggregate bandwidth of only 512K bps per cluster of set-top boxes converging in the network to a node, in cable television terms. The cable node typically supports between 500 and 2000 subscribers.

Upstream signals in the 5 to 40 MHz band from each subscriber connected to the node are collected, combined, and then sent to the Headend via either the same fiber used for the downstream video carriers, or a separate fiber.

Furthermore, the transmission control protocol used, referred to as Aloha, is one where an individual set-top box immediately transmits any pending request to the headend, without regard to whether or not the transmission channel is already in use. This transmission is repeated at regular intervals until the box receives an acknowledgement command from the headend, indicating successful receipt of the transmission.

This transmission control protocol is quite inefficient due to the number of collisions which ensue, e.g. simultaneous transmissions from different set-top boxes which interfere with one another, forcing all of the transmitters to repeat their transmissions again. This leads to typical channel utilization on the order of just 30%. As a consequence, the total bandwidth available for upstream transmission per node is only about 30% of 512K bps=~137K bps, on average.

Downstream control data transmission typically occurs in a separate frequency band from the upstream channels.

Typically, HFC networks employ an optical fiber from a central office, or Headend, to a neighborhood node. The fiber has forward and reverse transmission capability, which can alternatively be accommodated on separate fibers. Wavelength Division Multiplexing (WDM) can be used to implement both on a single fiber. At the node, coaxial cable connects the users through a shared frequency division multiplexing (FDM) scheme with contention resolution protocols used to manage upstream data flows.

Such communication schemes having both forward and backward paths, and which may or may not involve a user, are referred to as loops herein. An example of a loop is the communication between Headend 104 and Node 126. Communication schemes having both forward and backward paths to multiple users are referred to as local loops. An example of a local loop is the communication between Node 126 and user site STBs 180, 182 and 184. Note that a loop may be constituted out of optical fiber or out of coaxial cable.

Hybrid-Fiber-Copper (HFCop) networks work in much the same manner, but substitute copper wire(s), often in twisted pairs, for coaxial cable. In such networks a local loop may further be constituted out of optical fiber, coaxial cable or twisted pairs.

Another alternative local loop configuration is commonly known as Switched Digital Video. It is a form of HFC coupling the fiber through a node to each user site with a distinct point-to-point coaxial cable. The node interfaces the user site coaxial cables with the optical fiber through a switch. The switch typically contains a network management unit which manages the switch, connecting the bandwidth service provider with multiple homes, today often in the range of five to 40 homes per switch.

The Synchronous Optical NETwork (SONET) scheme is also applied in the creation of high-speed networks for homes and businesses. This and similar communication schemes may be employed to deliver video streams to user sites.

FIG. 2 depicts a typical residential broadband network using local loop wiring of the network, as disclosed in the prior art.

As in FIG. 1, each user site contains a Set Top Box, such as STB 180, coupled to the network through a coaxial cable 172 which interfaces 170 to a collective coaxial cable 160 which is coupled to Node 126. Interface 170 may include bi-directional signal amplification, and possibly further include the filtering and/or frequency shifting of these signals.

As in FIG. 1, the couplings between STB 180 and Node 126 support bi-directional communication allowing the STB 180 to receive multiple television channels and allowing STB 180 to signal at least limited information to the Node 126, which may well include management of Pay-per-View and other services. The couplings between STB 180, Node 126 and Headend 104 may also support bi-directional communication allowing the STB 180 to receive multiple television channels and allowing STB 180 to signal at least limited information to the Headend 104, which may well include management of Pay-per-View and other services.

FIG. 2 shows a loop coupling Headend 104 through coupling 130 to Node 120 through coupling 132 to Node 124 through coupling 134 to Node 126 which in turn couples 136 to Headend 104 forming the loop.

The hierarchical coupling of Node 126 with Headend 104 is carried out along distinct paths through this loop. Communication from Headend 104 to Node 126 follows a path 130-132-134. Communication from Node 126 to Headend 104 follows the path 136. The specific wiring schemes are dominated by the choice of physical transport, communication protocols and network level management. The description just given for FIG. 2 is provided as a simplified discussion of the basics of how high speed residential broadband networks incorporate loops and local loops supporting network level hierarchies.

There has been extensive research into the mechanics of speech recognition. The progress has been sufficient to allow speech trading by stock brokers using their desk top computers.

While these innovations have been substantial, they do not resolve several central questions of great importance to cable television, video delivery systems, and commerce. There is no present system providing speech recognition to a collection of users over a cable television network. There is no present system providing user identification based upon that speech recognition over a network that supports cable television and/or video delivery. There is no present system sufficient for real-time auctions and contracting to be conducted over a cable television and/or video delivery network, based on user identification through speech recognition.

SUMMARY OF THE INVENTION

An embodiment of the invention provides speech recognition services to a collection of users over a network that supports cable television and/or video delivery. User identification based upon speech recognition is provided over a cable television and/or video delivery network. User identified speech contracting is provided over a cable television and/or video delivery network having sufficient bandwidth for real-time auctions and contracting.

The invention comprises a multi-user control system for audio visual devices that incorporates a speech recognition system that is centrally located in or near a wireline node, and which may include a Cable Television (CATV) Head-end. The speech recognition system may also be centrally located in or near a server farm a web-site hosting facility, or a network gateway.

In these embodiments of the invention, spoken commands from a cable subscriber are recognized and then acted upon to control the delivery of entertainment and information services, such as Video On Demand, Pay Per View, Channel control, on-line shopping, and the Internet. This system is unique in that the speech command which originates at the user site, often the home of the subscriber, is sent upstream via the return path (often five to 40 MHz) in the cable system to a central speech recognition and identification engine. The speech recognition and identification engine described herein is capable of processing thousands of speech commands simultaneously and offering a low latency entertainment, information, and shopping experience to the user or subscriber.

The system is capable of overlaying text on the subscriber's TV screen immediately after a word is recognized by the system as a verification of correct or incorrect recognition, thereby providing instant visual feedback and opportunity for acceptance or correction of speech messages.

The system can recognize and process speech so that the key words of spoken commands are recognized and displayed. This may be applied in navigation mode, in search context, or in other contexts and modes.

The system responds to a command with a visual indication of the spoken request. This visual feedback indicates recognition of key words may and be in the form of written text or icons.

The system may mask delays in upstream transmission or speech recognition. Upon depressing an optional talk button on the remote, a digital address may be appended to the beginning of the digital speech packets to be processed. The address tells the system not only the user site, but it also provides a mechanism for the system to begin generating masking screens or icons. Data are sent to the central location when the button on the microphone is depressed, alerting the system as to the user site and a potential input. This function allows the system to generate an icon or overlay to respond to the subscriber quickly. This function also supports site specific dictionaries, as well as data references to be loaded for speech recognition or user recognition.

At least two operations are performed at a server-center located at a central location: upstream recognition of speech commands and performing speech command protocol(s).

Low latency visual prompts are provided to support fast and accurate speech navigation. Thus, when a command is spoken and recognized the system returns the key word and optionally generates a list of visual prompts that guides the subscriber through the next navigation step. By using prompts, the system incorporates optimum recognition of the prompt words thus increasing the recognition accuracy and, at the same time, increasing satisfaction for user participation.

In this context of the invention, adaptive speech recognition is based on optimized word recognition by creating a subset of probable matches based on knowing what is in an entertainment database or the words on a Web page. This supports learning the user's habitual speech patterns.

Secure speech transactions provide a method of speech based contracting across a multimedia distribution system. Speech based contracting as used herein, refers to a process of generating and/or executing a contract, in which at least one step of that process is based upon the invention receiving, recognizing, and witnessing an identified user's speech.

Speech based contracting includes, but is not limited to, the following: a first identified user making an offer; a second identified user accepting an offer, which may or may not be acoustically presented; as well as the second identified user specifying acceptance particulars, such as payment arrangements and the number of units.

Speech based contacting also includes, but is not limited to, acknowledging receipt of goods or services of a tangible, and/or intangible nature, possibly involving real property, personal property and/or intellectual property, exercising options of the contract, as well as terminating a pre-existing contract. The acknowledgement of receipt may include, but is not limited to, a declaration of the condition of goods upon receipt or upon subsequent testing, which may include an estimate of damage.

Speech based contracting may also include at least one of the following: the second identified user making a counter-offer to the first identified user based upon the offer; and the first identified user responding to the counter offer. The response may include accepting the counter-offer, or making a second counter-offer to the second identified user.

Speech based contracting may also include the second identified user inviting offers. The invitation may or may not specify the first identified user and/or performance constraints such as time of delivery and/or the duration of the terms and/or optional terms which may be exercised after the contract has been accepted.

Speech based contracting may also include an identified user exercising one or more optional terms of a pre-existing contract. The exercise of the optional terms may further specify one or more amounts, delivery times, ranges of time and/or place during/over which a service may be performed or commodity delivered in accordance with the optional terms of the pre-existing contract.

The offer may originate at the offeror-user site, possibly involving speech, when it is sent to the central location and recognized at the central location, recorded, distributed, and presented to potential offeree user sites. The offer may be sent to the central location to be recorded and distributed to potential offeree user sites. The offeree may signal acceptance of the offer verbally at the offeree user site where the offeree is recognized. The system transmits the verbal acceptance to the central location, where it is recognized, recorded and then transmitted to the offeror.

Using the user site address accelerates speaker identification, increases reliability, enhances security and reduces latency in identifying a speaker. Using the user site address and user specific speech data references further accelerates speaker identification, increases reliability, enhances security, and reduces latency in identifying a speaker.

The invention supports automatic generation of serial-multiplexed video output streams, without additional video boards or multiplexers. The centrally located speech recognition system employs extremely fast, efficient arrays of microprocessors, many of which may possess a frame buffer in locally accessible memory. Each microprocessor translates the frame buffer into an MPEG stream. Several MPEG streams are merged within a single microprocessor to form a multi-media stream for distribution to subscribers.

DETAILED DESCRIPTION OF THE INVENTION

Figure 3:
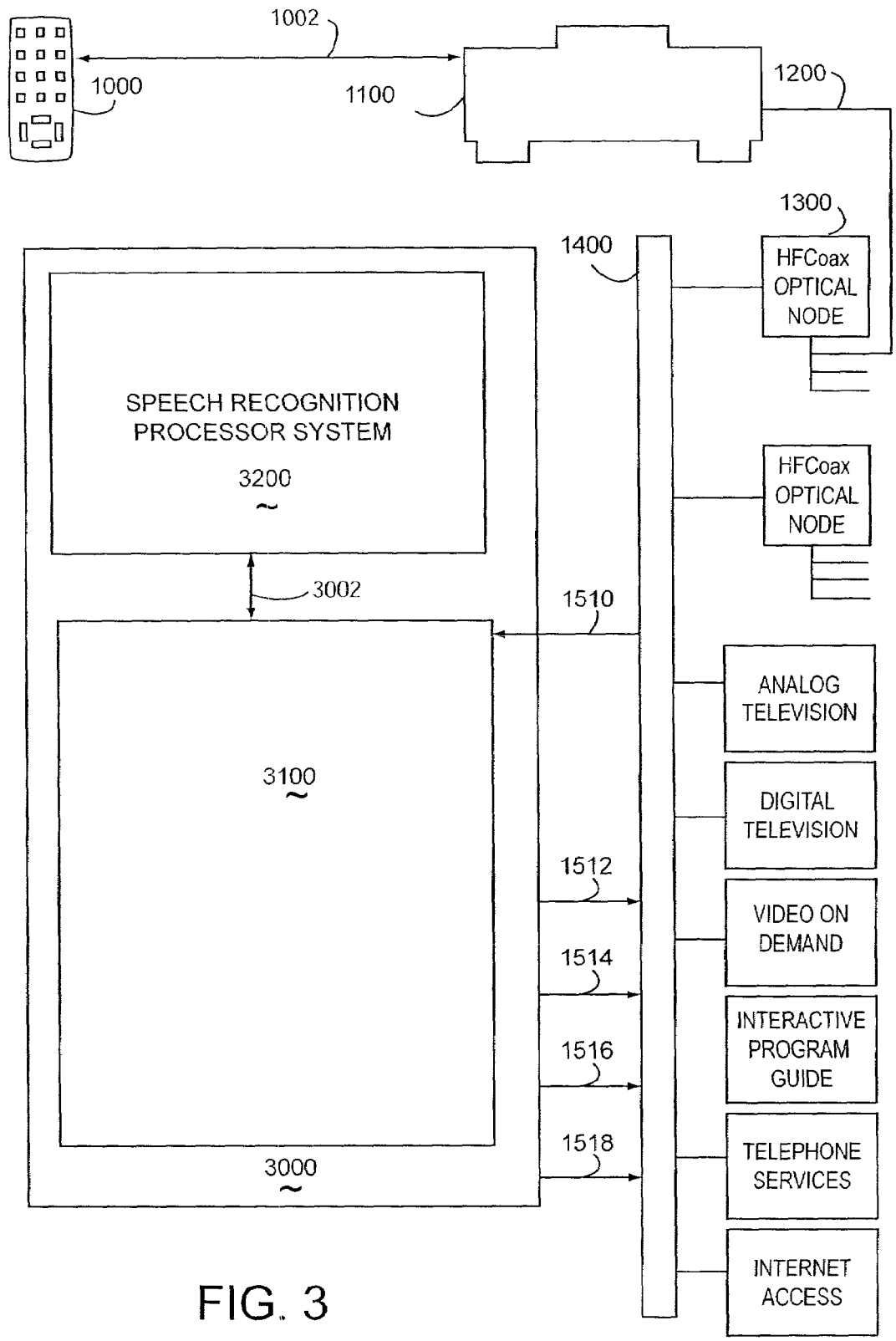
FIG. 3 depicts a remote control unit 1000 coupled 1002 to set-top apparatus 1100, communicating via a two-stage wireline communications system containing a wireline physical transport 1200 through a distributor node 1300, and through a high speed physical transport 1400, possessing various delivery points 1510 and entry points 1512–1518 to a tightly coupled server farm 3000, with one or more gateways 3100, and one or more tightly coupled server arrays 3200, in accordance the invention.

FIG. 3 depicts a remote control unit 1000 coupled 1002 to set-top apparatus 1100. Set-top apparatus 1100 communicates via a two-stage wireline communications system containing a wireline physical transport 1200 to a distributor node 1300. Set-top apparatus 1100 communicates through distributor node 1300 across a high-speed physical transport 1400 to a tightly coupled server farm 3000, possessing various delivery points 1510 and entry points 1512–1518. Tightly coupled server farm 3000 contains one or more gateways 3100, and one or more tightly coupled server arrays 3200.

As used herein, a server farm refers to a collection of at least two server components communicatively coupled to one another. The server components may or may not all be directly communicatively coupled to each other. A server component refers to at least a gateway, server array, server computer, database engine, or disk farm.

As used herein, gateway refers to at least one of the following: A gateway may perform protocol conversion between different types of networks or applications; gateways may support complete conversion of one protocol to another, or support one protocol from within another protocol; a gateway may perform conversion between two messaging or mail protocols; a gateway may act as a go-between for two networks with similar protocols, providing an entry/exit point for one network in the other network. Such gateways include proxy servers; a gateway may switch speech and data between a terrestrial network and an orbiting satellite communications system; and a gateway may perform network layer switching tasks between at least two networks, coordinating the delivery of information, usually in the form of messages, packets or data streams to various destinations in the networks.

As used herein, a server array refers to a multi-dimensional lattice or array of server computers, each with an associated multi-dimensional array address, and a communication grid supporting communication between server computers based upon the multi-dimensional array addresses of the source and destination server computers. A tightly coupled server array is a server array possessing a very low latency communication grid.

The invention may include a remote control unit 1000 fitted with a microphone. Remote control unit 1000 may be fitted with such features as a special noise canceling microphone and/or a push-to-talk button.

The microphone in the remote relays the subscriber's speech commands to the central speech recognition engine. The push-to-talk button may begin the process of speech recognition by informing the system that the subscriber is about to speak and also to provide immediate address information. Address information identifies the user site at which the speaking occurs.

The invention may also include an array of microphones that are operated in conjunction with a remote control 1000 that is coupled to the set top box 1100. The microphone array may further provide an echo-canceling capability in receiving speech signals within the area of usage.

Note that there may be more than one remote control unit 1000 with one or more microphones, each remote control unit under the control of a distinct, identified user. Such situations are particularly useful in game playing settings, where different users may wish to make commands to the game simulation like "arm the photon torpedoes", etc.

A given residence may include more than one set-top box 1100, each of which has a distinct address in the network delivering video content and/or cable television. Each constitutes a distinct user site and may be parameterized differently. By way of example, a first set-top box in a recreation area for children may allow identified users, who are children, to select programming on only certain channels. Whereas a second set-top box in a private area of adults, such as a parental bedroom, may be parameterized so that child identifier users have no privileges.

Speech commands from the subscriber may be preprocessed. The analog signals picked up from the microphone are converted to digital signals where they undergo additional processing before being transmitted to the speech recognition and identification engine located in the cable Headend or other centralized location. Such speech preprocessing may include encryption, compression, or conversion to an alternative form of speech representation.

The preprocessing function may also take place in the remote control 1000 itself before being transmitted to the set-top box 1100, or set-top appliance 1100. Coupling 1002 may use a wireline or wireless physical transport. Coupling 1002 may use a wireless transport, including, but not limited to, at least one of the infra-red, microwave, or radio frequency spectrum, as well as ultrasonic signaling. Coupling 1002 may support bi-directional communication between remote control 1000 and set-top box or appliance 1100. The communication may be predominantly or strictly from remote control 1000 to set-top box or appliance 1100.

The speech signal from the remote 1000 may be a digitally modulated RF signal whose properties may comply with Part 15 of the FCC rules. Alternatively, the set-top box 1100, or set-top appliance 1100, receives the speech signal from the remote 1000 and performs the preprocessing function mentioned above.

The set-top box 1100, or set-top appliance 1100 may also be used to transmit speech and subscriber address data to the centralized location or Headend for speech recognition and identification. The Radio Frequency (RF) signal from the remote 1000 is received by the set-top appliance 1100 and then remodulated for upstream transmission 1200 on the 5 to 40 MHz cable return path. If a commercial set-top box 1100 is used to transmit the upstream speech data, then the upstream channel allocation and transmission protocol are controlled by the bi-directional communication system which is resident in the set-top box.

In certain embodiments, a commercial set-top box 1100 may not be used to transmit the digitized speech data upstream. The set-top appliance 1100 is then responsible for receiving the upstream channel allocation and synchronization information. The data receiver in the set-top appliance 1100 can be tuned to any one of several downstream data channels to receive channel and synchronization information.

The set-top appliance 1100 is also capable of receiving and decoding data in the downstream path. This function is required to organize and synchronize the transmission of upstream data which may include user feedback. Downstream data can contain upstream channel allocation information and speech verification overlay information coded as text.

The set-top box 1100 may be used for both upstream and downstream communication for the described speech command function. The function of the set-top appliance 1100 may be to receive the RF signal from the remote control and then digitize and compress the speech signal and prepare it for upstream transmission.

New RF protocol standards, such as Blue Tooth, allow the remote control's RF signal to transmit the speech signal directly to the set-top box where again, the preprocessing can either be done in the remote control 1000 or executed from firmware within the set-top box 1100. Note that infrared signaling may be employed to transmit the speech signal to the set-top box.

Set-top boxes 1100 that employ the DOCSIS type cable modems such as Open Cable set-top boxes or the so called Heavy Set-top boxes from such companies as Scientific Atlanta and General Instruments are capable of sending and receiving speech data using efficient data transmission protocols. The DOCSIS protocol also incorporates error detection and correction capabilities as well as other transmission enhancements such as pre-equalization for more efficient and error free transmission.

Figure 4:
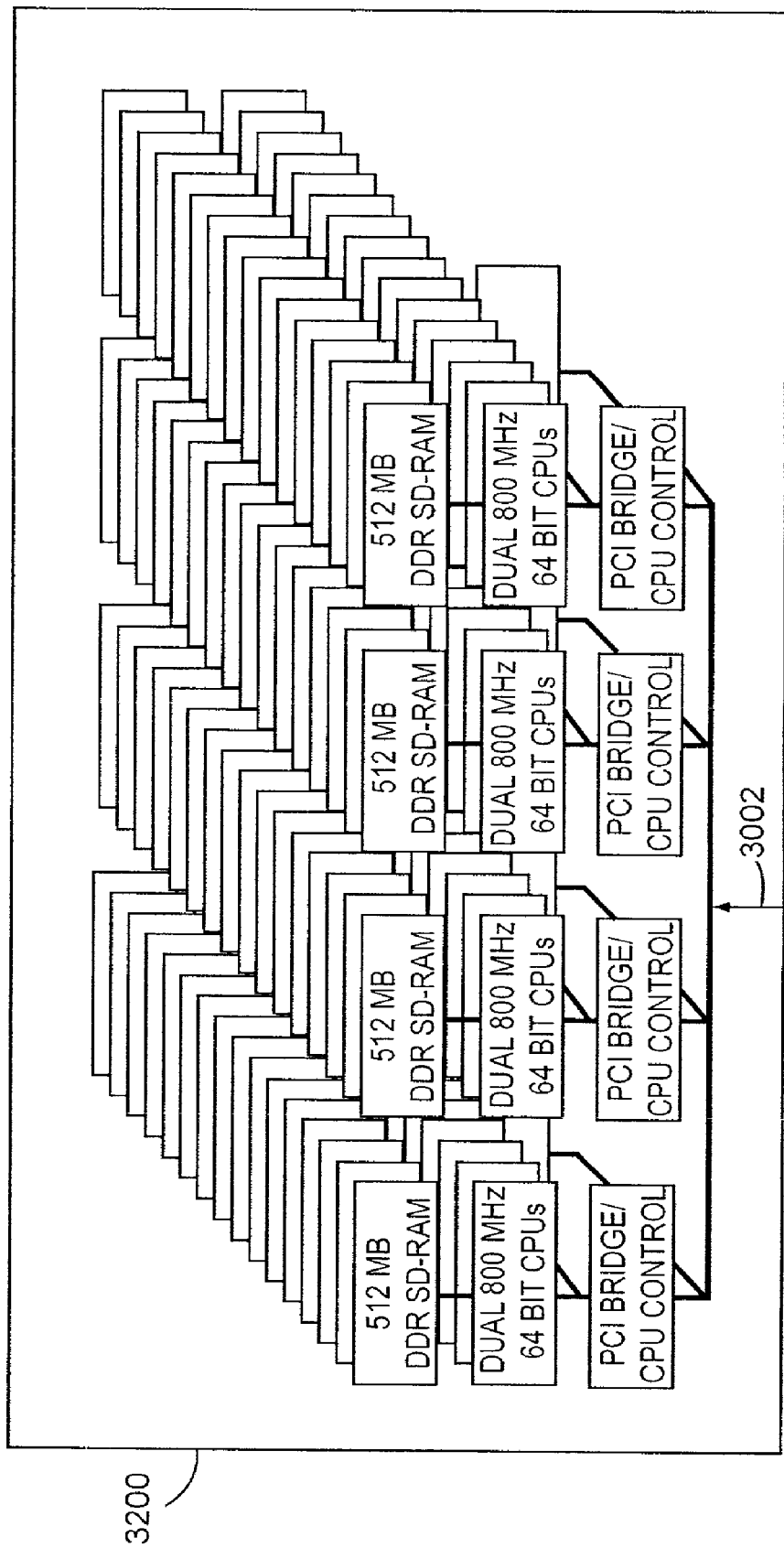
FIG. 4 depicts a coupled server array 3200 of FIG. 3.

FIG. 4 depicts a coupled server array 3200 of FIG. 3.

Figure 5:
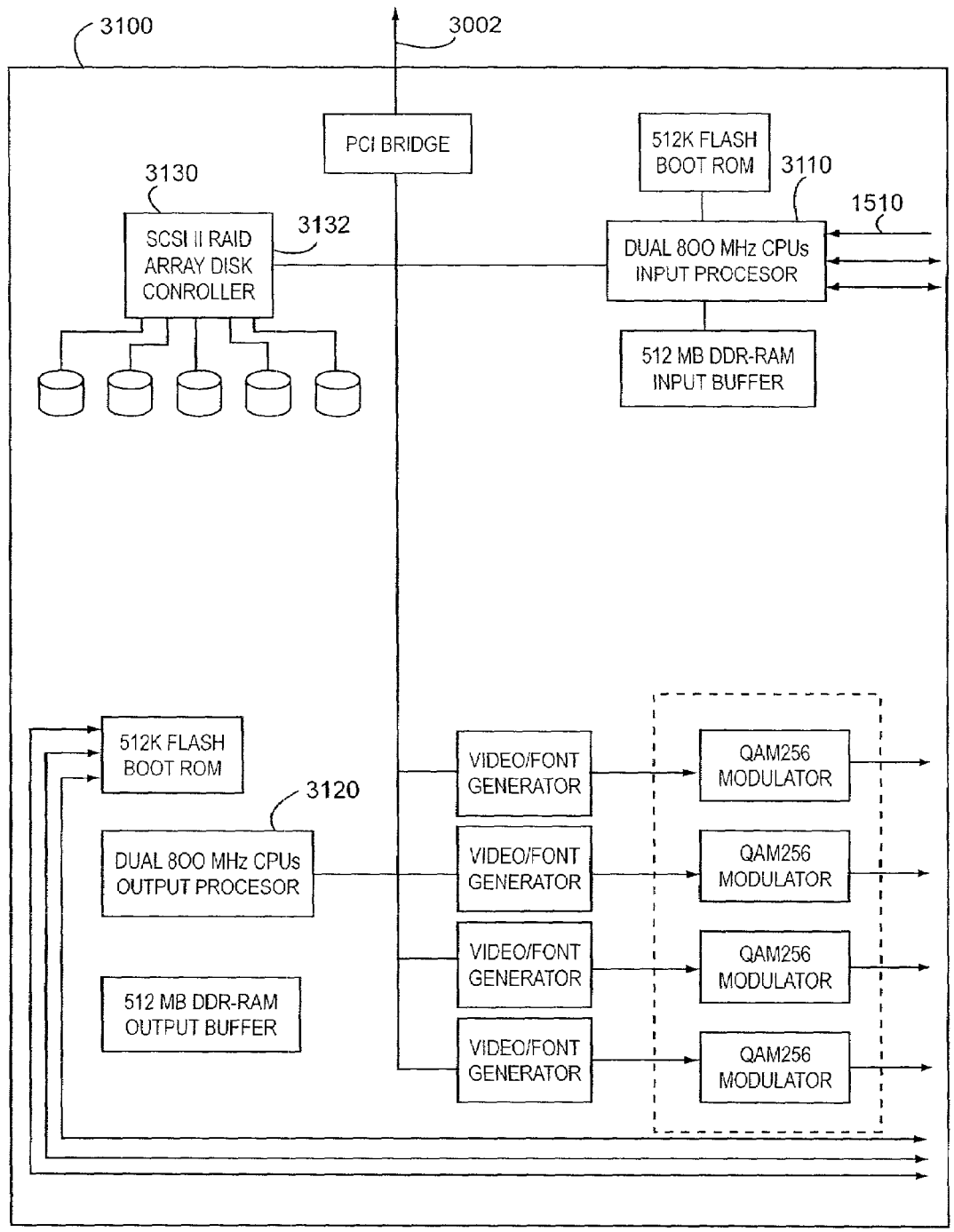
FIG. 5 depicts a gateway 3100 of FIG. 3.

FIG. 5 depicts a gateway 3100 of FIG. 3.

The system uses the subscriber's address information as a mechanism by which the centrally located AgileTV™ Speech Processor can fetch a particular subscriber's parameter file. The parameter file contains speech training parameter data, speech identification parameters and user profiles for each user at that address. This file can also contain parental control information in a residential setting and other specifics for that particular address, such as language preferences or movie preferences or even internet preferences.

The Addressed Subscriber Parameter File (ASPF) gives the system an extremely high probability of speech recognition and user identification. Such addressing supports secure transactions such as banking because the speech recognition and identification system has to only identify a few parameter files for any one physical address, resulting in a very high probability of recognizing a specific speaker's speech.

Financial transaction security, e.g. speech banking and e-commerce, can be realized with this system and, with the addition of speech encryption processing in the Speech Preprocessor, even higher levels of security can be attained. This directly supports a method of contracting based upon an offer presented to the user by the system, and a recognizable acceptance of the offer by the identified user. The method of contracting may further include storing the offer and acceptance as a recording mechanism for the contract.

The speech signal transmitted from a subscriber's set-top box, or set-top appliance, 1100 is received 1510 by the five to 40 MHz data receiving equipment within gateway 3100 in the central location. As used herein, a central location may include a node, Headend, or metropolitan Headend for a residential broadband network.

When the digitized speech signal comes from a commercial set-top box, such as a General Instruments or a Scientific Atlanta set-top, then the return path receiving equipment in the central location may be specific to that type of box. Therefore, the data coming from this equipment, which contain other upstream traffic, may be parsed in such a way that only the speech commands and address information from the subscriber are input to the speech recognition engine in the central location.

When the digitized speech signal sent upstream comes from another set-top appliance, the upstream data receiver in the central location may be a separate unit that receives only speech command signals from set-top appliances at the user sites. Using the set-top appliance as the upstream transmitter allows the use of custom upstream protocols such as FM, AM, PSK, or spread spectrum digital transmission. Digital transmission techniques such as QPSK or QAM can also be employed.

Upon receiving the digitized and preprocessed speech signal from the subscriber's set-top box or set-top appliance, the received upstream signal may be in the form of a data stream containing speech and address information. The data stream containing speech and address information may be Ethernet compatible. Because the AgileTV™ Voice Processing Unit (AVPU) is a high speed speech processing unit capable of processing the data from several nodes, the digital speech signals from each of these nodes may be combined in the AVPU input multiplexer. The combining of digital speech signals may result in a smaller number of high speed digital streams.

Upstream signals such as 1510 are received at the gateway 3100. Speech and data signals may be received from commercial return path data receivers. Speech and data signals are also received and decoded by custom return path receivers using at least one of the following protocol options: FM or AM modulation/demodulation, FDMA, TDMA, FSK, PSK, or QPSK digital modulation/demodulation, Spread Spectrum modulation/demodulation, Telephony, cellular return, or Wireless.

The AVPU Engine may not be an application service, in and of itself. The system may provide new end user applications. The AVPU Engine may provide speech recognition and control services for existing applications, such as Interactive Program Guides, Video On Demand (VOD) services or access to the Internet or World Wide Web.

Near network system initialization time, applications such as Video On Demand or Interactive Program Guides, that request service access with the speech recognition services may be required first to register with the AVPU system. At least one standard program interface may then be used to enable each application to specify its complete menu hierarchy. The invention may use exactly one standard program interface to enable applications to specify their complete menu hierarchy.

A list structure specifies each application's menu hierarchy. This list structure may be a tree. It contains labels for each menu, along with the text of each button on each menu screen, information the system needs to provide speech navigation services independently through the menu hierarchy on behalf of the application. This menu hierarchy represents the static portion of the application's data.

In addition to the static menu structure, it may also be the responsibility of the application to inform the system of dynamic content, for example the names of movies in a Video On Demand system or of program names and times in an interactive program guide. Each time a user enters a menu context in which dynamic content appears, the application may inform the speech system of this context by passing a handle associated with the list of names that comprise the dynamic content. The speech system may combine the static menu content with the augmented dynamic content (see Similarity Searching below), to form a complete grammar. Also, application-independent keywords, such as HELP, may be combined with the static menu content and augmented dynamic content to form the complete grammar. This construct may then be passed to the speech system to maximize recognition accuracy.

Given that dynamic content, by definition varies, applications may be required to inform the system whenever the content changes. In an interactive TV guide application, for example, the application registers a new set of dynamic content every one-half hour. For a VOD system, this registration may be performed whenever the database of offered movies changes.

Once registration has been completed, and the system is being used, recognition of a spoken request may cause a signal to be sent back to the application. This signal informs the application to perform the requested action, and/or to update the contents of the screen as a result of the user's request. In this manner, the application can use the system's speech recognition services with minimal modifications to the application's code, while retaining the same graphical look and feel to which users have become accustomed.

In the subscriber's premises, a speech-enabled remote control may be employed, e.g. containing a microphone, as well as traditional universal remote control functionality. The remote control may further contain a Push-To-Talk (PTT) button. Conventional remote control functions are transmitted via infra-red (IR). The speech output may be wirelessly transmitted to a set top pod, module, or appliance located at the set-top box. The wireless transmission from the remote control may employ an electromagnetic physical transport layer or ultrasonic physical transport layer. The electromagnetic physical transport layer may use a radio frequency carrier or an infra-red carrier.

When the PTT button is pushed by the user, the remote control sends a PTT active command to the set top appliance. The appliance may then inform the set-top box to place an icon on the screen, or otherwise indicate to the user that the system is listening to them. Next, as the user speaks into the microphone, the speech is digitized, compressed, and transmitted to the set top appliance.

The set top appliance may perform any or all of the following: encrypt the speech sample to provide security; add subscriber address information; add a message length code; add error control coding to the assembled information. The error control coding may include a Cyclical Redundancy Code (CRC), enabling data transmission errors to be detected.

In homes with set-top boxes having the necessary features, the set top appliance may transmit speech information to the set-top box, which then transmits it to the central location as a series of packets.

Alternatively, the set top appliance may directly transmit the speech stream to the central location itself. This may continue until the set top appliance receives a PTT Release from the remote, indicating end of speech. This information is also transmitted to the central location, signaling end of spoken request.

Each individual consumer's interface, i.e. set-top box or set-top appliance, may have a unique address. The address of the individual consumer's interface may be determined during the manufacturing process. As speech packets are transmitted upstream, this address information may be appended to the speech packets. The address information enables rapid determination of the user site from which the speech sample is received. The address information may precede the speech packets. The address information improves the efficiency of at least some of the central location processing stages.

Assignment of an input buffer address to the speech sample may be based upon the user site address. This input buffer collects incoming speech packets until the final packet of a spoken request has been received. Recognition of the final speech packet receipt may be encoded in that speech packet. Final speech packet receipt recognition may include a delay in speech of greater than a predetermined amount of time. The speech delay amount may be one or more of at least the following: a globally defined constant, a user site defined constant, an identified user defined constant, or an application-defined constant for an application serviced by the speech recognition system. The final speech packet may be generated based upon the release of the PTT button in the remote control unit. The final speech packet may be generated at the remote control unit, set top pod, set top appliance, set top box, node, Headend or metropolitan Headend, or by the serviced application. The final speech packet may be generated by the serviced application based upon a time schedule, e.g. a fixed period in which participants may respond, a privilege scheme, and/or other application related scheme.

On-the-fly Cyclical Redundancy Code (CRC) error checking generation may be used. Each time a packet is read in, CRC in the processor registers may be computed as each byte is read, then the partial CRC is stored with the stored packet. The CRC may be stored at the end of the packet, at the beginning of the packet or in specifically designated locations within the packet. When the next packet arrives, the partial CRC is read from where it was stored, and the new packet data may be appended to the end of the previous packet, overwriting the temporary CRC. This continues until a complete speech sample has been received. This approach to CRC calculation cuts memory accesses in half compared to first storing the string, then making a second pass to generate the CRC.

Once a complete spoken request has been received, the speech input processor may use the sample's source address identifying a user site to target the speech data to a specific speech processing processor. This direct correspondence between the source address and a specific speech processor allows speech processors to cache user-specific parameters for the user sites they serve. The mapping of source addresses to speech processor reduces the bandwidth necessary to move user site-specific data to each speech processor. In other embodiments of the invention, a translation table may be used to allow speech to processor assignments to be changed dynamically in the event of a hardware or other failure, e.g. capacity overload, while retaining the efficiency advantages of directly mapping the speech channel to the processor.

To process a speech sample by the speech processor into speech content, the speech processor must first contain in its local memory a copy of the grammar definition associated with the user site. A grammar is a structure often containing the words which are most likely to be spoken, the order in which these words may appear, and the meaning of various sequences of words. This structure may be a hardware configuration, software program, data structure, or a combination of two or more of these.

Before transferring the new speech sample to a speech processor, the grammar associated with the speech sample is transferred to the target speech processor. The grammar transfer may use a simple Least Recently Used (LRU) queue. If the speech processor contains enough empty space in its memory, then the indicated grammar is transferred directly to the empty memory from mass storage. Mass storage may include, but is not limited to, a disk, disk farm, or Redundant Array of Independent Disks (RAID), a high bandwidth disk farm. If not, then the least-recently-used grammar entry may be discarded, and the new grammar information loaded into the vacated memory.

The next step in processing the speech sample ensures that the current parameters associated with this user site are already cached in the specific speech processor's RAM. If these parameters are not present, then the least-recently-used parameter cache entry may be evicted from the cache.

To do this, the oldest cache entry on this speech processor is first examined to see if it has been modified. If it has, the cache entry is stored to mass storage, and the cache slot is then declared vacant. Next, the user site speech parameters associated with the new speech sample are loaded into the vacated cache block. During the relatively long access times needed to load a new set of user site parameters from mass storage (and optionally to write the old parameters to the disk, etc.), the current speech sample may be held in the input buffer in a waiting state.

After the new household speech parameters are loaded into the targeted speech processor, the speech sample is moved into the work queue for the speech processor. This minimizes speech processor delay for processing other speech requests during disk accesses. Instead, the speech processor may process other speech samples associated with user sites whose parameters are already in the cache.

Once the speech parameters associated with a speech sample are available in the speech processor, the speech sample may be assigned to the speech processor by placing a description of the speech sample into the target speech processor's work queue. As speech samples are processed, they may be removed from the front of the work queue by the speech processor.

Eventually, the speech processor reaches the current input sample. The speech sample is transferred into the speech processor's local memory, and the status of this speech sample changed to Next. This transfer may occur in parallel with the processing of the prior speech sample, ensuring that speech processor utilization is maximized.

Once this transfer is complete, and the speech processor completes processing of the prior sample, the status of this speech sample changes to Current, and the speech recognition engine begins processing this sample.

Successful processing of a speech sample requires that both the proper grammar and the proper user site parameter information be simultaneously accessible by the speech processor.

The possibility exists in which a recently-loaded grammar or speech parameter file is erased prior to its use, in the process of loading the grammar or speech parameters for the current speech sample. To eliminate this condition, the total number of speech samples sitting in the waiting and working queues of a speech processor preferably should not exceed the number of cache entries in the speech processor.

The first step in recognizing the current speech sample may determine which individual person pronounced the current spoken request. The Speaker Identification software module running on the targeted speech processor compares the spoken characteristics of this speech sample with the characteristics of the speakers who have been previously identified in this user site.

In many spoken requests, the incoming speech sample matches the characteristics of a previously identified speaker. When this occurs, the speech sample is passed on to the next phase, speech recognition.

If the speech sample is not identified with an existing speaker, then a new user routine is invoked, enabling a new user to be associated with this household. This routine records the new individual's speech parameters into this user site's speech parameters, so that the new speaker may be identified during subsequent spoken requests. Optionally, the system may offer the user site manager the opportunity to erase or modify the new speaker parameters.

The inputs to the speech recognition software module may include a speech sample, an individual user's speech parameters, and the grammar to be recognized. The speech engine determines the most likely spoken request based on statistical analysis, and may return a text string corresponding to the spoken request. This matching process is probabilistic: along with the returned text string, the speech engine may also return a confidence measure, or percentage of match likelihood. The returned text string and confidence measure enables different applications to respond differently based on the calculated confidence in the recognition result.

For recognition results having a low cost to the user, such as a request to display listings for a particular movie, lower confidence criteria may be applied. For recognition results with a high cost to the user, such as a request to purchase a movie, higher confidence thresholds may be required. Furthermore, purchase verification may be requested.

When recognition accuracy is particularly low, the speech recognition engine may determine partial matches to more than one possible phrase, returning the text of several possible matches. This process enables an application or user to select from several alternative recognition results.

In cases where a transaction results in a charge to the user, the system may record the speech sample representing the purchase request onto mass storage. This speech sample recording is performed to provide verification that a purchase request was made, should a user dispute their intent to purchase. This further supports speech-based methods of contracting. Note that the recording may be compressed in either a standard or non-standard manner, which may further include encryption technology.

Due to the statistical nature of speech recognition, spoken requests are occasionally mis-recognized. Recognition errors have been a primary hindrance to further exploitation of speech recognition systems. This system provides a mechanism by which the user receives rapid visual feedback regarding the recognition process. Soon after the speech recognition engine has returned a result, visual text corresponding to the recognized spoken request is displayed on the display, e.g. television, screen.

This rapid visual feedback may be accomplished by transmitting the recognized text string back to the set-top box. Software executing within the set-top box displays the text information in a special window on top or overlaying of the existing application display. In cases where limitations in the set-top box prevent the window from appearing on top of existing content, software executing within the set-top box may select an alternative feedback display, for example, a different channel containing a background field, and displays the overlay information on top of this background.

In cases where the recognition accuracy is particularly poor, and the speech engine returns several possible recognition results, this overlay display capability may be used to help refine the user's query. By displaying the text of the possible recognition results, the user can easily select from the returned list.

If none of the recognized text strings match the user's spoken request, the user may elect to start again. However, more commonly, one of the displayed strings match, or be likely to readily lead to the user's speech request with appropriate modification. When this is the case, the user can readily select from the displayed alternatives, enabling improved productivity in low-recognition situations.

One key feature which can be used with applications such as Pay-Per-View and Video-On-Demand, is similarity searching. When the system is scanning for dynamic content, i.e. movie titles and actor names, a similarity search feature may be available. This enables searches for names which are only partially matched, or which resemble the recognized phrase, without requiring precise specification of the exact title or name. The technique used to deliver similarity searching is to augment the dynamic content list specified by the application. Words similar in meaning, content, or spelling to words in the content list may be automatically added to the dynamic content list whenever the application informs the system of a content update. This enables the recognition grammar to be extended to support a broader array of matches without requiring bandwidth-intensive text searches each time a user's speech request has been received. Links between similar and target words may be maintained in the internal representation of the grammar, thereby providing direct access to target names. This further enhances system performance.

Note that as used herein, similarity databases may be constructed from at least one or more of the following database architectures: relational, SQL, knowledge-based, inferential knowledge bases including Horn clause and extended Horn clause fact bases, fuzzy versions of the above, as well as neural networks and combinations of these techniques. Also, manual additions may be made at the AgileTV™ central office.

The entire system may provide fault tolerance for robust performance. For individual components, such as speech processors and associated memory, the system may automatically recognize most component failures, and disable faulty processors.

In addition, many system installations may require multiple AgileTV™ Voice Processing Unit (AVPU) boxes 3000 to meet the performance needs of the subscriber base. To ensure maximum operating time, even the total failure of an AVPU engine may not be catastrophic. The remaining AVPU engines continue to service the incoming speech traffic at a reduced performance level. This failover is carried out by a negotiation protocol between the AVPU boxes.

In addition to these internal diagnostics functions, the system may also communicate continuously with a network operations center, enabling rapid identification of system errors, as well as rapid service dispatch to correct any problems.

A speech command preprocessor may perform the function of speech filtering, digitizing, data compression, encoding pauses in speech, and address insertion. Preprocessing speech commands at user sites results in a lower upstream data rate. This processing can be located in the remote 1000, the Set-top appliance 1100, or the set top box.

A Speech Packet Processor may be centrally located in or near a wireline node specifically to capture and prepare the upstream speech packets that are to be fed to the Speech Recognition Engine.

A speech processor system may be centrally located in or near a wireline node, which may include a Cable Television (CATV) central location. The speech recognition system may be centrally located in or near a server farm. The speech recognition system may be centrally located in or near a web-site hosting location. The speech recognition system may be centrally located in or near a gateway.

The speech recognition engine processes speech packets to create speech content and formulate the response to the speech content for each of the user sites.

The system also performs address decoding for routing and latency reduction. It also performs the function of decoding the pauses between words or sounds originally encoded on the preprocessor at the user site.

A method is provided for a very high level of security based on the ability of being able to precisely recognize a parent's speech or a child's speech based on a limited subset of choices. The ability to recognize an individual speaker with a very high probability of identifying the specific speaker is based on knowing the address of the user site.

A large capacity, centrally located, natural speech recognition engine can readily identify a specific speaker from among a small set of choices, allowing a parent to voice print and therefore control the type, or amount or timing of content a child may request. A child may be able to learn PIN numbers but cannot readily fool the voice print. Speaker recognition is particularly appealing in this parental control application, and can be applied with very high accuracy, due to the limited number of speakers per user site. Parents may control the specific viewing times, total time, or content that a child can watch television through this system and its use.

The operational discussion just presented regarding FIGS. 3–5 is applicable to the relevant operational system embodiments based upon any and all of the FIGS. 19A to 24, as well as, FIGS. 26 to 31.

A parallel processor system supporting this sort of system is disclosed in U.S. Patent Application Ser. No. 60/210,440, entitled "System and Method of a Multi-dimensional Plex Communication Network", which describes plex processor networks and which is incorporated herein by reference.

A plex communications network has M orthogonal directions that support communications between an M dimensional lattice that may include N^M plex-nodes, where M is at least two and N is at least four. Each plex-node pencil in a first orthogonal direction contains at least four plex-nodes and each plex-node pencil in a second orthogonal direction contains at least two plex-nodes. Each of the plex-nodes contains a multiplicity of ports.

A plex-node pencil refers to a 1-dimensional collection of plex-nodes differing from each other in only one dimensional component, i.e. the orthogonal direction of the pencil. By way of example, a nodal pencil in the first orthogonal direction of a two-dimensional array contains the plex-nodes differing in only the first dimensional component. A nodal pencil in the second orthogonal direction of a two-dimensional array contains the plex-nodes differing in only the second dimensional component.

The plex communications network is comprised of a communication grid interconnecting the plex-nodes. The communications grid may include $N^{\wedge}(M-1)$ communication pencils, for each of the M directions. Each of the communication pencils in each orthogonal direction is coupled with a corresponding plex-node pencil containing a multiplicity of plex-nodes coupling every pairing of plex-nodes of the corresponding plex-node pencil directly.

Communication between two plex-nodes of a nodal pencil coupled with the corresponding communication pencil comprises traversal of the physical transport layer(s) of the communication pencil.

Such plex communications networks support direct communication between any two plex-nodes belonging to the same communication pencil. This supports communication between any two plex-nodes in at most M hops between plex-nodes.

Figure 6:
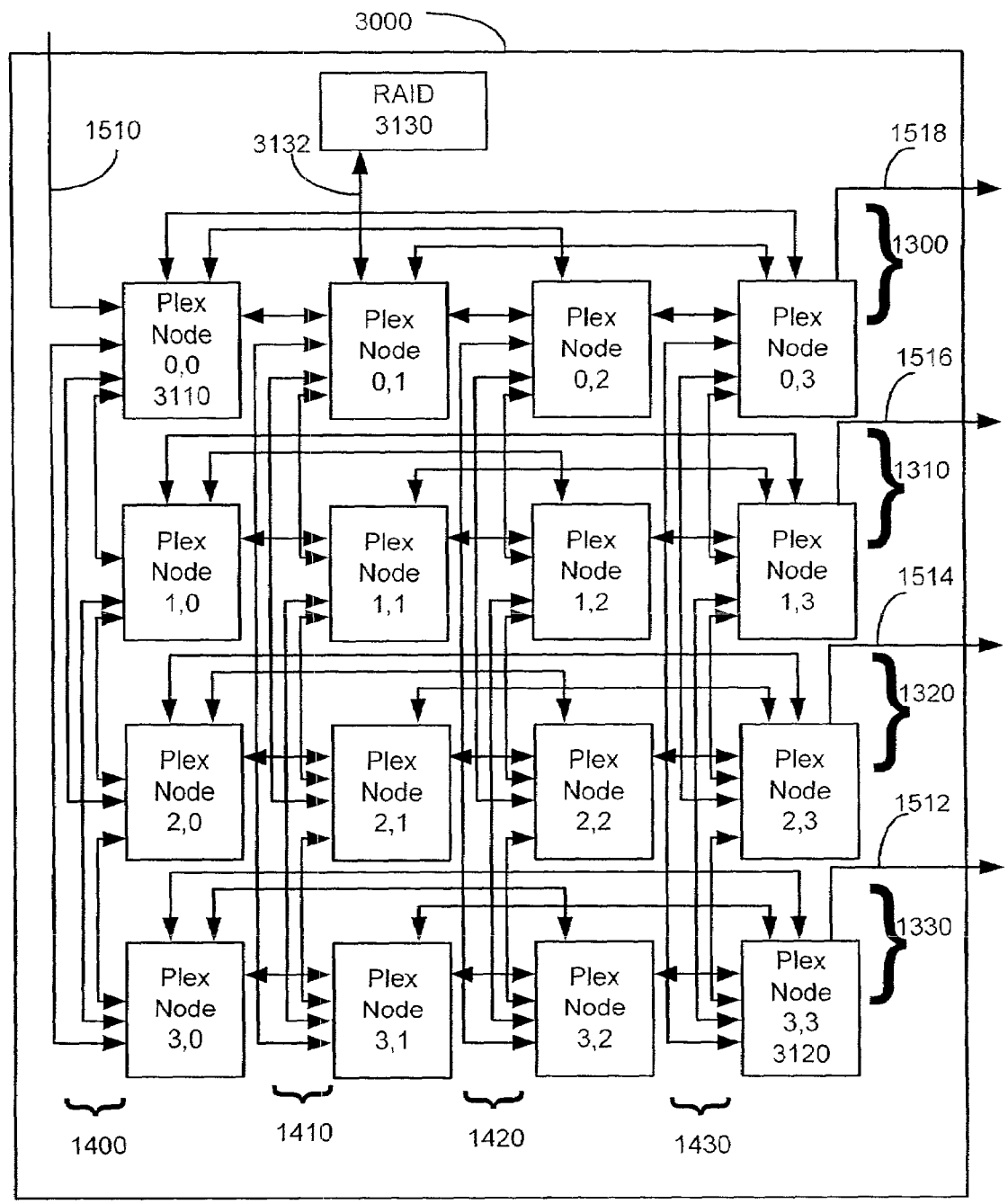
FIG. 6 depicts the tightly coupled server farm 3000 of FIG. 3 implemented in a two-dimensional plex communication network with N=4 plex nodes in each of two orthogonal directions of the node array.

FIG. 6 depicts a tightly coupled server farm 3000 of FIG. 3 implemented in a two-dimensional plex communication network with N=4 plex-nodes in each of two orthogonal directions of the plex-node array.

Consider the plex-node pencil in the first orthogonal direction containing Plex-node 0,0, Plex-node 1,0, Plex-node 2,0 and Plex-node 3,0. The communication pencil 400 in the first orthogonal direction couples to the plex-nodes of this plex-node pencil. Plex-node 0,0 is coupled 402 to communication pencil 4100. Plex-node 1,0 is coupled 404 to communication pencil 400. Plex-node 2,0 is coupled 406 to communication pencil 400. Plex-node 3,0 is coupled 408 to communication pencil 400.

Consider the plex-node pencil in the first orthogonal direction containing Plex-node 0,1, Plex-node 1,1, Plex-node 2,1 and Plex-node 3,1. The communication pencil 410 in the first orthogonal direction couples to the plex-nodes of this plex-node pencil. Plex-node 0,1 is coupled 412 to communication pencil 410. Plex-node 1,1 is coupled 414 to communication pencil 410. Plex-node 2,1 is coupled 416 to communication pencil 410. Plex-node 3,1 is coupled 418 to communication pencil 410.

Consider the plex-node pencil in the first orthogonal direction containing Plex-node 0,2, Plex-node 1,2, Plex-node 2,2 and Plex-node 3,2. The communication pencil 420 in the first orthogonal direction couples to the plex-nodes of this plex-node pencil. Plex-node 0,2 is coupled 422 to communication pencil 420. Plex-node 1,2 is coupled 424 to communication pencil 420. Plex-node 2,2 is coupled 426 to communication pencil 420. Plex-node 3,2 is coupled 428 to communication pencil 420.

Consider the plex-node pencil in the first orthogonal direction containing Plex-node 0,3, Plex-node 1,3, Plex-node 2,3 and Plex-node 3,3. The communication pencil 430 in the first orthogonal direction couples to the plex-nodes of this plex-node pencil. Plex-node 0,3 is coupled 432 to communication pencil 430. Plex-node 1,3 is coupled 434 to communication pencil 430. Plex-node 2,3 is coupled 436 to communication pencil 430. Plex-node 3,3 is coupled 438 to communication pencil 430.

Three of these ports on each plex-node are devoted to providing a direct interconnect to the other plex-nodes of its row through a collection of communication paths forming the communication pencil in the second orthogonal direction. These plex-nodes belong to the same row as the plex-nodes of the plex-node pencil in the second orthogonal direction.

A plex-node may have at least one additional port. At least one of the additional ports may be connected to an external network. Further, at least one of the additional ports may be connected to an external mass storage system. In other embodiments of the invention, at least one of the additional ports may be connected to an external database system.

A plex-node may contain at least one instruction processor. As used herein, an instruction processor includes but is not limited to instruction set processors, inference engines and analog processors. An instruction set processor refers to instruction processors changing state directly based upon an instruction, and which change an internal state by executing the instruction. The instruction may include, but is not limited to, direct or native instructions and interpreted instructions. An inference engine changes state when presented an instruction, which may include an assertion, an assumption, or an inference rule. Inference engines include, but are not limited to, Horn clause engines such as Prolog requires, constraint based systems and neural network engines. As referred to herein, analog processors include, but are not limited to, optical signal processors, CCD's, and resonant cavity devices responding to data and/or controls asserted in the analog domain.

Communication includes, but is not limited to, communication using a digital communications protocol. Communication also includes a messaging protocol using the digital communications protocol. Communications also includes a messaging protocol supporting TCP-IP, supporting the Internet, and/or supporting the World Wide Web.

Communications may also include at least one video stream protocol using a digital communications protocol. Communications may include at least one multi-media stream protocol using the video stream protocols including motion JPEG and/or at least one form of MPEG.

The invention may support Wavelength Division Multiplex (WDM) through the physical transport of the communication paths of the communication pencils.

Each plex-node may include a communication processor. Each plex-node may further include M communications processors. The ports of each communications processor may be connected to each one of the pencils supporting pencil communications processing.

Figure 7:
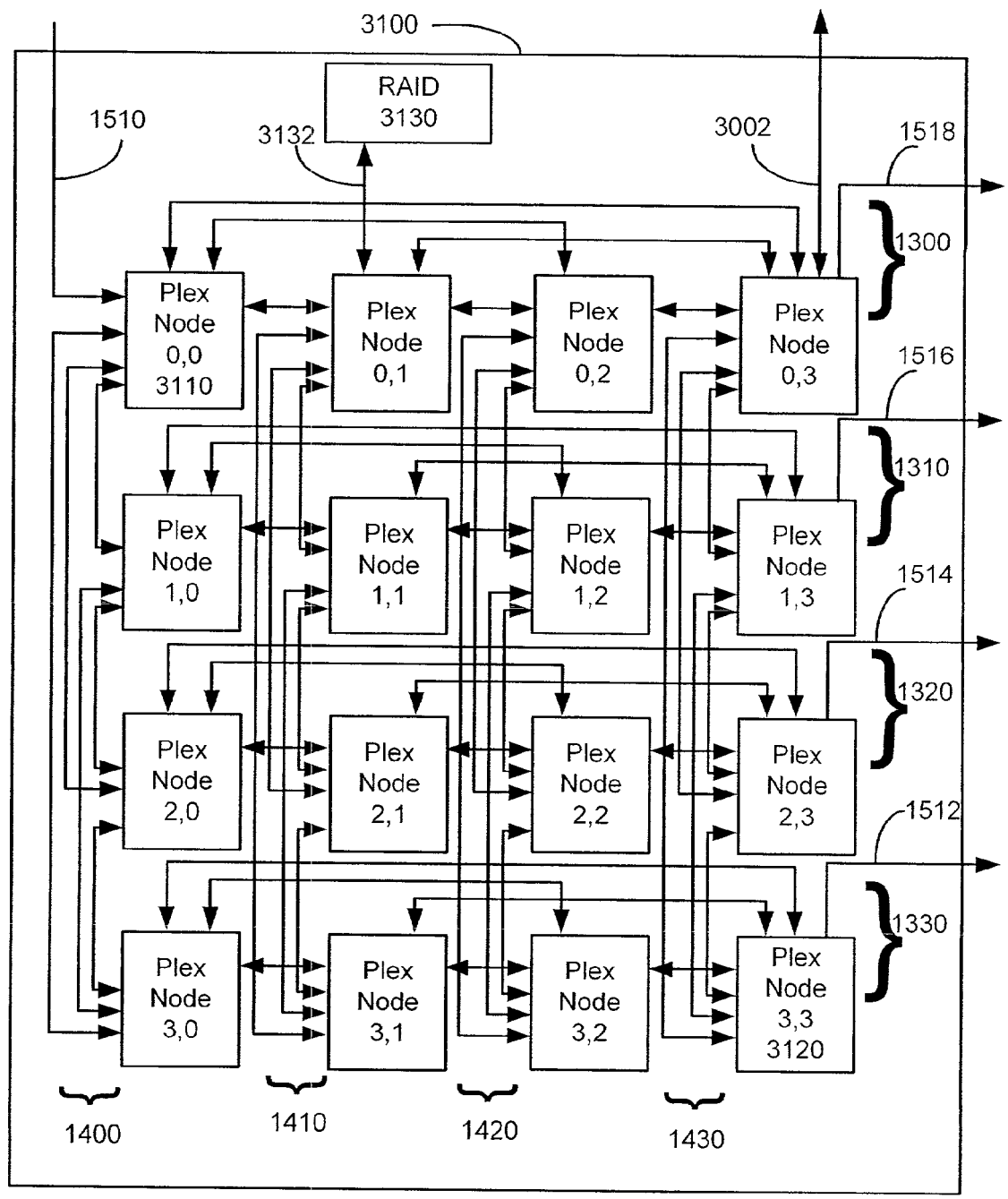
FIG. 7 depicts a gateway 3100 of FIG. 3 implemented in a two-dimensional plex communication network with N=4 plex nodes in each of two orthogonal directions of the node array.

FIG. 7 depicts a gateway 3100 of FIG. 3 implemented in a two-dimensional plex communication network with N=4 plex-nodes in each of two orthogonal directions of the plex-node array.

In FIGS. 6 and 7, upstream signals 1510 may be received at the Plex-node 0,0, performing functions similar in nature to processor node 3110 of FIGS. 3, 4 and 5. Plex-node 0,1 may couple 3142 to RAID 3130 subsystem, providing high-speed access to a high capacity disk farm. Various signals 1512 to 1518 may be generated by various plex-nodes. Note that because of the uniformity of the communication structure, there is great flexibility in choosing which plex-node generates which communication signals.

FIG. 7 also shows coupling 3002 to a speech recognition server array 3200.

Figure 8:
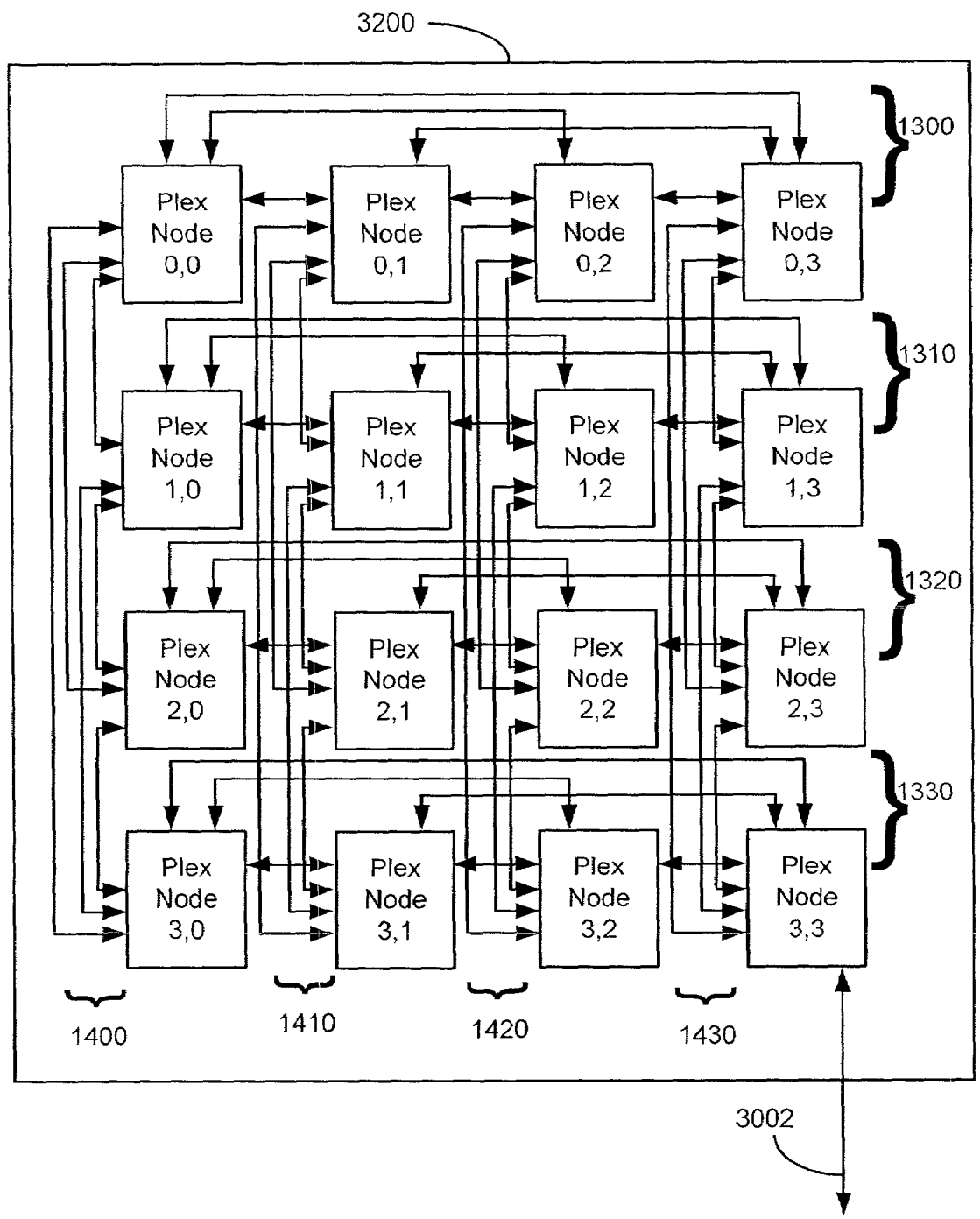
FIG. 8 depicts a coupled server array 3200 of FIG. 3 implemented in a two-dimensional plex communication network with N=4 plex nodes in each of two orthogonal directions of the node array.

FIG. 8 depicts a coupled server array 3200 of FIG. 3 implemented in a two-dimensional plex communication network with N=4 plex-nodes in each of two orthogonal directions of the plex-node array.

Each plex-node of FIG. 8 may include a plex communications network supporting a two or more dimensional array of internal plex-nodes, each including at least one instruction processor.

Figure 9:
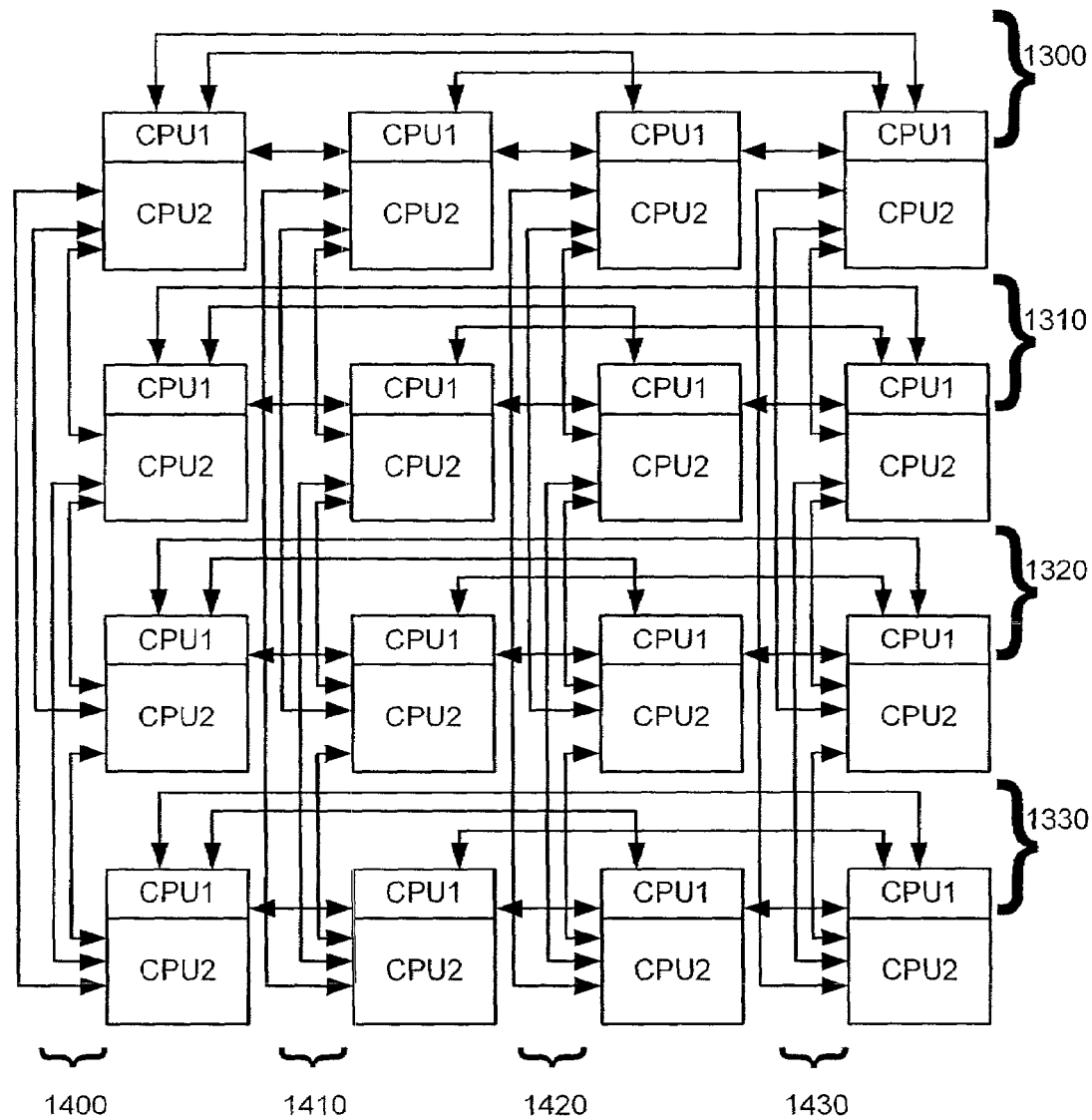
FIG. 9 depicts a simplified block diagram using an array of processors as shown as 3200 in FIG. 3.

FIG. 9 depicts a simplified block diagram using an array of processors as shown as 3200 in FIG. 3.

Consider an array of plex-nodes, where each plex-node uses multiple-processor IC's labeled CPU. Each CPU may possess three or more high speed serial protocol channels C1-3, a high speed interconnect bus B1, a low speed interconnect bus PCI and a local memory access bus R. Each CPU may include at least two processors. Each processor may be an instruction processor. Each CPU may be an integrated circuit. The integrated circuit may be a BCM12500 manufactured by Broadcom Corporation of Irvine, Calif.

CPU1 and CPU2 are locally coupled via at least one of the interconnect buses. Each CPU possesses locally accessible memory via an R bus. Each CPU may further access locally accessible memory via its own R bus. The R bus accessed memory may include DDR SDRAM (Double Data Rate Synchronous DRAM).

Three serial protocol channels for the first CPU of each CPU pair are dedicated to communication within each row of CPU pairs. Three serial protocol channels for the second CPU of each CPU pair are dedicated to communication within each column of CPU pairs.

Assume each CPU contains at least two processors. Assume each processor is operating at K billion integer operations/second and L billion floating point operations/second. Assume the high speed serial channels support a gigabit/second bidirectional transfer rates. The DDR DRAMs support M gigabyte/second access rates. This system provides 64*K billion integer operations, 64*L billion floating point operations, 128 gigabits/second interconnect communication bandwidth throughout the array through the high speed serial channels, as well as 64*M gigabytes/second local memory access. By decoupling the tasks running on each processor, making them independent and concurrent, this system architecture achieves the dream of Multiple-Instruction Multiple Datapath computing (MIMD), providing essentially linear speed up with the increase in processors for up to 64 processors.

Such architectures can support each processor generating a frame in a local frame buffer and rendering it into a motion video stream, which is merged into a multiplexed video content stream suitable for a variety of multi-media applications. This apparatus meets or exceeds the requirements of a number of teraflop-class computing applications, which today have no cost effective solution. Note that the processors may each be dual instruction processors housed in a single package.

Each of these arrays will process over 1K speakers concurrently and fit into a single rack mount enclosure. Standard 72 inch, tall racks could then hold 4 such speech engines, also known herein as an AVPU, supporting up to 140,000 subscribers. Each server contains at least dual, redundant, hot-swappable power supplies, and redundant, hot-swappable disks with automatic recovery for failed disk drives. The hot-swappable power supplies may further be half-sized, each supporting the power requirements of half the server engine.

Real-time, extensive diagnostics and continuous connectivity to a 24 hours per day, seven days per week (24×7) Network Operations Center insuring timely failure detection and service dispatch. In systems with more than one speech engine, the server automatically handles catastrophic failures gracefully. Even if an entire speech engine fails, the remaining ones pick up the workload.

Figure 10:
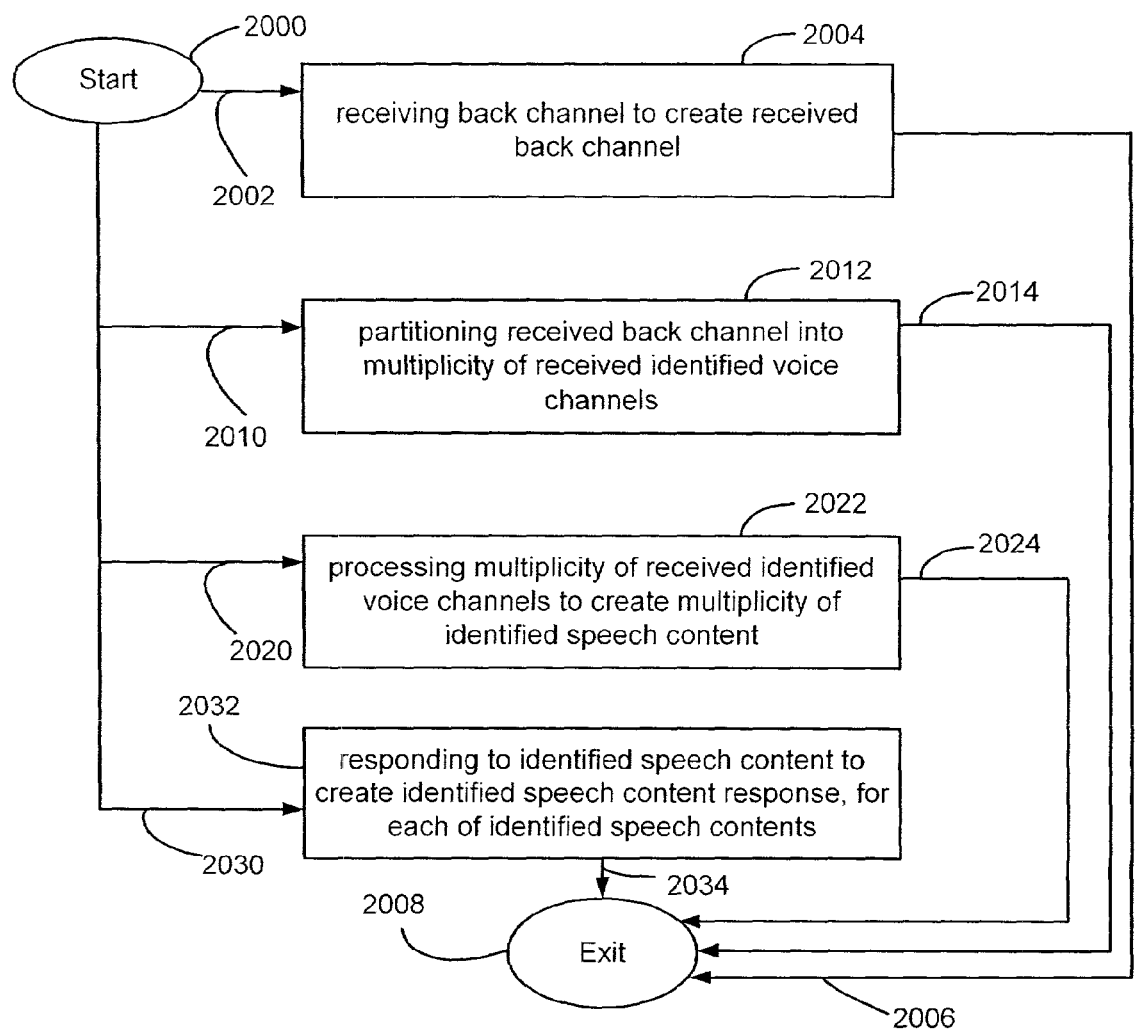
FIG. 10 depicts a flowchart of a method using a back channel from a multiplicity of user sites containing a multiplicity of identified speech channels presented to a speech processing system at a wireline node in a network supporting cable television delivery in accordance with the invention.

FIG. 10 depicts a flowchart of a method that uses a back channel containing a multiplicity of identified speech channels for speech recognition at a wireline node in a network supporting video or cable television delivery in accordance with the invention. The back channel is from a multiplicity of user sites and is presented to a speech processing system at the wireline node in the network. The speech processing system performs the operations of the method.

Operation 2000 starts the operations of this flowchart. Arrow 2002 directs the flow of execution from operation 2000 to operation 2004. Operation 2004 performs receiving the back channel to create a received back channel. Arrow 2006 directs execution from operation 2004 to operation 2008. Operation 2008 terminates the operations of this flowchart.

Arrow 2010 directs the flow of execution from starting operation 2000 to operation 2012. Operation 2012 performs partitioning the received back channel into a multiplicity of received identified speech channels. Arrow 2014 directs execution from operation 2012 to operation 2008. Operation 2008 terminates the operations of this flowchart.

Arrow 2020 directs the flow of execution from starting operation 2000 to operation 2022. Operation 2022 performs processing the multiplicity of the received identified speech channels to create a multiplicity of identified speech content. Arrow 2024 directs execution from operation 2022 to operation 2008. Operation 2008 terminates the operations of this flowchart.

Arrow 2030 directs the flow of execution from starting operation 2000 to operation 2032. Operation 2032 performs responding to the identified speech content to create an identified speech content response, for each of the multiplicity of the identified speech contents. Arrow 2034 directs execution from operation 2032 to operation 2008. Operation 2008 terminates the operations of this flowchart.

Portions of the flowchart of FIG. 10 related to operations 2022 and 2032 may operate a speech processing system coupled to a wireline node in a network. The wireline node provides multiple received identified speech channels to the speech processing system. The received identified speech channels are based upon a received back channel at the wireline node from multiple user sites coupled to the network. The network supports video delivery to the user sites and/or cable television delivery to the user sites.

The speech processing system may include at least one computer. Operations 2022 and 2032 may be implemented as program steps of a program system operating at least part of the computers included in the speech processing system. Implementations of these operations as program steps may reside in memory accessibly coupled to at least one computer in the speech processing system.

Note that operations 2002 and 2012 may be implemented in hardware and/or implemented as program steps used in operating computers located at the wireline node. Such computers may or may not be part of the speech processing system.

At least one, and possibly all, of the identified speech channels may have an associated user site.

Figure 11A:
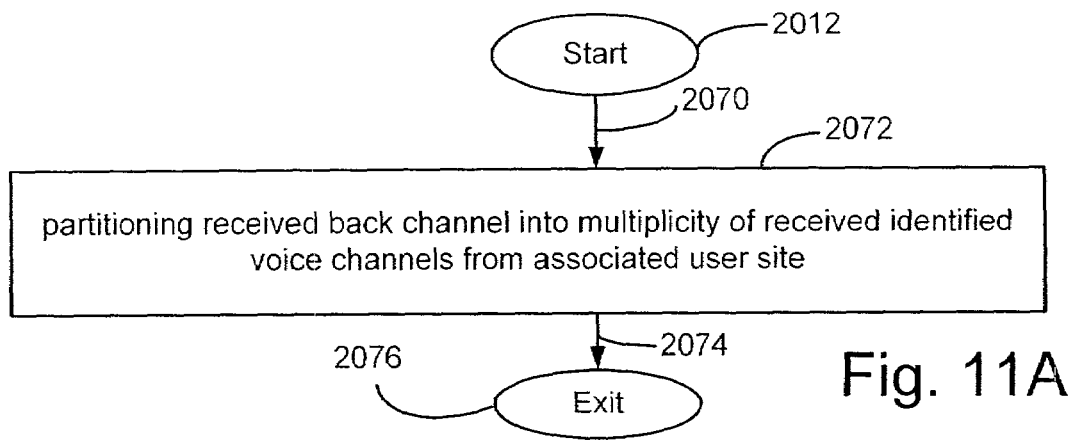
FIG. 11A depicts a detail flowchart of operation 2012 of FIG. 10 further partitioning of the received back channel.

FIG. 11A depicts a detail flowchart of operation 2012 of FIG. 10 further partitioning the received back channel.

Arrow 2070 directs the flow of execution from starting operation 2012 to operation 2072. Operation 2072 performs partitioning the received back channel into a multiplicity of received identified speech channels from the associated user site. Arrow 2074 directs execution from operation 2072 to operation 2076. Operation 2076 terminates the operations of this flowchart.

Figure 11B:
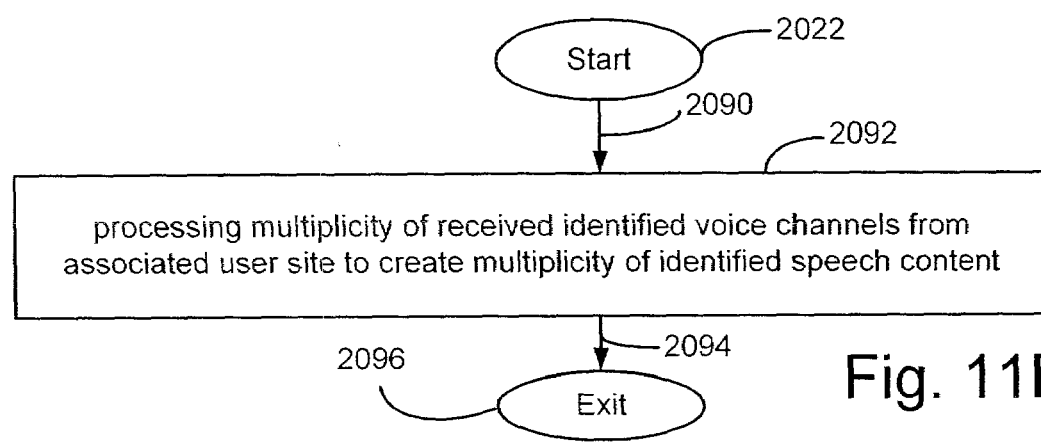
FIG. 11B depicts a detail flowchart of operation 2022 of FIG. 10 further processing the multiplicity of the received identified speech channels.

FIG. 11B depicts a detail flowchart of operation 2022 of FIG. 10 further processing the multiplicity of the received identified speech channels.

Arrow 2090 directs the flow of execution from starting operation 2022 to operation 2092. Operation 2092 performs processing the multiplicity of the received identified speech channels from the associated user site to create multiple identified speech contents. Arrow 2094 directs execution from operation 2092 to operation 2096. Operation 2096 terminates the operations of this flowchart.

Figure 11C:
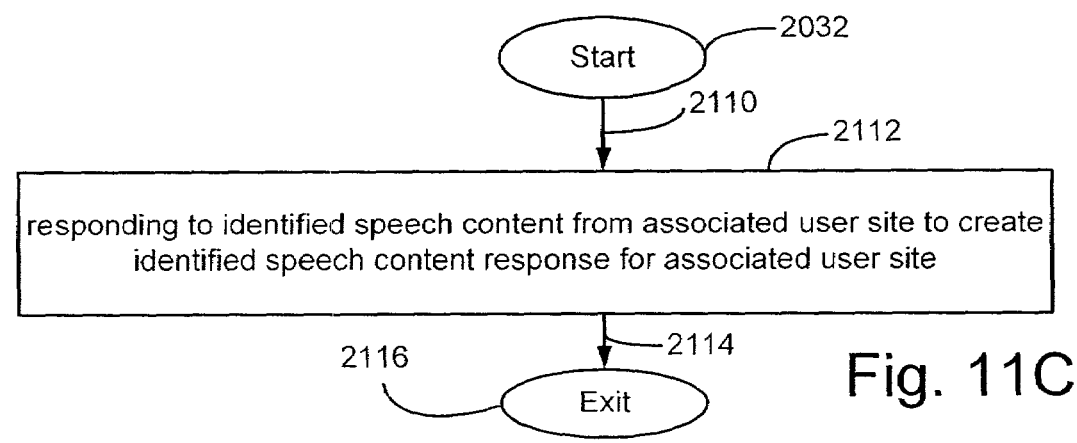
FIG. 11C depicts a detail flowchart of operation 2032 of FIG. 10 further responding to the identified speech content.

FIG. 11C depicts a detail flowchart of operation 2032 of FIG. 10 further responding to the identified speech content.

Arrow 2110 directs the flow of execution from starting operation 2032 to operation 2112. Operation 2112 performs responding to the identified speech content from the associated user site to create the identified speech content response for the associated user site. Arrow 2114 directs execution from operation 2112 to operation 2116. Operation 2116 terminates the operations of this flowchart.

Figure 12:
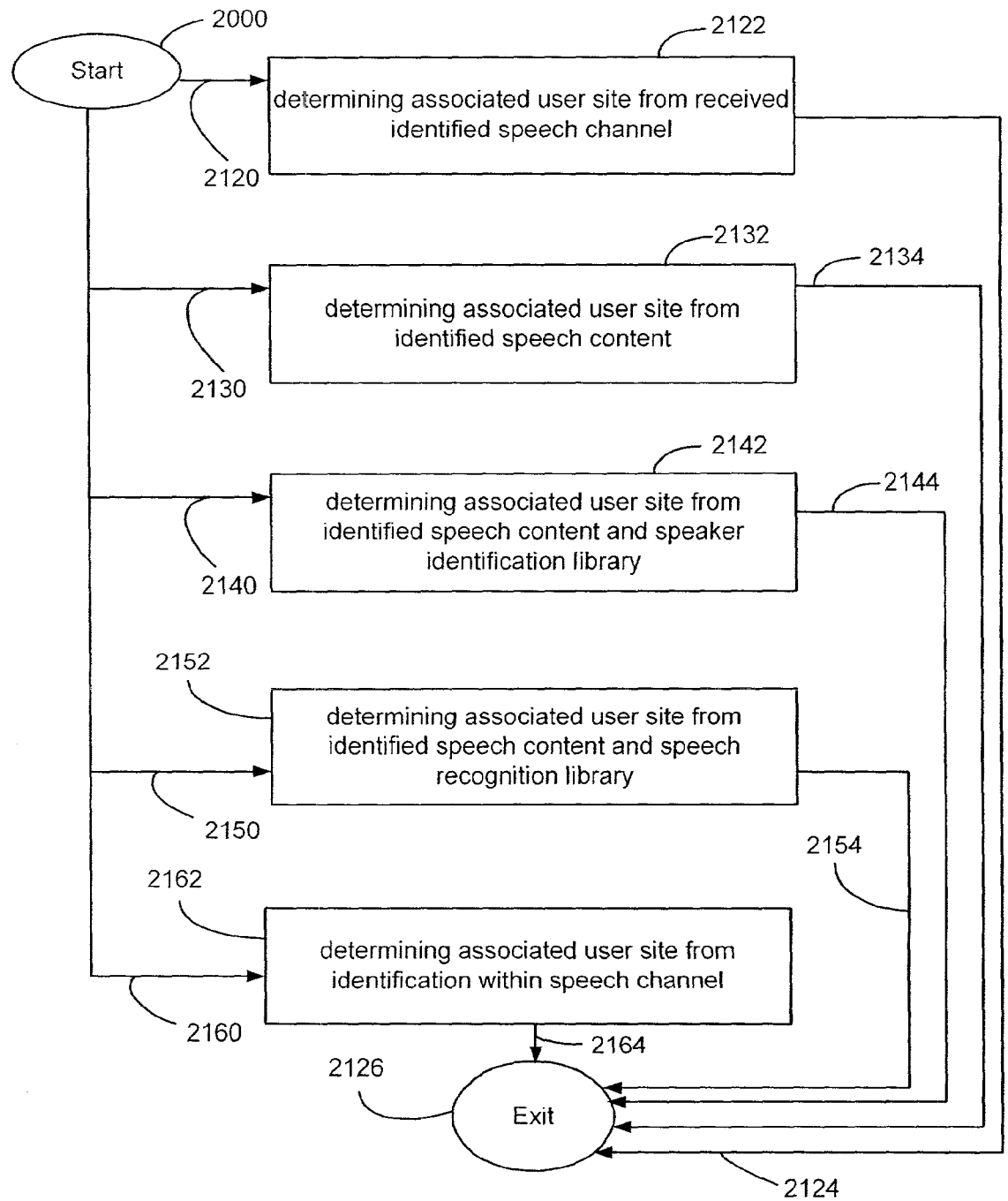
FIG. 12 depicts a detail flowchart of operation 2000 of FIG. 10 further performing the method using the back channel from multiple user sites.

FIG. 12 depicts a detail flowchart of operation 2000 of FIG. 10 further performing the method using the back channel from multiple user sites.

Arrow 2120 directs the flow of execution from starting operation 2000 to operation 2122. Operation 2122 performs determining the associated user site from the received identified speech channel. Arrow 2124 directs execution from operation 2122 to operation 2126. Operation 2126 terminates the operations of this flowchart.

Arrow 2130 directs the flow of execution from starting operation 2000 to operation 2132. Operation 2132 performs determining the associated user site from the identified speech content. Arrow 2134 directs execution from operation 2132 to operation 2126. Operation 2126 terminates the operations of this flowchart.

Arrow 2140 directs the flow of execution from starting operation 2000 to operation 2142. Operation 2142 performs determining the associated user site from the identified speech content and a speaker identification library. Arrow 2144 directs execution from operation 2142 to operation 2126. Operation 2126 terminates the operations of this flowchart.

Arrow 2150 directs the flow of execution from starting operation 2000 to operation 2152. Operation 2152 performs determining the associated user site from the identified speech content and a speech recognition library. Arrow 2154 directs execution from operation 2152 to operation 2126. Operation 2126 terminates the operations of this flowchart.

Arrow 2160 directs the flow of execution from starting operation 2000 to operation 2162. Operation 2162 performs determining the associated user site from an identification within the speech channel. Arrow 2164 directs execution from operation 2162 to operation 2126. Operation 2126 terminates the operations of this flowchart.

Note that the determination of the associated user site may be provided by an identification within the speech channel. By way of example, a technician may be recognizable at many user sites, and may identify the user site as Room 432 or 10 Main Street in the process of activities at that user site.

The invention can include at least one of the operations 2120, 2132, 2142, 2152 and 2162.

Figure 13A:
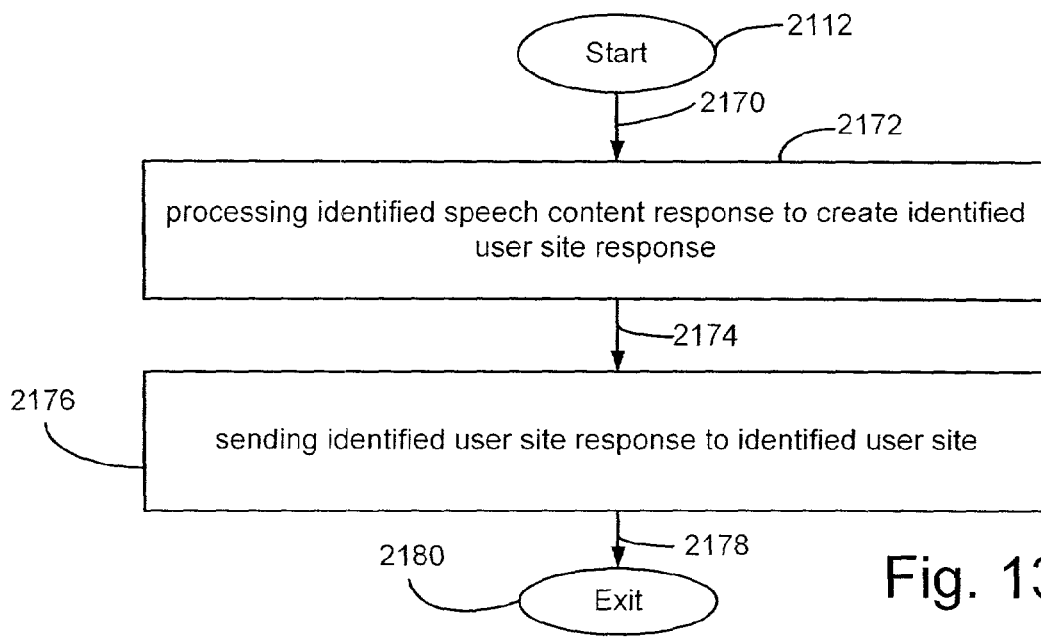
FIG. 13A depicts a detail flowchart of operation 2112 of FIG. 11C further responding to the identified speech content.

FIG. 13A depicts a detail flowchart of operation 2112 of FIG. 11C further responding to identified speech contents.

Arrow 2170 directs the flow of execution from starting operation 2112 to operation 2172. Operation 2172 performs processing the identified speech content response to create the identified user site response. Arrow 2174 directs execution from operation 2172 to operation 2176. Operation 2176 performs sending the identified user site response to the identified user site. Arrow 2178 directs execution from operation 2176 to operation 2180. Operation 2180 terminates the operations of this flowchart.

Figure 13B:
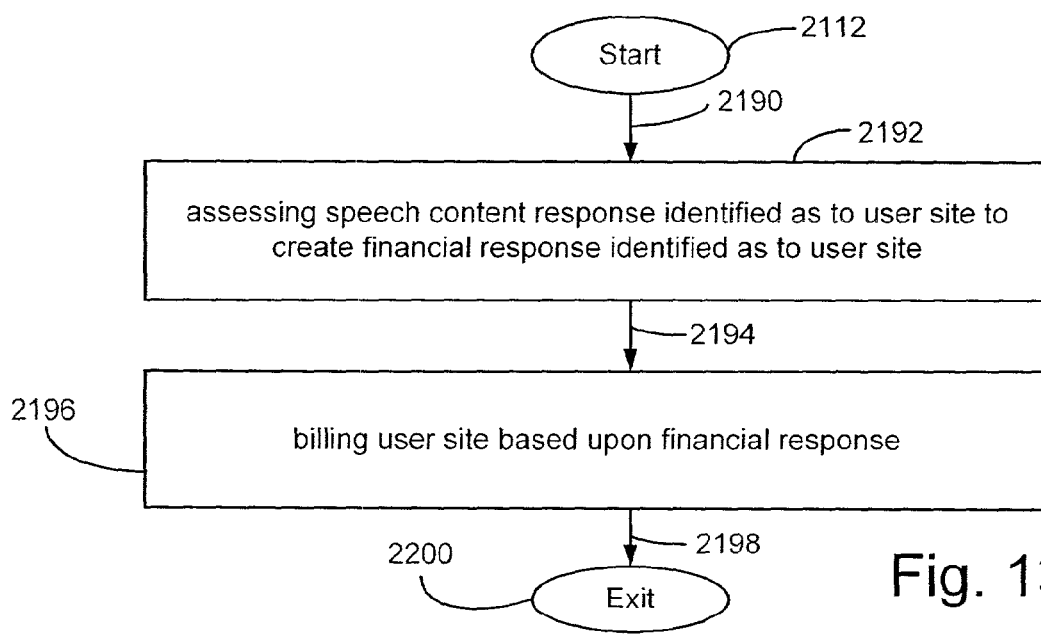
FIG. 13B depicts a detail flowchart of operation 2112 of FIG. 11C further responding to the speech content.

FIG. 13B depicts a detail flowchart of operation 2112 of FIG. 11C further responding to the identified speech content.

Arrow 2190 directs the flow of execution from starting operation 2112 to operation 2192. Operation 2192 performs assessing the speech content response identified as to the user site to create a financial consequence identified as to the user site. Arrow 2194 directs execution from operation 2192 to operation 2196. Operation 2196 performs billing the user site based upon the financial consequence. Arrow 2198 directs execution from operation 2196 to operation 2200. Operation 2200 terminates the operations of this flowchart.

Figure 14:
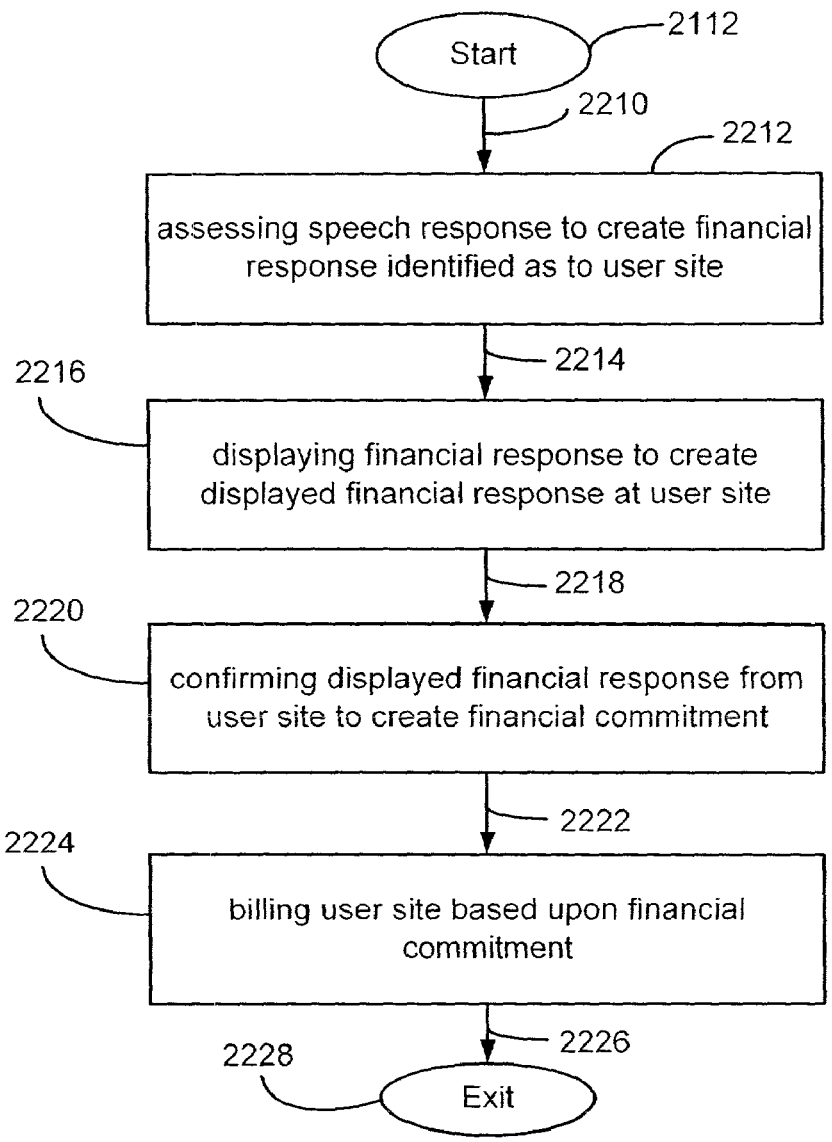
FIG. 14 depicts a detail flowchart of operation 2112 of FIG. 11C further responding to the identified speech content from the associated user site.

FIG. 14 depicts a detail flowchart of operation 2112 of FIG. 11C further responding to the identified speech content from the associated user site.

Arrow 2210 directs the flow of execution from starting operation 2112 to operation 2212. Operation 2212 performs assessing the speech response to create a financial consequence identified as to the user site. Arrow 2214 directs execution from operation 2212 to operation 2216. Operation 2216 performs displaying the financial consequence to create a displayed financial consequence at the user site. Arrow 2218 directs execution from operation 2216 to operation 2220. Operation 2220 performs confirming the displayed financial consequence from the user site to create a financial commitment. Arrow 2222 directs execution from operation 2220 to operation 2224. Operation 2224 performs billing the user site based upon the financial commitment. Arrow 2226 directs execution from operation 2224 to operation 2228. Operation 2228 terminates the operations of this flowchart.

Figure 15A:
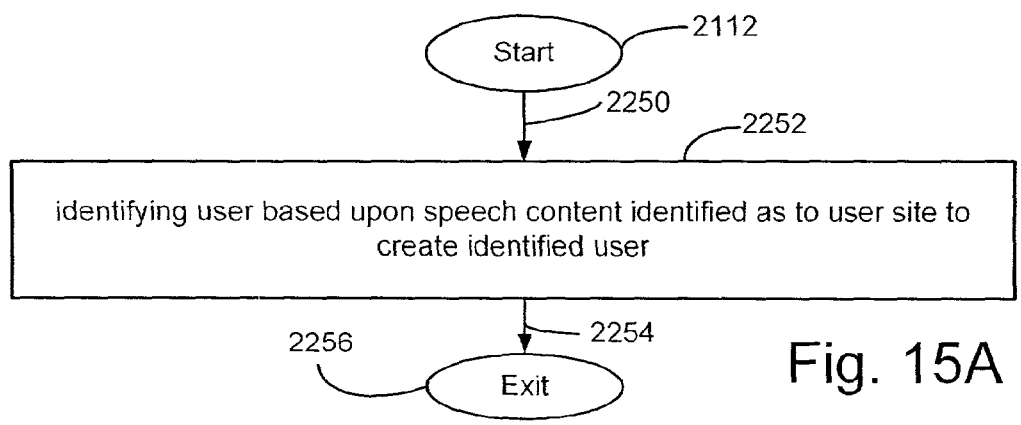
FIG. 15A depicts a detail flowchart of operation 2112 of FIG. 11C further responding to the identified speech content from the associated user site.

FIG. 15A depicts a detail flowchart of operation 2112 of FIG. 11C further responding to the identified speech content from the associated user site.

Arrow 2250 directs the flow of execution from starting operation 2112 to operation 2252. Operation 2252 performs identifying a user based upon the speech content identified with the user site to create an identified user. Arrow 2254 directs execution from operation 2252 to operation 2256. Operation 2256 terminates the operations of this flowchart.

Figure 15B:
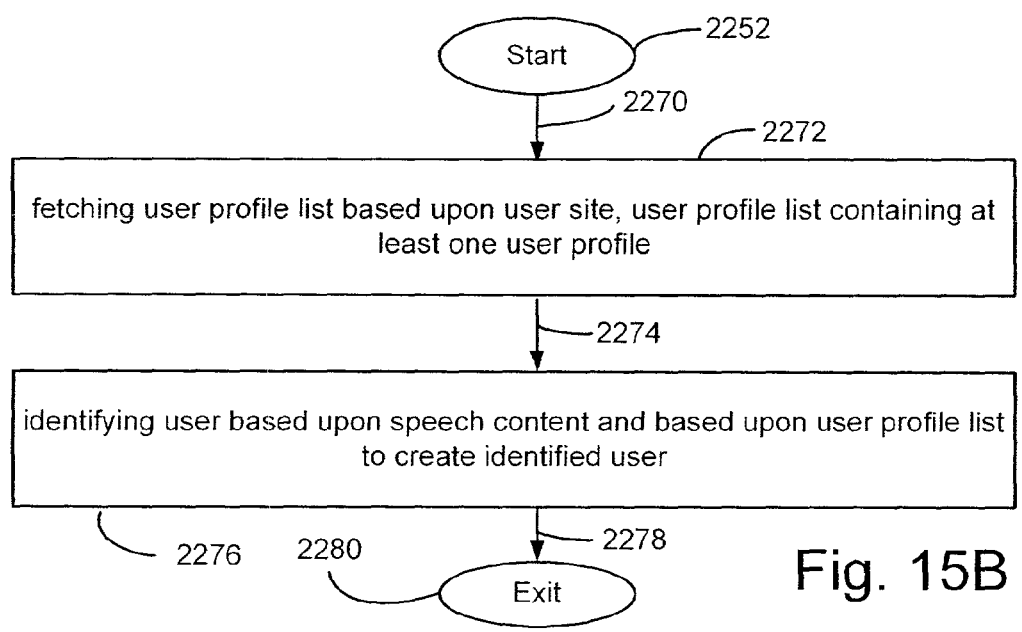
FIG. 15B depicts a detail flowchart of operation 2252 of FIG. 15A identifying the user.

FIG. 15B depicts a detail flowchart of operation 2252 of FIG. 15A further identifying the user.

Arrow 2270 directs the flow of execution from starting operation 2252 to operation 2272. Operation 2272 performs fetching a user profile list based upon the user site and the user profile list containing at least one user profile. Arrow 2274 directs execution from operation 2272 to operation 2276. Operation 2276 performs identifying the user based upon the speech content and based upon the user profile list to create an identified user. Arrow 2278 directs execution from operation 2276 to operation 2280. Operation 2280 terminates the operations of this flowchart.

Figure 16:
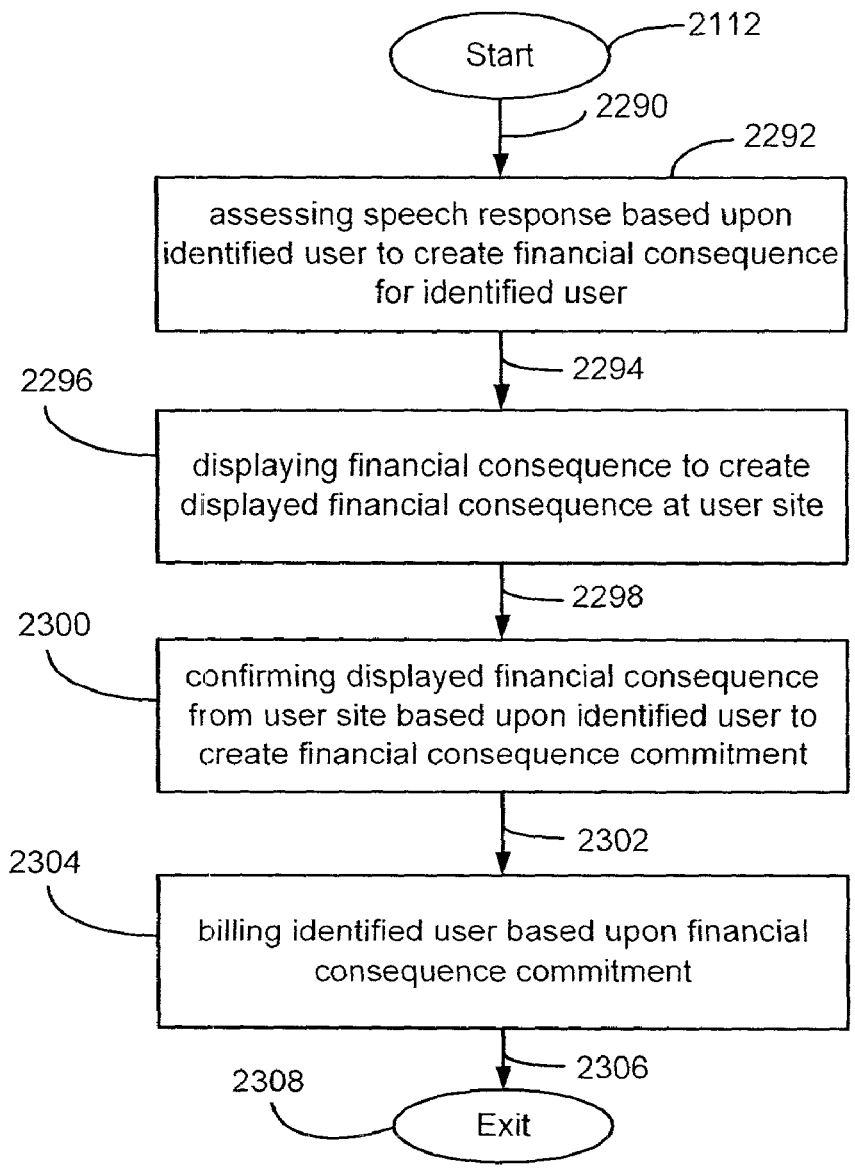
FIG. 16 depicts a detail flowchart of operation 2112 of FIG. 11C further responding to the identified speech content from the associated user site.

FIG. 16 depicts a detail flowchart of operation 2112 of FIG. 11C further responding to the identified speech content from the associated user site.

Arrow 2290 directs the flow of execution from starting operation 2112 to operation 2292. Operation 2292 performs assessing the speech response based upon the identified user to create a financial consequence for the identified user. Arrow 2294 directs execution from operation 2292 to operation 2296. Operation 2296 performs displaying the financial consequence to create a displayed financial consequence at the user site. Arrow 2298 directs execution from operation 2296 to operation 2300. Operation 2300 performs confirming the displayed financial consequence from the user site based upon the identified user to create a financial commitment. Arrow 2302 directs execution from operation 2300 to operation 2304. Operation 2304 performs billing the identified user based upon the financial commitment. Arrow 2306 directs execution from operation 2304 to operation 2308. Operation 2308 terminates the operations of this flowchart.

Figure 17B:
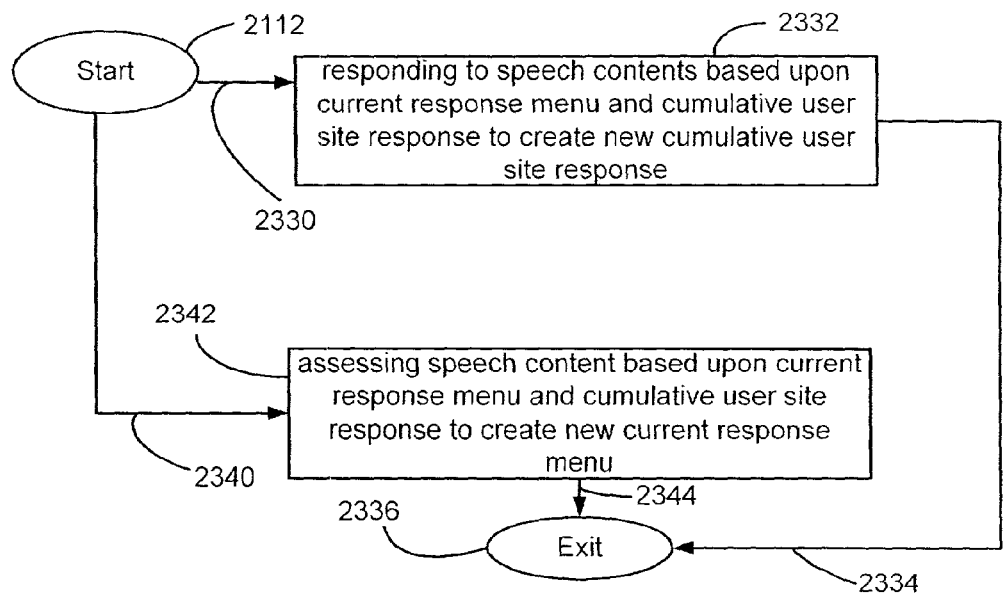
FIG. 17B depicts a detail flowchart of operation 2112 of FIG. 11C further responding to the identified speech content from the associated user site.
Figure 17A:
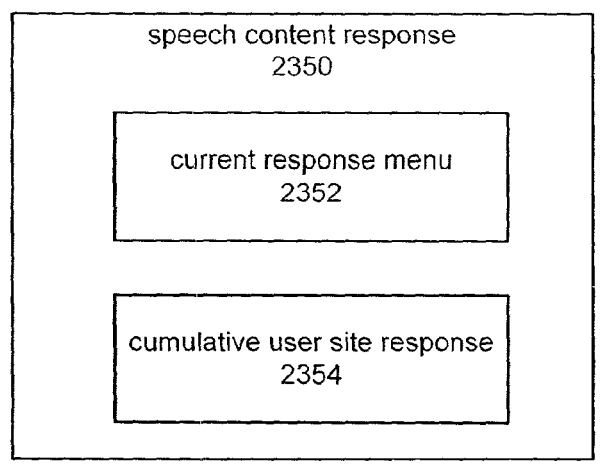
FIG. 17A depicts the speech content response 2350 including current response menu 2352 and cumulative user site response 2354 in accordance with the invention.

FIG. 17A depicts the speech content response 2350, including the current response menu 2352 and the cumulative user site response 2354, in accordance with the invention.

The speech content response may include a current response menu and a cumulative user site response identified as to the user site for at least one of the user sites.

FIG. 17B depicts a detail flowchart of operation 2112 of FIG. 11C further responding to the identified speech content from the associated user site.

Arrow 2330 directs the flow of execution from starting operation 2112 to operation 2332. Operation 2332 performs responding to the speech contents based upon the current response menu and based upon the cumulative user site response to create a new cumulative user site response. Arrow 2334 directs execution from operation 2332 to operation 2336. Operation 2336 terminates the operations of this flowchart.

Arrow 2340 directs the flow of execution from starting operation 2112 to operation 2342. Operation 2342 performs assessing the speech contents based upon the current response menu and based upon the cumulative user site response to create a new current response menu. Arrow 2344 directs execution from operation 2342 to operation 2336. Operation 2336 terminates the operations of this flowchart.

At least one of operations 2332 or 2342 may be performed.

Figure 18A:
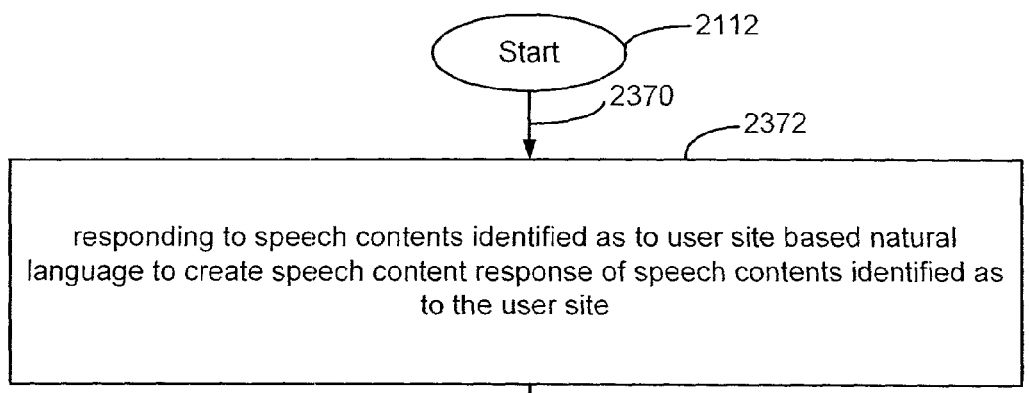
FIG. 18A depicts a detail flowchart of operation 2112 of FIG. 11C further responding to the identified speech content from the associated user site.

FIG. 18A depicts a detail flowchart of operation 2112 of FIG. 11C further responding to the identified speech content from the associated user site.

Arrow 2370 directs the flow of execution from starting operation 2112 to operation 2372. Operation 2372 performs responding to the speech content, identified as to the user site, based upon a natural language, to create a speech content response of the speech content identified as to user site. Arrow 2374 directs execution from operation 2372 to operation 2376. Operation 2376 terminates the operations of this flowchart.

Figure 18B:
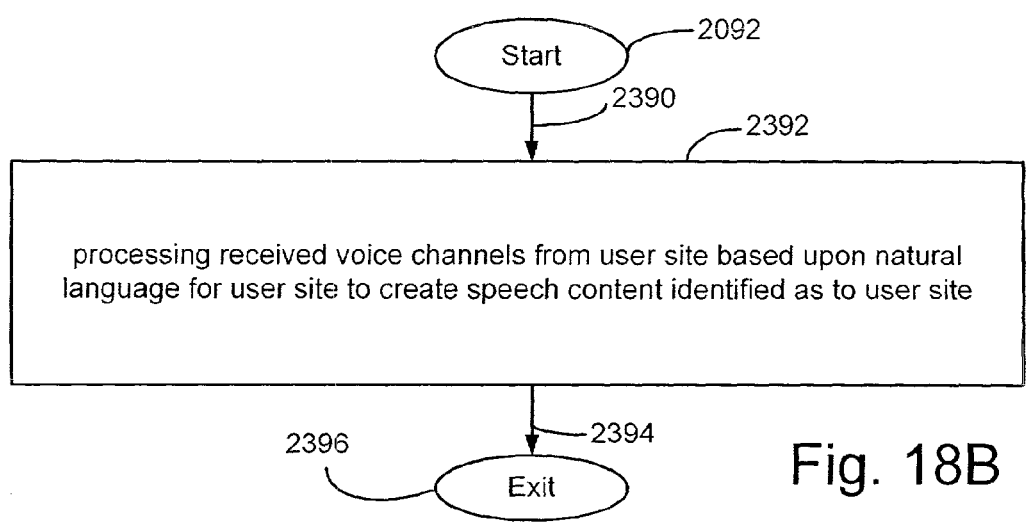
FIG. 18B depicts a detail flowchart of operation 2092 of FIG. 11B further processing the multiplicity of the received speech channels.

FIG. 18B depicts a detail flowchart of operation 2092 of FIG. 11B further processing the multiplicity of the received speech channels.

Arrow 2390 directs the flow of execution from starting operation 2092 to operation 2392. Operation 2392 performs processing the received speech channels from the user site based upon a natural language for the user site to create the speech content identified as to the user site. Arrow 2394 directs execution from operation 2392 to operation 2396. Operation 2396 terminates the operations of this flowchart.

Figure 19A:
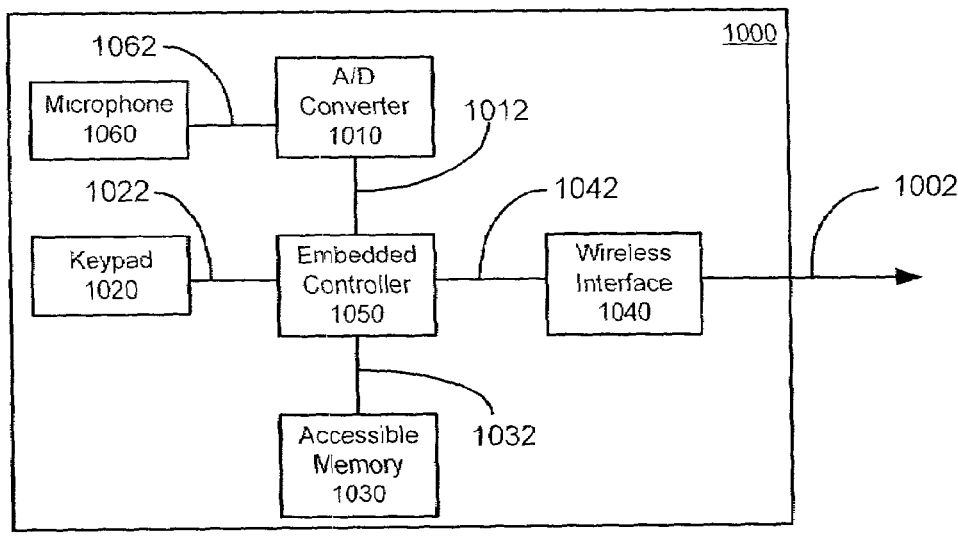
FIG. 19A depicts a simplified block diagram of a hand held remote 1000, containing microphone 1060 and keypad 1020 supporting user input which is organized and processed by embedded controller 1050 for communication by wireless interface 1040 coupled 1002 to set-top apparatus 1100, as shown in FIG. 3.

FIG. 19A depicts a simplified block diagram of a hand held remote 1000, containing microphone 1060 and keypad 1020 supporting user input organized and processed by embedded controller 1050 for communication by wireless interface 1040 coupled 1002 to set-top apparatus 1100, as shown in FIG. 3.

Figure 19B:
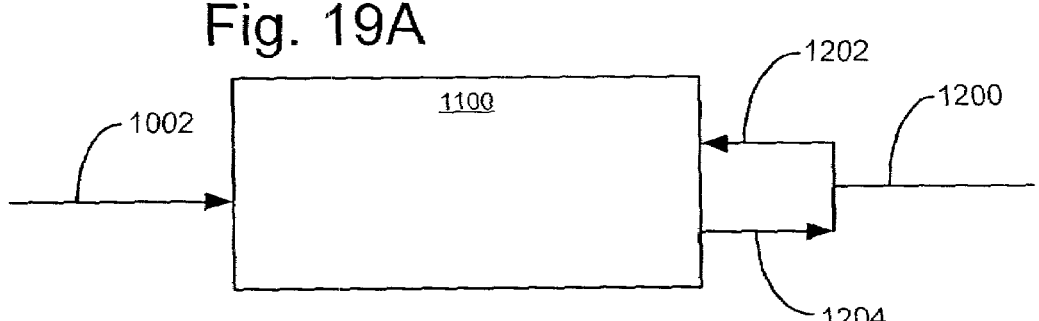
FIG. 19B depicts a simplified block diagram of set-top apparatus 1100 as shown in FIG. 3 showing coupling 1002 and first wireline physical transport 1200 further comprised of downlink coupling 1202 and uplink coupling 1204.

FIG. 19B depicts a simplified block diagram of set-top apparatus 1100 as shown in FIG. 3 showing coupling 1002 and first wireline physical transport 1200 comprised of downlink coupling 1202 and uplink coupling 1204.

Note that microphone 1060 may include more than one audio-sensor and/or a microphone array of two or more microphone units.

Figure 19C:
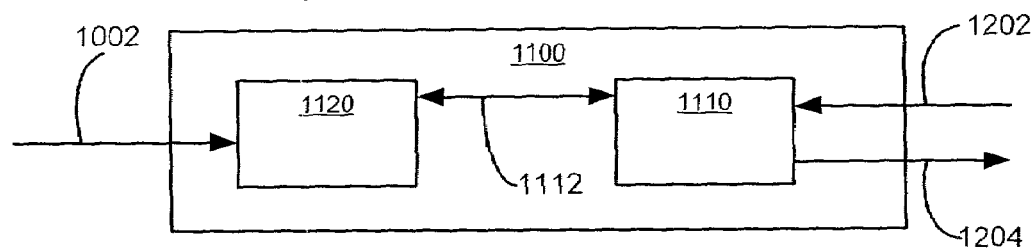
FIG. 19C further depicts set-top apparatus 1100 as shown in FIG. 19B containing a set-top appliance 1120 coupled 1002 with hand held remote 1000 and coupled 1112 with set-top box 1120 possessing downlink coupling 1202 and uplink coupling 1204.

FIG. 19C further depicts set-top apparatus 1100 as shown in FIG. 19B containing a set-top appliance 1120 coupled 1002 with hand held remote 1000. Set-top appliance 1120 is coupled 1112 with set-top box 1110 possessing downlink coupling 1202 and uplink coupling 1204.

Figure 19D:
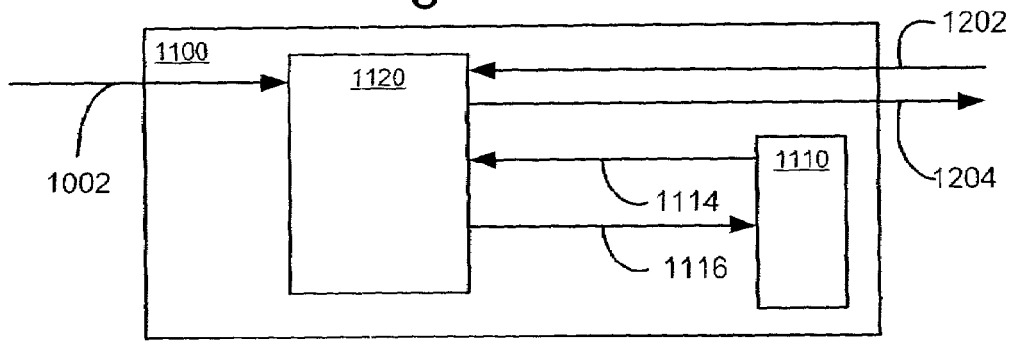
FIG. 19D further depicts set-top apparatus 1100 as shown in FIG. 19B containing a set-top appliance 1120 coupled 1002 with hand held remote 1000 and possessing downlink coupling 1202 and uplink coupling 1204 as well as providing processed downlink coupling 1114 to set-top box 1110 and receiving initial uplink coupling 1112 from set-top box 1110.

FIG. 19D further depicts set-top apparatus 1100 as shown in FIG. 19B containing a set-top appliance 1120 coupled 1002 with hand held remote 1000 and possessing downlink coupling 1202 and uplink coupling 1204. Set-top appliance 1120 provides processed downlink coupling 1114 to set-top box 1110 and receives initial uplink coupling 1112 from set-top box 1110.

Regarding FIG. 19A–19D, the following observations may be made.

The invention supports uni-directional communication via coupling 1002, supporting communicative transfer from the remote 1000 via coupling 1002 to set-top apparatus 1100.

The invention supports bi-directional communication via coupling 1002. Note that noise-canceling microphones 1060 may use bi-directional communication on coupling 1002. Noise cancellation may be performed within set-top apparatus 1100, by at least one of the set-top box 1110 and set-top appliance 1120.

Wireless interface 1040 interacts with coupling 1002. Coupling 1002 may use a wireless transport, including, but not limited to, at least one of infra-red, microwave or radio frequency spectrum regions, as well as ultrasonic signaling. Embedded controller 1050 controls 1042 wireless interface 1040. Embedded controller 1150 communicates via 1042 with wireless interface 1040 to direct communication across coupling 1002.

Figure 20A:
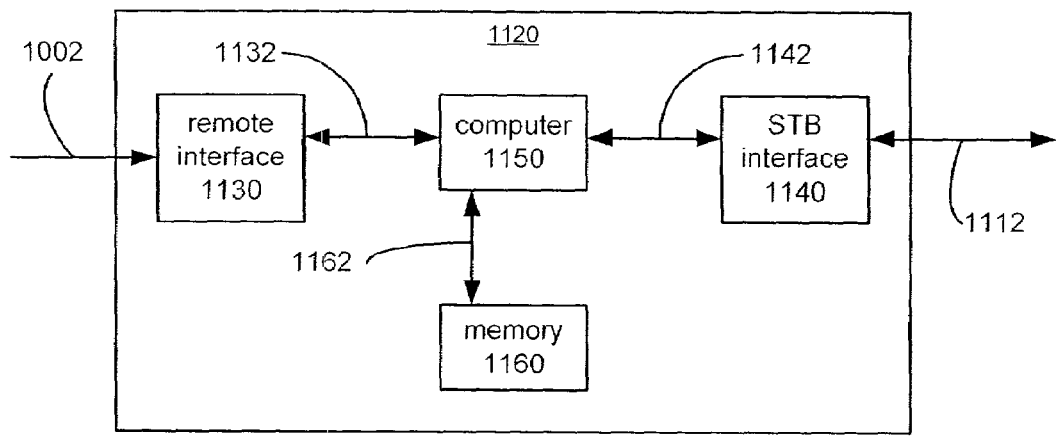
FIG. 20A depicts a simplified block diagram of set-top appliance 1120 as shown in FIG. 19C supporting coupling 1002 with hand held remote 1000 and coupling 1112 with set-top box 1110.

FIG. 20A depicts a simplified block diagram of set-top appliance 1120 as shown in FIG. 19C supporting coupling 1002 with hand held remote 1000 and coupling 1112 with set-top box 1110.

Computer 1150 is coupled 1132 to remote interface 1130 and also coupled 1142 to set-top box interface 1140. Computer 1150 executes a program system including program steps residing in accessibly coupled 1162 memory 1160.

The program system executed by computer 1150 includes program steps maintaining hand held remote 1000 communication through remote interface 1130 and maintaining set-top box 1120 communication through set-top box interface 1140.

Remote interface 1130 couples 1002 with hand held remote 1000 (not shown in FIG. 20A).

Remote interface 1130 incorporates the necessary device or devices to provide communications using the embodiment's physical transport layer.

Set-top box interface 1140 couples 1112 with set-top box 1120, as shown in FIG. 19C. Coupling 1112 may use a wireline or wireless physical transport. Coupling 1112 may use a wireless transport, including, but not limited to, at least one of the infra-red, microwave or radio frequency spectrum, as well as ultrasonic signaling. Set-top box interface 1140 incorporates the necessary device or devices to provide communications using the embodiment's physical transport layer.

Figure 20B:
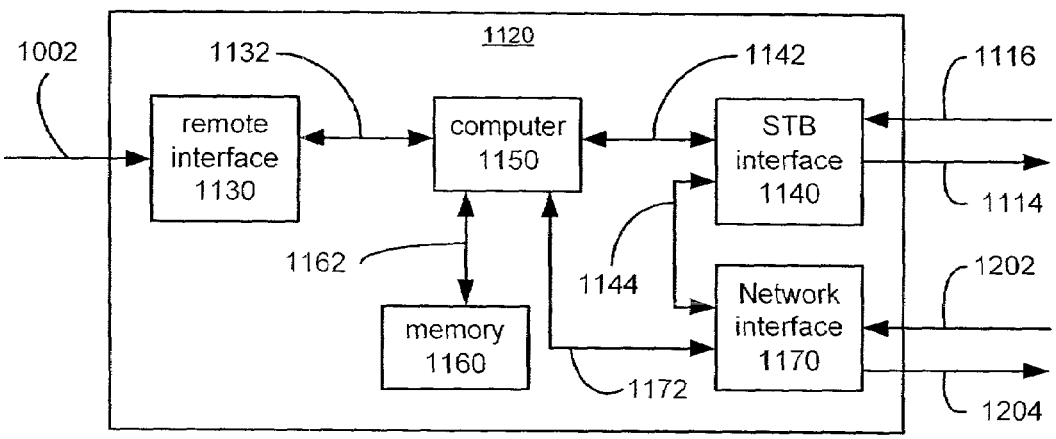
FIG. 20B depicts a simplified block diagram of set-top appliance 1120 as shown in FIG. 19D supporting coupling 1002 with hand held remote 1000 and couplings 1112 and 1114 with set-top box 1110.

FIG. 20B depicts a simplified block diagram of set-top appliance 1120 as shown in FIG. 19D supporting coupling 1002 with hand held remote 1000 and couplings 1112 and 1114 with set-top box 1110.

Set-top box interface 1140 provides processed downlink coupling 1114 to set-top box 1110 and receives initial uplink coupling 1112 from set-top box 1110 as shown in FIG. 19D. Set-top box interface 1140 incorporates the necessary device or devices to provide these communications.

Figure 20C:
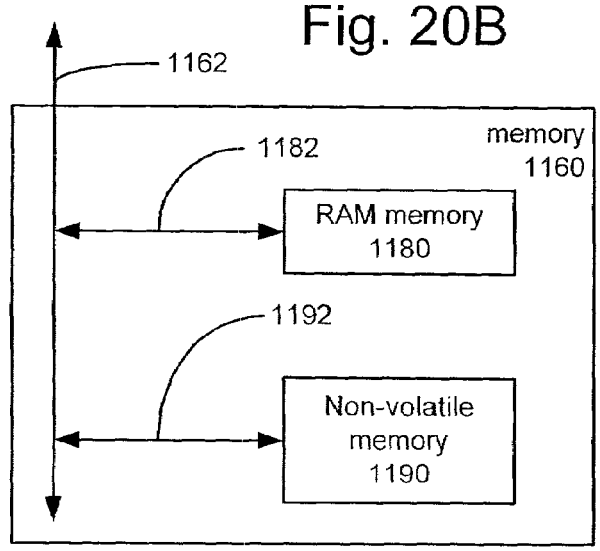
FIG. 20C depicts a block diagram further depicting accessibly coupled 1162 memory 1160 as shown in FIGS. 20A and 20B.

FIG. 20C depicts a block diagram further depicting accessibly coupled 1162 memory 1160 as shown in FIGS. 20A and 20B.

Accessibly coupled 1162 memory 1160 may contain RAM memory 1180 coupled 1182 to computer 1150. Accessibly coupled memory 1160 may include more than one RAM memory 1180. Distinct RAM memories 1180 may be distinctly coupled to computer 1150. One or more RAM memories 1180 may act as a cache memory for computer 1150.

Accessibly coupled 1162 memory 1160 may contain non-volatile memory 1190 coupled 1192 to computer 1150. Accessibly coupled memory 1160 may include more than one non-volatile memory 1190. Distinct non-volatile memories 1190 may be distinctly coupled to computer 1150. A non-volatile memory may be organized as file management system.

Note that the coupling 1182 of RAM memory 1180 may be distinct from coupling 1192 of non-volatile memory 1190 with computer 1150. Either RAM memory and/or non-volatile memory components may be packaged with computer 1150.

Figure 21:
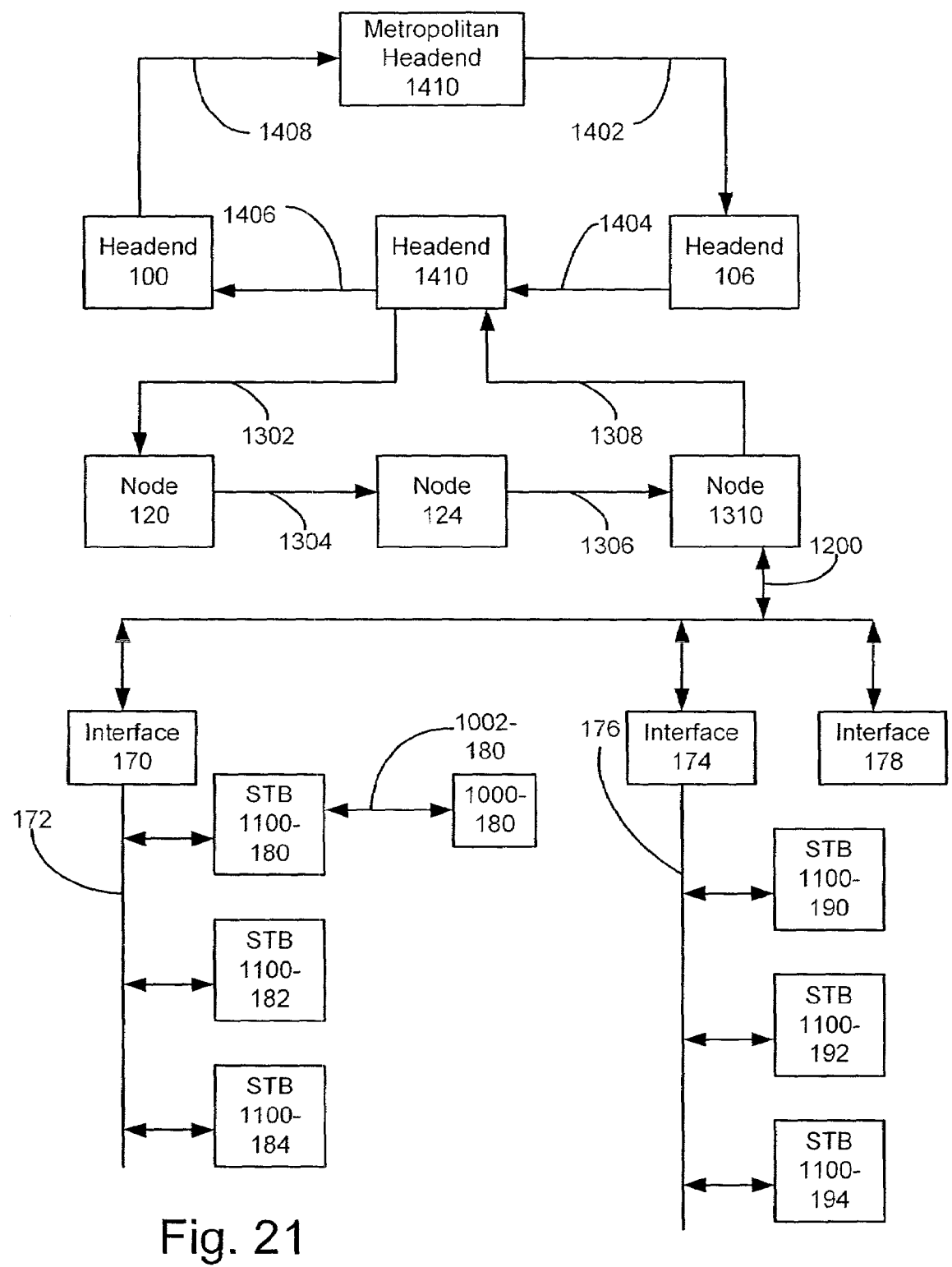
FIG. 21 depicts a remote control unit 1000-180 coupled 1002-180 to set-top apparatus 1100-180, communicating via a two-stage wireline communications system containing a wireline physical transport 1200 through an augmented distributor node 1310 interfacing to a wireline communications loop including an augmented Headend 1410 further supporting a communications loop including augmented metropolitan Headend 1410, in accordance with the invention.

FIG. 21 depicts a remote control unit 1000-180 coupled 1002-180 to set-top apparatus 1100-180. Set-top appliance 1100-180 communicates via a one- or two-stage wireline communications system containing a wireline physical transport 1200 to an augmented distributor node 1310. The communications traverse augmented distributor node 1310 interfaced to a wireline communications loop including an augmented Headend 1410. The network may further support a communications loop including augmented metropolitan Headend 1410.

As used herein, the adjective augmented is used to refer to a node incorporating at least one embodiment of the invention.

Augmented node 1310 may control and support optimized upstream communication as disclosed in the co-pending application Ser. No. 09/679,115, entitled "Increased Bandwidth in Aloha-based Frequency Hopping Transmission Systems" by Calderone and Foster, both inventors of this application and commonly assigned to AgileTV, and incorporated herein by reference.

Augmented node 1310 may provide cached content such as popular videos for a VOD service.

Speech processing may be performed in many situations at augmented node 1310.

Augmented Headend 1410 and augmented metropolitan Headend 1410 provide speech processing capabilities. Augmented Headend 1410 may be used to handle speech processing for nodes 120 and 124. Augmented metropolitan Headend 1410 may be used to handle speech processing for Headends 100 and 106. Headends 100 and 106, and nodes 120 and 124 are not augmented by this invention.

Alternatively, augmented Headend 1410 may control the optimized upstream communication as disclosed in the co-pending application Ser. No. 09/679,115, entitled "Increased Bandwidth in Aloha-based Frequency Hopping Transmission Systems". Node 1310 may support the optimized upstream communication. Upstream communication from augmented node 1310 and from augmented Headend 1410 may employ the same upstream communications protocol, or different upstream communications protocol.

Note that metropolitan Headend 1410 may not be involved in the optimized upstream communication scheme.

Alternatively, metropolitan Headend 1410 may be involved in the optimized upstream communication scheme. Augmented metropolitan Headend 1410 may further control the optimized upstream communication as disclosed in the co-pending application Ser. No. 09/679,115, entitled "Increased Bandwidth in Aloha-based Frequency Hopping Transmission Systems". Augmented Headend 1410 may support the optimized upstream communication between node 1310 and set-top apparatus 1100-180. Node 1310 may then carry out the optimized upstream communication. Upstream communication from augmented node 1310 and from augmented Headend 1410 may employ the same upstream communications protocol, or different upstream communication protocols.

Note that in certain network installations, there may be no metropolitan Headend, augmented or otherwise. Further, in certain network installations, there may only be one Headend.

Figure 22:
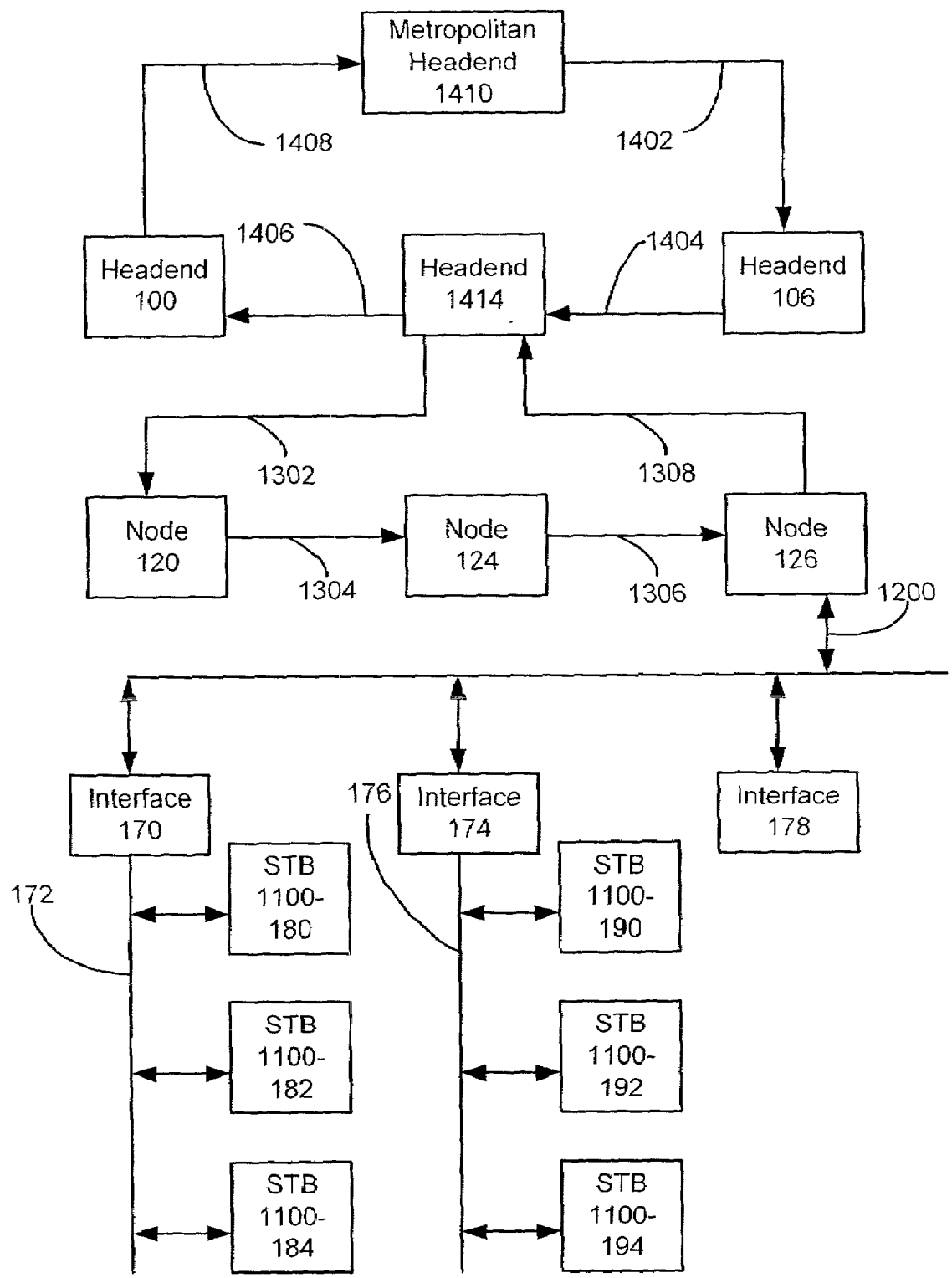
FIG. 22 depicts a remote control unit 1000-180 coupled 1002-180 to set-top apparatus 1100-180, communicating via a two-stage wireline communications system containing a wireline physical transport 1200 through a distributor node 126 interfacing to a wireline communications loop including an augmented Headend 1414 further supporting a communications loop including augmented metropolitan Headend 1410, in accordance with the invention.

FIG. 22 depicts a remote control unit 1000-180 coupled 1002-180 to set-top apparatus 1100-180, communicating via a two-stage wireline communications system containing a wireline physical transport 1200 to a distributor node 126. Distributor node 126 interlaces to a wireline communications loop including an augmented Headend 1414. The network may further support a communications loop including augmented metropolitan Headend 1410, in accordance with the invention.

Augmented Headend 1414 may control and support optimized upstream communication as disclosed in the co-pending application Ser. No. 09/679,115, entitled "Increased Bandwidth in Aloha-based Frequency Hopping Transmission Systems" by Calderone and Foster, both inventors of this application and commonly assigned to AgileTV, incorporated herein by reference.

Augmented Headend 1414 may provide cached content such as popular videos for a VOD service. Speech processing may be performed in many situations at augmented Headend 1414

Augmented metropolitan Headend 1410 may further provide speech processing capabilities. Augmented metropolitan Headend 1410 may be used to handle speech processing requirements for Headends 100 and 106, which are not augmented by this invention.

The couplings between STB 1100-180, Node 126 and Headend 1410 may also support bi-directional communication allowing the STB 1100-180 to receive multiple television channels and allowing STB 1100-180 to signal at least limited information to augmented Headend 1410, which may well include management of Pay-per-View and other services.

Alternatively, augmented metropolitan Headend 1410 may control the optimized upstream communication as disclosed in the co-pending application Ser. No. 09/679,115, entitled Increased Bandwidth in Aloha-based Frequency Hopping Transmission Systems. Augmented Headend 1414 may then support the optimized upstream communication. Upstream communication from augmented node 126 and from augmented Headend 1410 may employ the same upstream communications protocol, or a different upstream communications protocol.

Note that metropolitan Headend 1410 may not be involved in the optimized upstream communication scheme.

Alternatively, metropolitan Headend 1410 may be involved in the optimized upstream communication scheme. Augmented metropolitan Headend 1410 may further control the optimized upstream communication as disclosed in the co-pending application Ser. No. 09/679,115, entitled Increased Bandwidth in Aloha-based Frequency Hopping Transmission Systems. Augmented Headend 1410 may support the optimized upstream communication between node 126 and set-top apparatus 1100-180. Node 126 may then carry out the optimized upstream communication. Upstream communication from node 126 and from augmented Headend 1410 may employ the same upstream communications protocol, or different upstream communication protocols.

Note that in certain network installations, there may be no metropolitan Headend, augmented or otherwise. Further, in certain network installations, there may only be one Headend.

Figure 23:
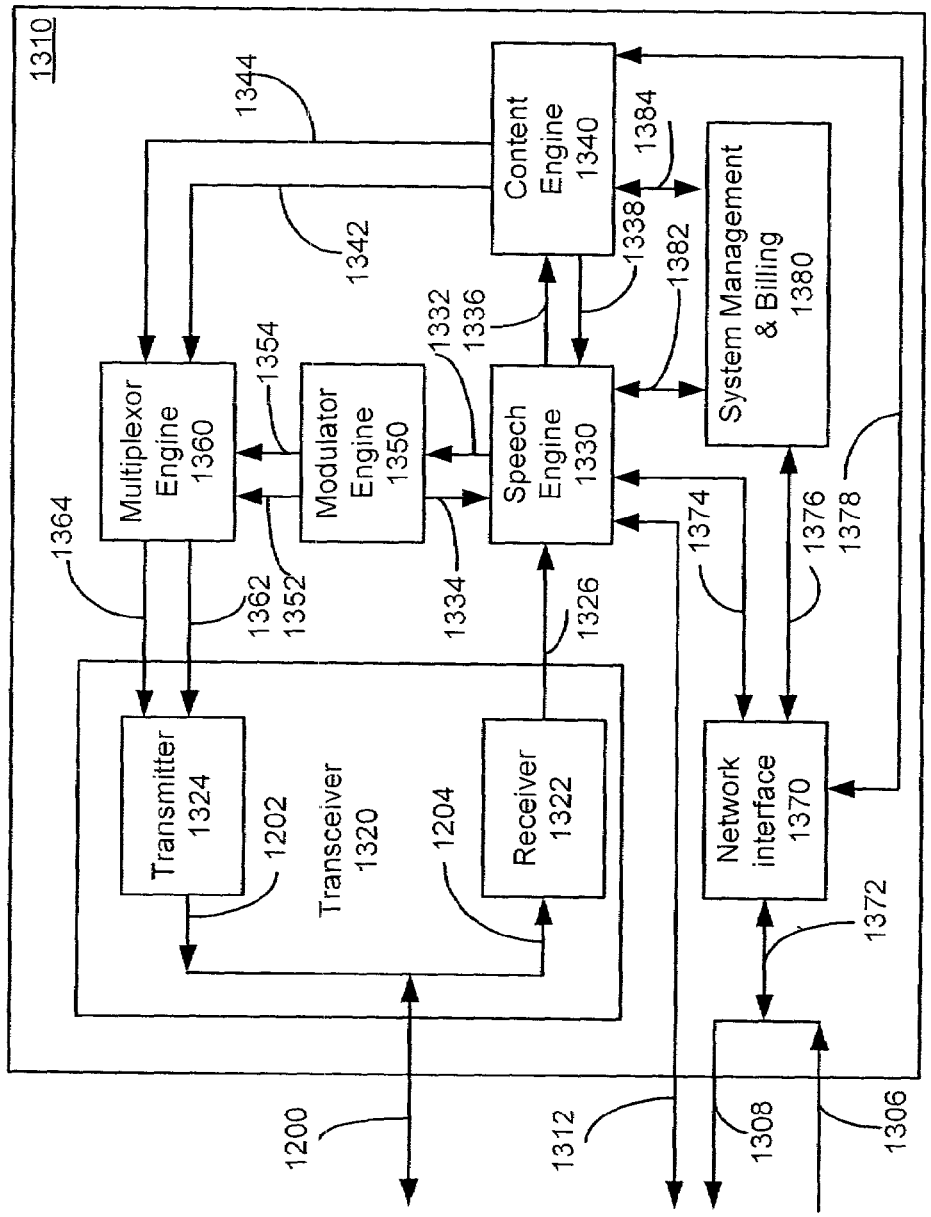
FIG. 23 depicts a detail block diagram of an augmented distributor node 1310, coupled to wireline physical transport 1200 and coupled to the wireline communications loop of FIG. 21.

FIG. 23 depicts a detail block diagram of an augmented distributor node 1310, coupled to wireline physical transport 1200 and coupled to the wireline communications loop of FIG. 21.

Note that there may be one transport 1200. Transceiver 1320 couples to transport 1200 to provide uplink 1204 and downlink 1202 communications between STB's 1100 of FIG. 21.

There may be multiple transports 1200 corresponding to wireline circuits servicing combinations of at least one of the interfaces 170, 174 and 178, as shown in FIGS. 1, 2, 21 and 22. Transceiver 1320 couples to transport 1200 to provide uplink 1204 and downlink 1202 communications between STB's 1100 of FIGS. 21 and 22. Note that transceiver 1320 may provide multiple uplinks 1204. Transceiver 1320 may provide multiple downlinks 1202.

Transceiver 1320 may include transmitter 1324 providing downlink 1202 communications to wireline physical transport 1200. Multiple downlinks 1202 may be provided by transmitter 1324. Alternatively, multiple downlinks 1202 may be provided by more than one transmitter 1324.

Transceiver 1320 may include receiver 1322 providing uplink 1204 communications from wireline physical transport 1200. Multiple uplinks 1204 may be provided by receiver 1322. Alternatively, multiple uplinks 1204 may be provided by more than one receiver 1322.

Wireline physical transport 1200 may further include separate uplink physical transport 1204 and downlink physical transport 1202. Various embodiments of the invention may include multiple uplink physical transports 1204. Various embodiments of the invention may include multiple downlink physical transports 1202. There may be a difference in the number of uplink physical transports 1204 and the number of downlink physical transports 1202.

Note that there may be a difference in the number of transmitters 1324 and the number of receivers 1322.

By way of example, referring to FIG. 21, one downlink stream 1202 may be sent to interface 170, and a second downlink stream, not shown in FIG. 21 or FIG. 23, may be sent to interface 174. One uplink stream 1204 may be received from interface 170, and a second uplink stream, not shown in FIG. 21 or FIG. 23, may be received from interface 174.

Hereafter, the discussion focuses on a single transmitter 1324 providing as many downlinks 1202 and on a single receiver 1322 providing as many uplinks 1204 as required. This is done strictly to simplify the discussion and is not meant to imply any limitation on the invention.

Uplink 1204 communication includes a back channel. This back channel includes multiple identified speech channels from multiple user sites (STBs) 1100, as shown in FIGS. 21 and 22. Receiver 1322 provides 1326 a back channel to speech engine 1330. Speech engine 1330 performs at least the operations of FIG. 10.

Speech engine 1330 further communicatively interacts 1374 with network interface 1370. Network interface 1370 couples 1372 to other network components. Network coupling 1372 may further include a predominantly input coupling 1306 and a predominantly output coupling 1308.

Network interface 1370 may communicatively interact 1376 with local system management and billing 1380. Local system management and billing 1380 may include systems management and billing data relevant to the elements of the overall network managed or controlled through the local node.

Local system management and billing 1380 may further maintain systems management and billing data relevant to the elements of the overall network managed or controlled through the local node.

Local system management and billing 1380 may include a cache of systems management and billing data relevant to the elements of the overall network managed or controlled through the local node.

Receiver 1322 provides 1326 a back channel to speech engine 1330. Speech engine 1330 performs at least the operations of FIG. 10. Speech engine 1330 further communicatively interacts 1374 with network interface 1370.

Speech engine 1330 may communicatively interact 1382 with system management and billing 1380. Speech engine 1330 may send 1382 system management and billing 1380 requests for user account information, including, but not limited to, credit information, authorization profiles for channel viewing, credit limits, and parental safeguards. Speech engine 1330 may send 1382 system management and billing 1380 user passwords, confirmation of commitments, commands regarding authorization levels of other users, such as children within a user's household.

Speech engine 1330 may receive 1382 from system management and billing 1380 credit information, authorization profiles for channel viewing, credit limits and parental safeguards. Speech engine 1330 may receive 1382 from system management and billing 1380 confirmation of acceptance of contracts from financial engines. Acceptance of contracts from external financial engines may be received in a number of different ways, including through interactions with network interface 1370 or other external communications networks 1312.

System management and billing 1380 may further include interfaces to other external communications networks. Such circuitry is not the subject of this invention and is not discussed further herein.

Similarly, the mechanism of contract acceptance between system management and billing 1380 and financial engines is not the subject of this invention and is not discussed further herein.

Speech engine 1330 may receive 1338 from content engine 1340 content status information. Content status information may include a list of available services through the coupled network(s). Content status information may further include a list of services available within the node.

Content status information may include a list of content items cached through the network. Content status information may further include a list of content items cached at the node. Cached content items may include Interactive Program Guide (IPG) listings for some period of time. Cached content items may include one or more video sequences provided through Video On Demand (VOD) or Pay-Per-View services.

Content engine 1340 communicatively interacts 1378 with network interface 1370. Content engine 1340 may provide at least one locally generated multi-media stream 1342 to Multiplexor engine 1360 as well as at least one multi-media stream 1344 received 1378 through network interface 1370. Content engine 1340 may modify multi-media stream 1344 received 1378 from network interface 1370 through network input 1306. Content engine 1340 may stimulate 1378 network interface 1370, altering network output 1308 from network interface 1370.

Content engine 1340 may have more than one registered application server each presenting static menu content and dynamic content. A speech processor within speech engine 1330 may be presented a grammar based upon the static and dynamic content of multiple registered application servers. The merged services may be presented to the users as specialized, multi-application service menus provided by the speech engine 1330 to the users.

Speech engine 1330 may generate one or more channels of speech response content through coupling 1332 to modulator engine 1350. Modulator engine 1350 may further provide 1334 status and reliability information to speech engine 1330. Speech response content channels presented through coupling 1332 may be digital. Speech response content channels may be presented as bits or clusters of bits of a specific bit width.

Multiple channels may be multiplexed onto coupling 1332 by speech engine 1330. The multiplexing mechanism onto channel 1332 may perform time division multiplexing. Modulator engine 1350 may demultiplex multiple multiplexed channels received through coupling 1332. Modulator engine 1250 may convert one or more demultiplexed channels into modulated channels, or modulated collections of channels, presented 1352 and 1354 to multiplexor engine 1360.

Multiplexor engine 1360 accepts the multiple locally generated channels 1352, 1354 and 1342 as well as the locally received, and possibly modified, external stream 1344 to create at least one merged stream 1362. Multiplexor engine 1360 may create more than one merged stream, e.g. 1364.

Transmitter 1324 receives at least one merged stream 1362 from multiplexor engine 1360 to generate at least one downlink stream 1202 of physical transport 1200. Transmitter 1324 may receive more than one merged stream 1364 from multiplexor engine 1360.

Speech engine 1330 may further interact 1312 with an external network. Such an interaction may involve at least one wireline physical transport layer. The wireline physical layer may support at least one or a combination of communication protocols using optical, infra-red and radio frequency regions of the electromagnetic spectrum. Network interactions 1312 may support message passing protocols, including, but not limited to, TCP-IP. Network interactions 1312 may further support communications with the Internet and World Wide Web.

Figure 24:
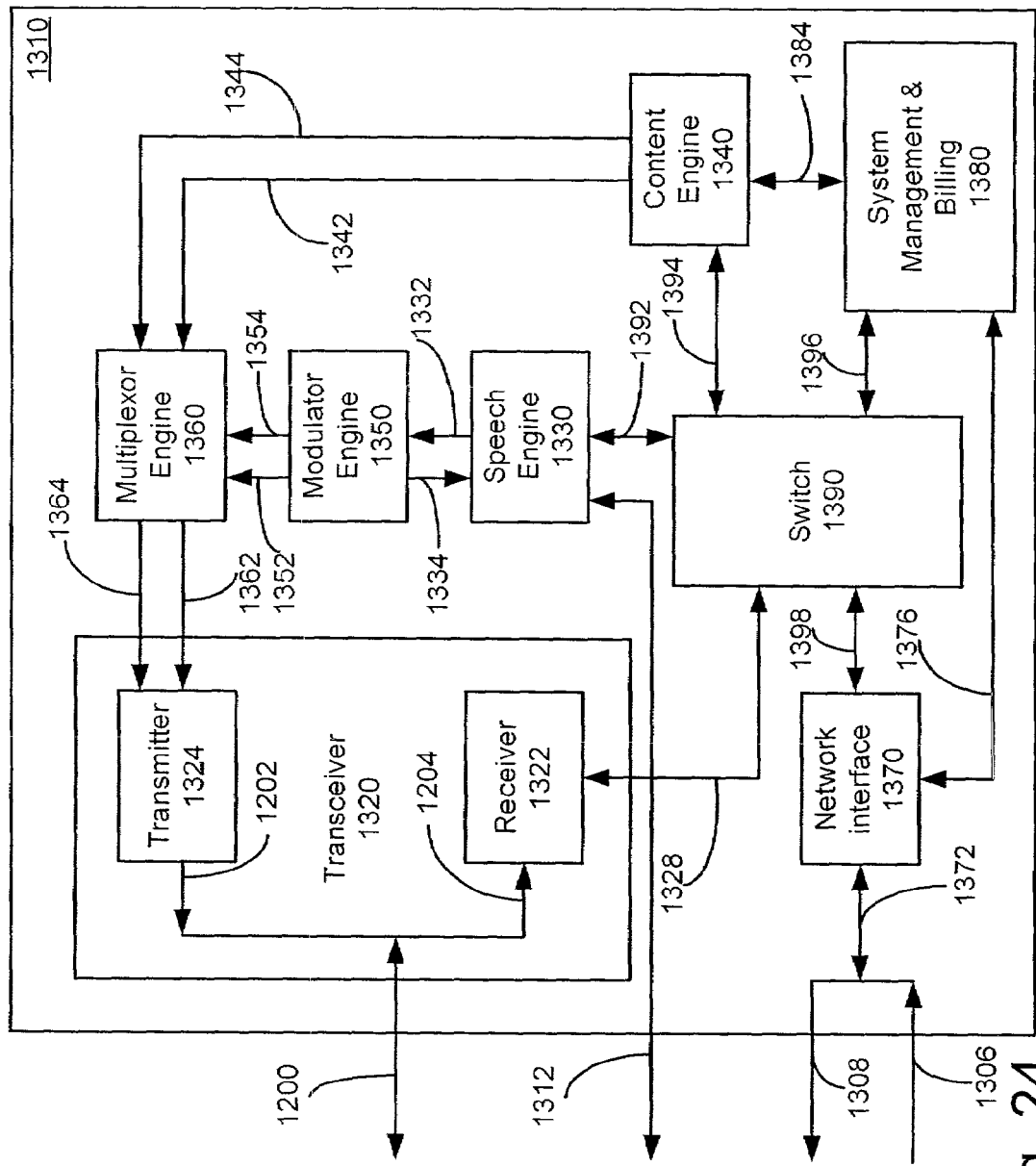
FIG. 24 depicts an alternative detail block diagram of an augmented distributor node 1310, coupled to wireline physical transport 1200 and coupled to the wireline communications loop of FIG. 21.

FIG. 24 depicts an alternative detail block diagram of an augmented distributor node 1310, coupled to wireline physical transport 1200 and coupled to the wireline communications loop of FIG. 21.

Receiver 1322 provides a back channel to speech engine 1330 through interactions 1328 with switch 1390 delivering 1392 the back channel to speech engine 1330.

Speech engine 1330 communicatively interacts 1374 with network interface 1370 by the speech engine 1330 interacting 1392 with switch 1390 which interacts 1398 with network interface 1370.

Network interface 1370 may communicatively interact with local system management and billing 1380 by communicatively interacting 1398 with switch 1390, which communicatively interacts 1396 with system management and billing 1380.

Speech engine 1330 may communicatively interact 1382 with system management and billing 1380 by communicatively interacting 1392 with switch 1390, which communicatively interacts with system management and billing 1380.

Speech engine 1330 may receive content status information from content engine 1340 by content engine 1340 interacting 1394 with switch 1390, which delivers 1392 the content status information to speech engine 1330.

Content engine 1340 communicatively interacts with network interface 1370 by content engine 1340 communicatively interacting with switch 1390 and network interface 1370 communicatively interacting with switch 1390.

Switch 1390 may support digital interfaces. Switch 1390 may include a circuit switch. The circuit switch may support Ethernet protocols. Switch 1390 may include an ATM switch. Switch 1390 may support analog interfaces. Such analog interfaces may include wavelength division multiplexing. Switch 1390 may be composed of more than one switch.

The invention may include various combinations of direct interconnections and switch networks as shown in FIGS. 23 and 24.

Figure 25:
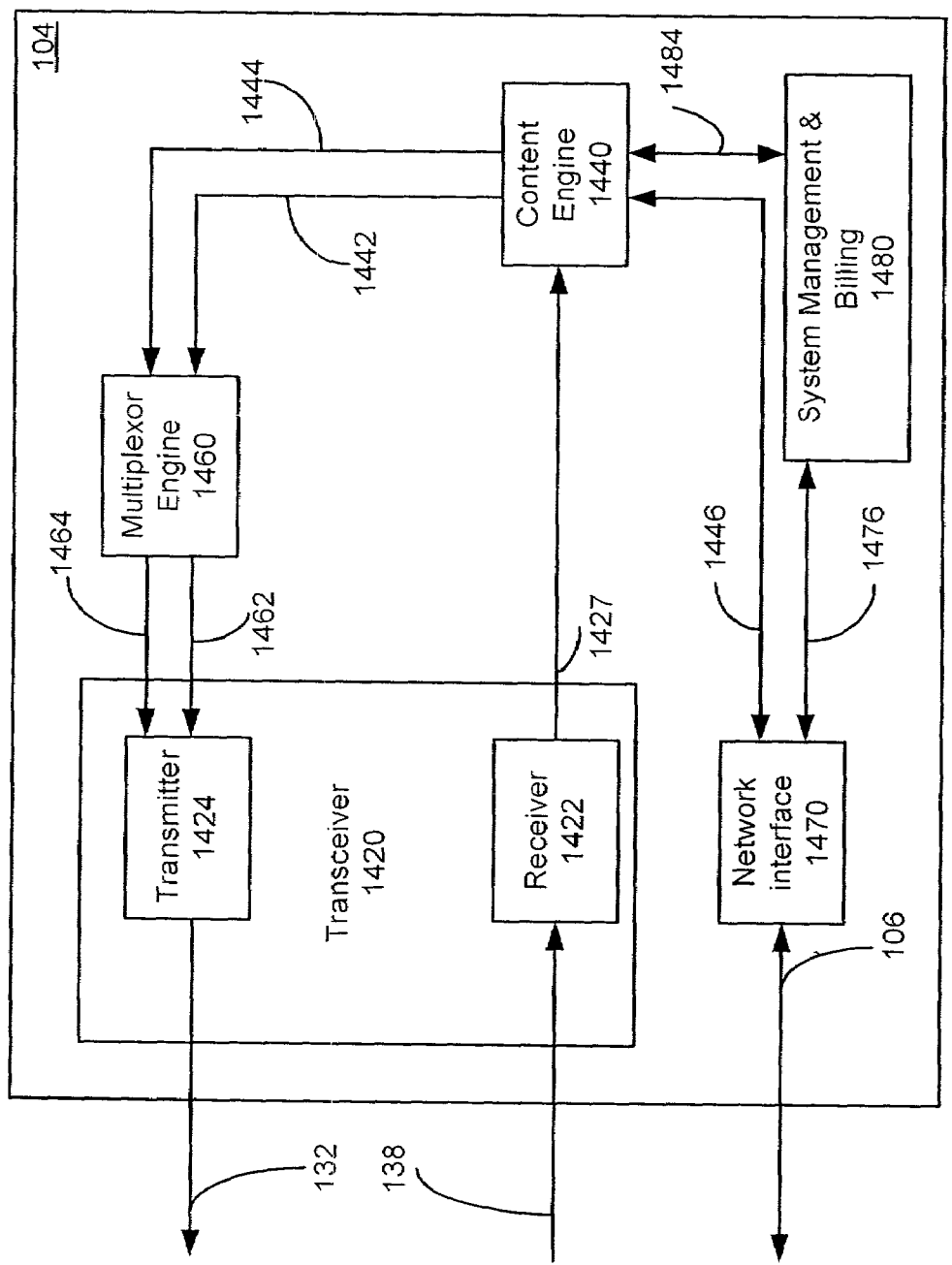
FIG. 25 depicts a generic block diagram of a prior art Headend 104 as shown in FIG. 3.

FIG. 25 depicts a generic block diagram of a prior art Headend 104 as shown in FIG. 3.

Uplink 138 communication includes a back channel.

Figure 1:
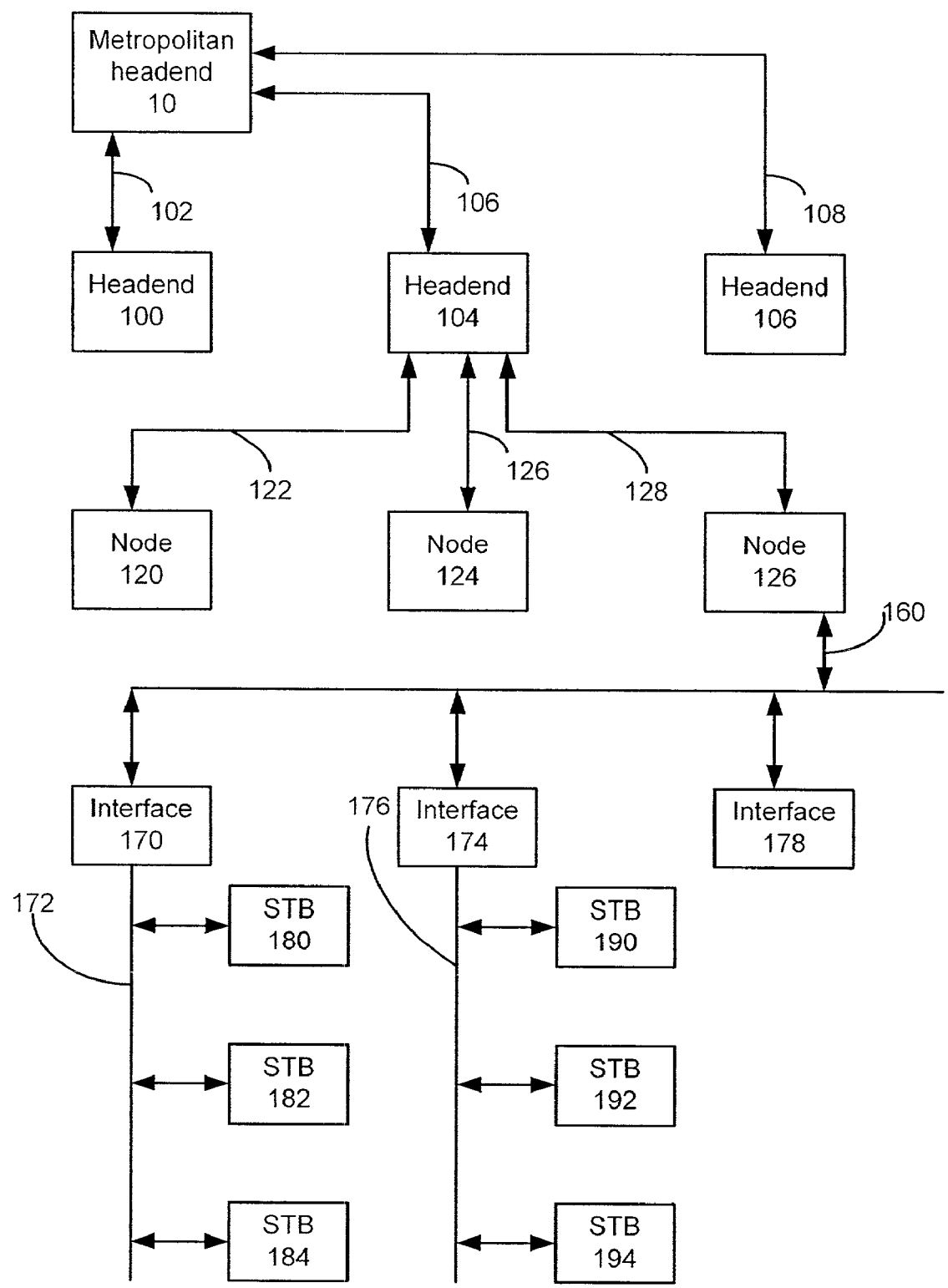
FIG. 1 depicts a typical network hierarchy as found in a cable television or video delivery network employing a Hybrid Fiber-Coaxial (HFC) wiring scheme as disclosed in the prior art.
Figure 2:
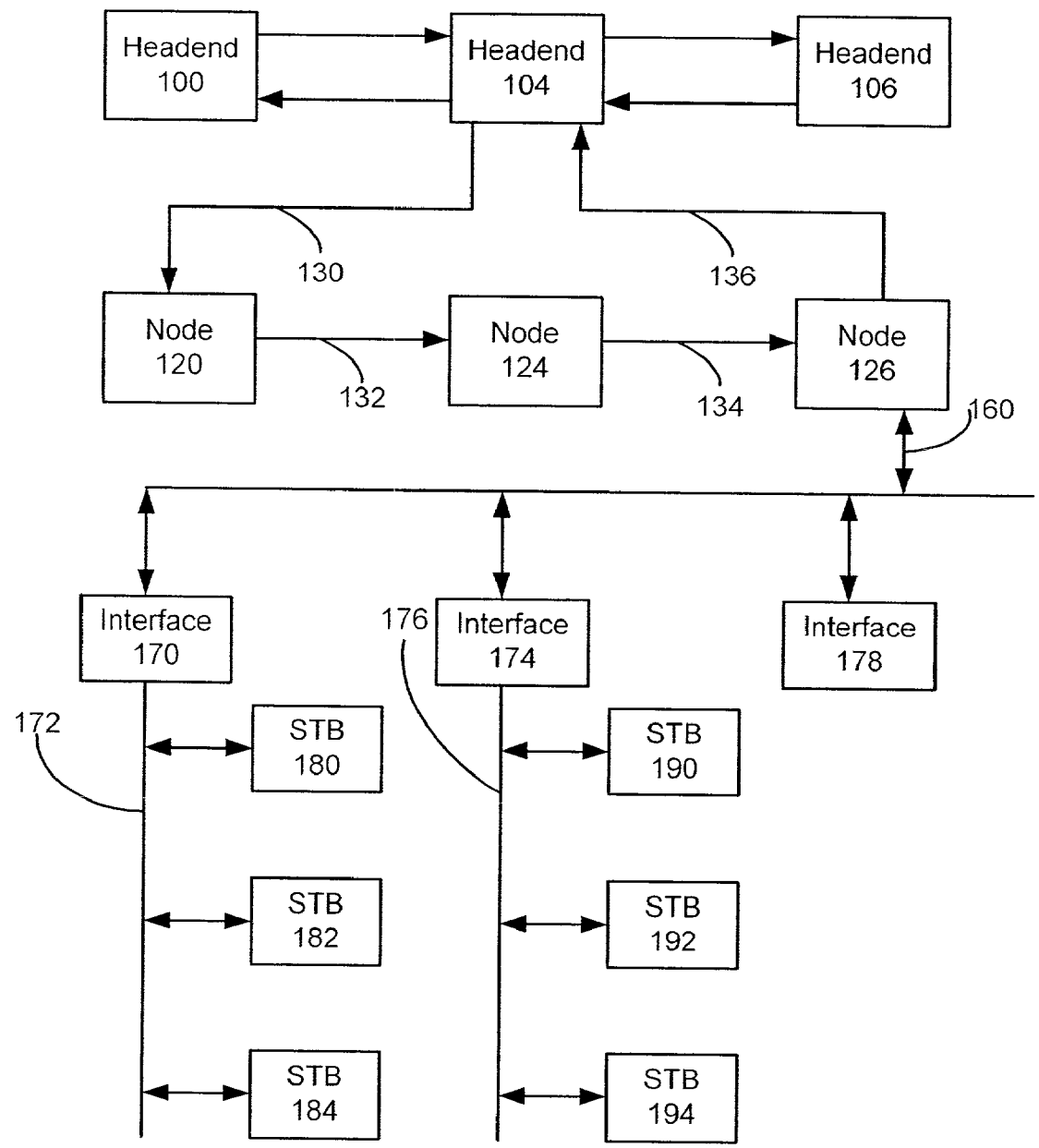
FIG. 2 depicts a typical residential broadband network using local loop wiring of the network as disclosed in the prior art.

This back channel includes multiple response channels from multiple user sites STBs, as shown in FIGS. 1 and 2. Receiver 1422 provides 1427 a back channel to content engine 1440.

Network interface 1470 may communicatively interacts 1476 with Headend system management and billing 1480. Headend system management and billing 1480 may include systems management and billing data relevant to the elements of the overall network managed or controlled through the Headend.

Headend system management and billing 1480 may further maintain systems management and billing data relevant to the elements of the overall network managed or controlled through the Headend.

Headend system management and billing 1480 may include a cache of systems management and billing data relevant to the elements of the overall network managed or controlled through the Headend.

System management and billing 1480 may further include interfaces to other external communications networks. Such circuitry is not the subject of this invention and is not discussed further herein.

Content status information may include a list of content items cached through the network. Content status information may further include a list of content items cached at the node. Cached content items may include Interactive Program Guide (IPG) listings for some period of time. Cached content items may include one or more video sequences provided through Video On Demand (VOD) or Pay-Per-View services.

Content engine 1440 communicatively interacts 1478 with network interface 1470. Content engine 1440 may provide at least one locally generated multi-media stream 1442 to Multiplexor engine 1460 as well as at least one multi-media stream 1444 received 1478 through network interface 1470. Content engine 1440 may modify multi-media stream 1444 received 1478 from network interface 1470 through network input 1406. Content engine 1440 may stimulate 1478 network interface 1470, altering network output 1408 from network interface 1470.

Content engine 1340 may include, but is not limited to, one or more standard components of a head-end, OTA Receivers: Over The Air Receivers and Satellite receivers and Set-Top Box Controller. A Set-Top Box Controller is the transmission equivalent of the Headend receiver. This box sends commands from the head-end to the individual user's set-top box. Those commands may include change channel, set decryption key to the following, enable the set-top box to present a pay channel.

Multiplexor engine 1460 accepts the multiple locally generated channels 1452, 1454 and 1442 as well as the locally received, and possibly modified, external stream 1444 to create at least one merged stream 1462. Multiplexor engine 1460 may create more than one merged stream, e.g. 1464.

Transmitter 1424 receives at least one merged stream 1462 from multiplexor engine 1460 to generate at least one downlink stream 132 of physical transport 1200. Transmitter 1424 may receive more than one merged stream 1464 from multiplexor engine 1460.

Figure 26:
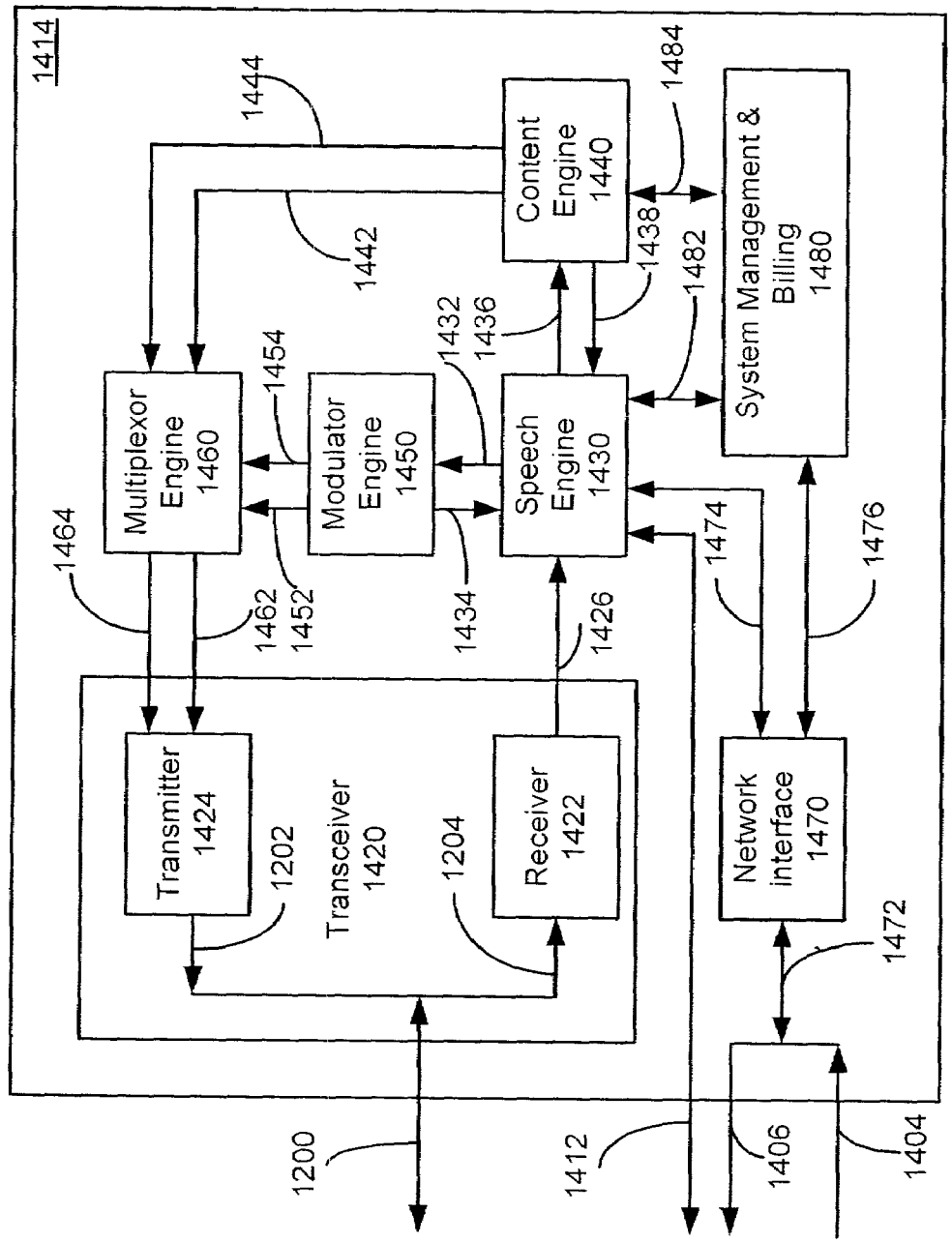
FIG. 26 depicts an augmented Headend 1410 of FIG. 21 or an augmented Headend 1414 of FIG. 22 or an augmented metropolitan Headend 1410 of FIGS. 21 or 22, in accordance with the invention.

FIG. 26 depicts an augmented Headend 1410 of FIG. 21 or an augmented Headend 1414 of FIG. 22 or an augmented metropolitan Headend 1410 of FIGS. 21 or 22, in accordance with the invention.

Note that there may be one transport 1200. Transceiver 1420 couples to transport 1200 to provide uplink 1204 and downlink 1202 communications between STB's 1100 of FIG. 21.

There may be multiple transports 1200 corresponding to wireline circuits servicing combinations of at least one of the interfaces 170, 174 and 178, as shown in FIGS. 1, 2, 21 and 22. Transceiver 1420 couples to transport 1200 to provide uplink 1204 and downlink 1202 communications between STB's 1100 of FIGS. 21 and 22. Note that transceiver 1420 may provide multiple uplinks 1204. Transceiver 1420 may provide multiple downlinks 1202.

Transceiver 1420 may include transmitter 1424 providing downlink 1202 communications to wireline physical transport 1200. Multiple downlinks 1202 may be provided by transmitter 1424. Alternatively, multiple downlinks 1202 may be provided by more than one transmitter 1424.

Transceiver 1420 may include receiver 1422 providing uplink 1204 communications from wireline physical transport 1200. Multiple uplinks 1204 may be provided by receiver 1422. Alternatively, multiple uplinks 1204 may be provided by more than one receiver 1422.

Wireline physical transport 1200 may further include separate uplink physical transport 1204 and downlink physical transport 1202. Various embodiments of the invention may include multiple uplink physical transports 1204. Various embodiments of the invention may include multiple downlink physical transports 1202. There may be a difference in the number of uplink physical transports 1204 and the number of downlink physical transports 1202.

Note that there may be a difference in the number of transmitters 1424 and the number of receivers 1422.

As earlier, the discussion focuses on a single transmitter 1424 providing as many downlinks 1202 and on a single receiver 1422 providing as many uplinks 1204 as required. This is done strictly to simplify the discussion and is not meant to imply any limitation on the invention.

Uplink 1204 communication includes a back channel. This back channel includes multiple identified speech channels from multiple user sites (STBs) 1100, as shown in FIGS. 21 and 22. Receiver 1422 provides 1426 a back channel to speech engine 1430. Speech engine 1430 performs at least the operations of FIG. 10.

Speech engine 1430 further communicatively interacts 1474 with network interface 1470. Network interface 1470 couples 1472 to other network components. Network coupling 1472 may further include a predominantly input coupling 1406 and a predominantly output coupling 1408.

Network interface 1470 may communicatively interact 1476 with Headend system management and billing 1480. Headend system management and billing 1480 may include systems management and billing data relevant to the elements of the overall network managed or controlled through the Headend node.

Headend system management and billing 1480 may further maintain systems management and billing data relevant to the elements of the overall network managed or controlled through the Headend node.

Headend system management and billing 1480 may include a cache of systems management and billing data relevant to the elements of the overall network managed or controlled through the Headend node.

Speech engine 1430 may communicatively interact 1482 with system management and billing 1480. Speech engine 1430 may send 1482 system management and billing 1480 requests for user account information, including, but not limited to, credit information, authorization profiles for channel viewing, credit limits and parental safeguards. Speech engine 1430 may send 1482 system management and billing 1480 user passwords, confirmation of commitments, commands regarding authorization levels of other users, such as children within a user's household.

Speech engine 1430 may receive 1482 from system management and billing 1480 credit information, authorization profiles for channel viewing, credit limits and parental safeguards. Speech engine 1430 may receive 1482 from system management and billing 1480 confirmation of acceptance of contracts from financial engines. Acceptance of contracts from external financial engines may be received in a number of different ways, including through interactions with network interface 1470, or other external communications networks.

System management and billing 1480 may further include interfaces to other external communications networks. Such circuitry is not the subject of this invention and is not discussed further herein.

Similarly, the mechanism of contract acceptance between system management and billing 1480 and financial engines is not the subject of this invention and is not discussed further herein.

Speech engine 1430 may receive 1438 from content engine 1440 content status information. Content status information may include a list of available services through the coupled network(s). Content status information may further include a list of services available within the node.

Content status information may include a list of content items cached through the network. Content status information may further include a list of content items cached at the node. Cached content items may include Interactive Program Guide (IPG) listings for some period of time. Cached content items may include one or more video sequences provided through Video On Demand (VOD) or Pay-Per-View services.

Content engine 1440 communicatively interacts 1478 with network interface 1470. Content engine 1440 may provide at least one locally generated multi-media stream 1442 to Multiplexor engine 1460 as well as at least one multi-media stream 1444 received 1478 through network interface 1470. Content engine 1440 may modify multi-media stream 1444 received 1478 from network interface 1470 through network input 1406. Content engine 1440 may stimulate 1478 network interface 1470, altering network output 1408 from network interface 1470.

Speech engine 1430 may generate one or more channels of speech response content through coupling 1432 to modulator engine 1450. Modulator engine 1450 may further provide 1434 status and reliability information to speech engine 1430. Speech response content channels presented through coupling 1432 may be digital. Speech response content channels may be presented as bits or clusters of bits of a specific bit width.

Multiple channels may be multiplexed onto coupling 1432 by speech engine 1430. The multiplexing mechanism onto channel 1432 may perform time division multiplexing. Modulator engine 1450 may demultiplex multiple multiplexed channels received through coupling 1432. Modulator engine 1250 may convert one or more channels into modulated channels or modulated collections of channels then presented 1452 and 1454 to multiplexor engine 1460.

Multiplexor engine 1460 accepts the multiple locally generated channels 1452, 1454 and 1442 as well as the locally received, and possibly modified, external stream 1444 to create at least one merged stream 1462. Multiplexor engine 1460 may create more than one merged stream, e.g. 1464.

Transmitter 1424 receives at least one merged stream 1462 from multiplexor engine 1460 to generate at least one downlink stream 1202 of physical transport 1200. Transmitter 1424 may receive more than one merged stream 1464 from multiplexor engine 1460.

Figure 27:
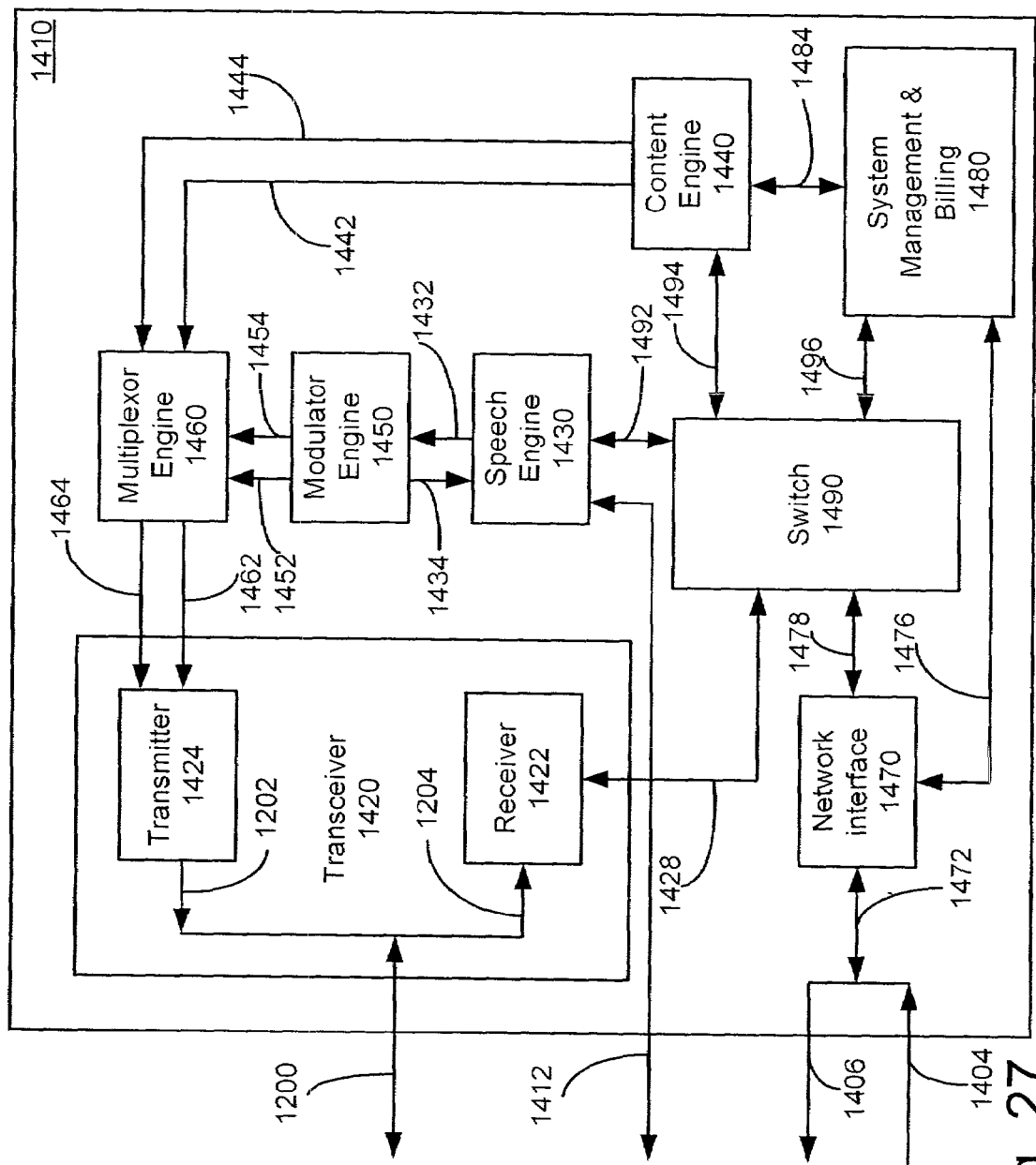
FIG. 27 depicts an alternative augmented Headend 1410 of FIG. 21 or an alternative augmented Headend 1414 of FIG. 22 or an alternative augmented metropolitan Headend 1410 of FIGS. 21 or 22, in accordance with the invention.

FIG. 27 depicts an alternative augmented Headend 1410 of FIG. 21 or an alternative augmented Headend 1414 of FIG. 22 or an alternative augmented metropolitan Headend 1410 of FIGS. 21 or 22, in accordance with the invention.

Receiver 1422 provides a back channel to speech engine 1430 through interactions 1428 with switch 1490 delivering 1492 the back channel to speech engine 1430.

Speech engine 1430 communicatively interacts 1474 with network interface 1470 by the speech engine 1430 interacting 1492 with switch 1490 which interacts 1498 with network interface 1470.

Network interface 1470 may communicatively interact with Headend system management and billing 1480 by communicatively interacting 1498 with switch 1490, which communicatively interacts 1496 with system management and billing 1480.

Speech engine 1430 may communicatively interact 1482 with system management and billing 1480 by communicatively interacting 1492 with switch 1490, which communicatively interacts with system management and billing 1480.

Speech engine 1430 may receive content status information from content engine 1440 by content engine 1440 interacting 1494 with switch 1490, which delivers 1492 the content status information to speech engine 1430.

Content engine 1440 communicatively interacts with network interface 1470 by content engine 1440 communicatively interacting with switch 1490 and network interface 1470 communicatively interacting with switch 1490.

Switch 1490 may support digital interfaces. Switch 1490 may include a circuit switch. The circuit switch may support Ethernet protocols. Switch 1490 may include an ATM switch. Switch 1490 may support analog interfaces. Such analog interfaces may include wavelength division multiplexing. Switch 1490 may be composed of more than one switch.

The invention may include various combinations of direct interconnections and switch networks as shown in FIGS. 23 and 24.

Note that a single computer may perform the operations of the speech engine as shown in FIG. 10. The computer performs these operations as controlled by a program system including program steps residing in accessibly coupled memory.

Figure 28A:
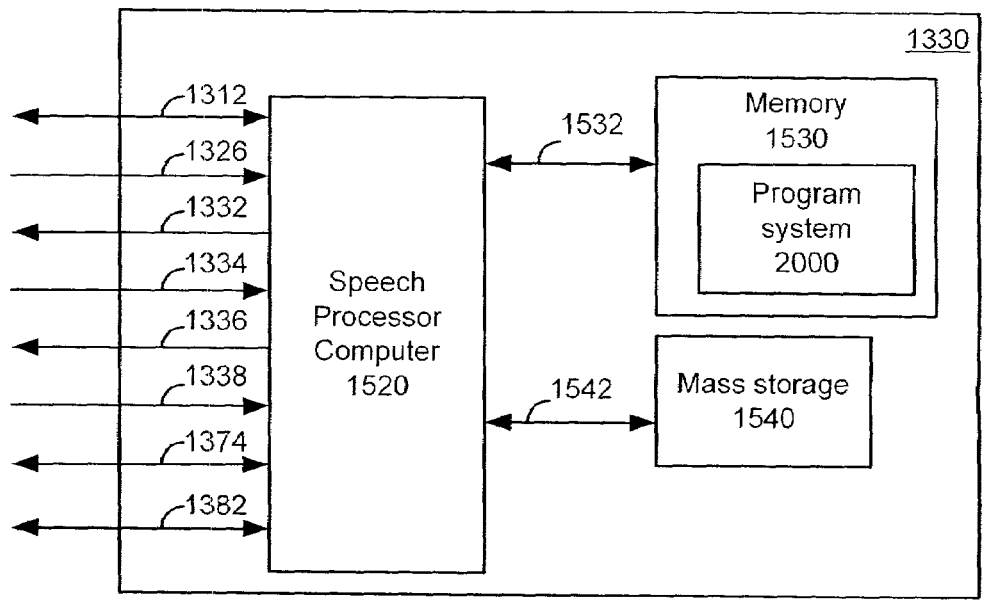
FIG. 28A depicts a block diagram of a speech engine 1330 as shown in FIG. 23.

FIG. 28A depicts a block diagram of a speech engine 1330 as shown in FIG. 23.

Receiver 1322 provides 1326 a back channel to speech processor computer 1520. Speech processor computer 1520 further communicatively interacts 1374 with network interface 1370.

Speech processor computer 1520 may communicatively interact 1382 with system management and billing 1380. Speech processor computer 1520 may send 1382 system management and billing 1380 requests for user account information, including, but not limited to, credit information, authorization profiles for channel viewing, credit limits and parental safeguards. Speech processor computer 1520 may send 1382 system management and billing 1380 user passwords, confirmation of commitments, commands regarding authorization levels of other users, such as children within a user's household.

Speech processor computer 1520 may receive 1382 from system management and billing 1380 credit information, authorization profiles for channel viewing, credit limits and parental safeguards. Speech processor computer 1520 may receive 1382 from system management and billing 1380 confirmation of acceptance of contracts from financial engines. Acceptance of contracts from external financial engines may be received in a number of different ways, including through interactions with network interface 1370 or other external communications networks 1312.

Speech processor computer 1520 may receive 1338 from content engine 1340 content status information. Content status information may include a list of available services through the coupled network(s). Content status information may further include a list of services available within the node.

Speech processor computer 1520 may generate one or more channels of speech response content through coupling 1332 to modulator engine 1350. Modulator engine 1350 may further provide 1334 status and reliability information to speech processor computer 1520. Speech response content channels presented through coupling 1332 may be digital. Speech response content channels may be presented as bits or clusters of bits of a specific bit width.

Multiple channels may be multiplexed onto coupling 1332 by speech processor computer 1520. The multiplexing mechanism onto channel 1332 may perform time division multiplexing. Modulator engine 1350 may demultiplex multiple multiplexed channels received through coupling 1332. Modulator engine 1250 may convert one or more demultiplexed channels into modulated channels or modulated collections of channels then presented 1352 and 1354 to multiplexor engine 1360.

Speech processor computer 1520 may further interact 1312 with an external network. Such an interaction may involve at least one wireline physical transport layer. The wireline physical layer may support at least one or a combination of communication protocols using optical, infra-red and radio frequency regions of the electromagnetic spectrum. Network interactions 1312 may support message passing protocols, including, but not limited to, TCP-IP. Network interactions 1312 may further support communications with the Internet and World Wide Web.

Speech processor computer 1520 communicatively couples with mass storage 1540. Mass storage 1540 may include, but is not limited to, a disk, disk farm, or RAID. Mass storage 1540 may be organized by a file management system, or by one or more database management systems, or by a combination of file management and at least one database management system.

Figure 28B:
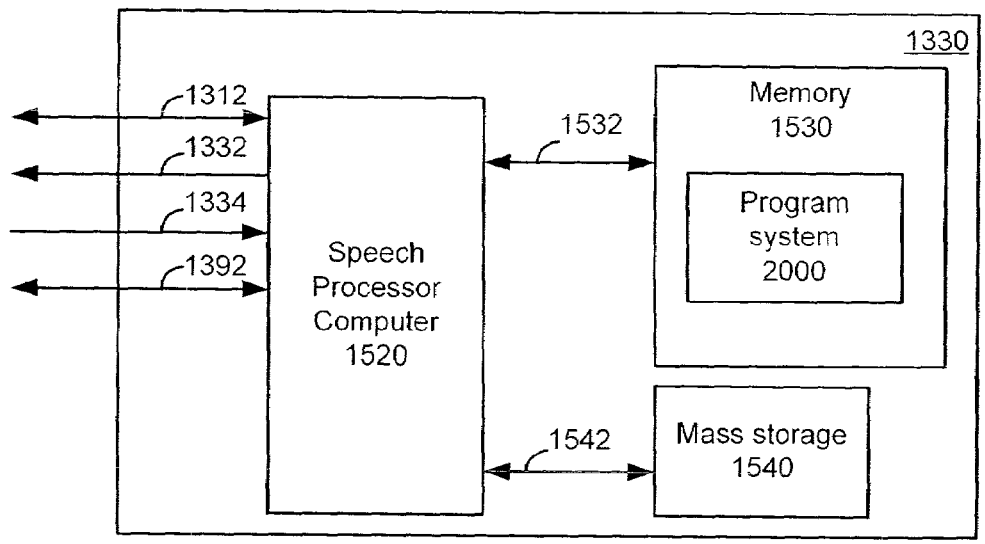
FIG. 28B depicts a block diagram of a speech engine 1330 as shown in FIG. 24.

FIG. 28B depicts a block diagram of a speech engine 1330 as shown in FIG. 24.

Receiver 1322 provides a back channel to speech processor computer 1520 through interactions 1328 with switch 1390 delivering 1392 the back channel to speech engine 1520.

Speech processor computer 1520 communicatively interacts 1374 with network interface 1370 by the speech processor computer 1520 interacting 1392 with switch 1390 which interacts 1398 with network interface 1370.

Speech processor computer 1520 may communicatively interact 1382 with system management and billing 1380 by communicatively interacting 1392 with switch 1390, which communicatively interacts with system management and billing 1380.

Speech processor computer 1520 may receive content status information from content engine 1340 by content engine 1340 interacting 1394 with switch 1390, which delivers 1392 the content status information to speech processor computer 1520.

As in FIG. 24, switch 1390 may support digital interfaces. Switch 1390 may include a circuit switch. The circuit switch may support Ethernet protocols. Switch 1390 may include an ATM switch. Switch 1390 may support analog interfaces. Such analog interfaces may include wavelength division multiplexing. Switch 1390 may be composed of more than one switch.

The operational discussions found in FIGS. 3, 4, 5 and 28A are directly applicable to systems implementing the invention and resembling the block diagram of FIG. 28B. They will not be presented regarding FIG. 28B. This is done simply to clarify the disclosure and is not intended in any way to limit the scope of the claims.

The invention may include various combinations of direct interconnections and switch networks as shown in FIGS. 23 and 24.

Figure 29:
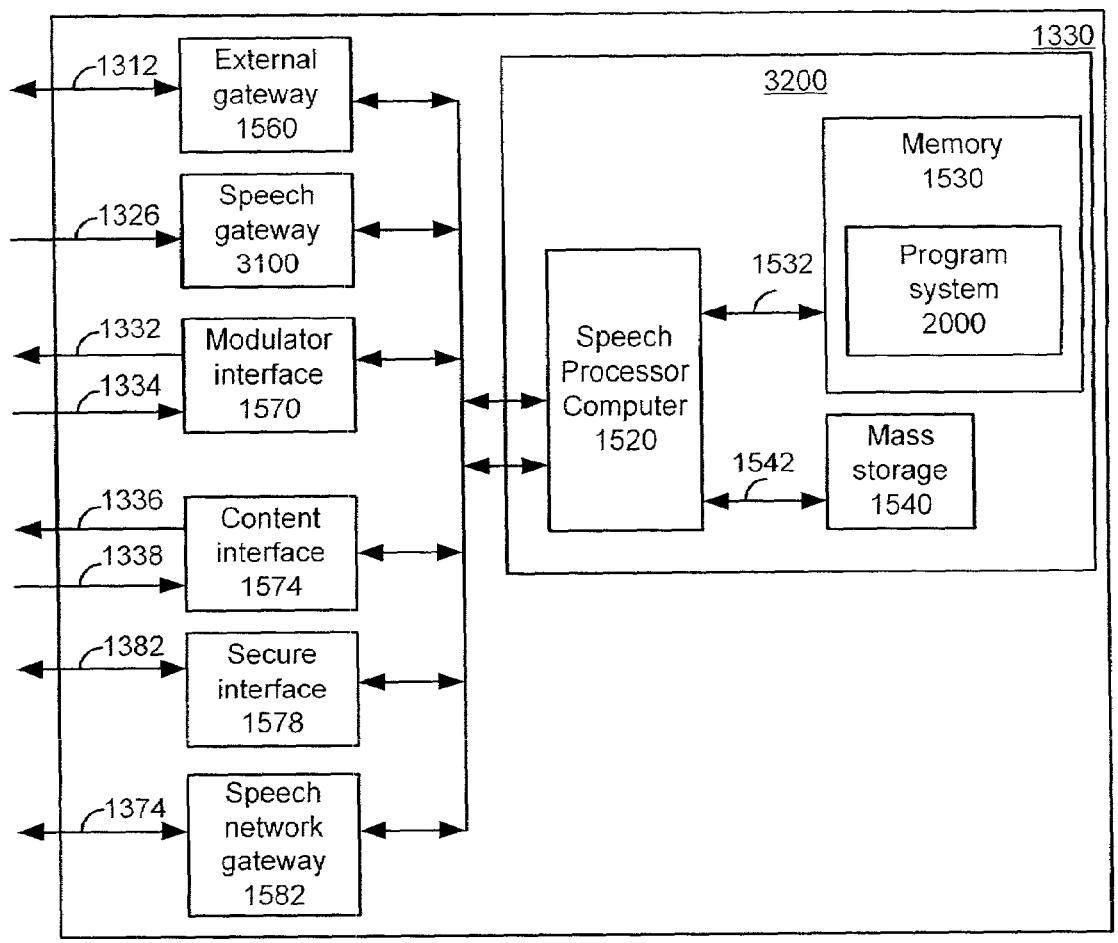
FIG. 29 depicts a more detailed block diagram of a speech engine 1330 as shown in FIG. 28A.

FIG. 29 depicts a more detailed block diagram of a speech engine 1330 containing gateway 3100 and tightly coupled server array 3200 as shown in FIG. 28A.

Server array 3200 includes at least speech processor computer 1520 communicatively coupled with at least speech gateway 3100.

Receiver 1322 provides 1326 a back channel to speech processor computer 1520 via speech gateway 3100. Speech gateway 3100 may further cache speech utterances from various user sites for speech processor computer 1520.

Speech processor computer 1520 further communicatively interact 1374 with network interface 1370 via speech network gateway 1582.

Speech processor computer 1520 may communicatively interact 1382 with system management and billing 1380 via secure interface 1578. Speech processor computer 1520 may send 1382 via secure interface 1578 requests for user account information, including, but not limited to, credit information, authorization profiles for channel viewing, credit limits and parental safeguards. Speech processor computer 1520 may send 1382 via secure interface 1578 user passwords, confirmation of commitments, commands regarding authorization levels of other users, such as children within a user's household.

Speech processor computer 1520 may receive 1382 via secure interface 1578 credit information, authorization profiles for channel viewing, credit limits and parental safeguards. Speech processor computer 1520 may receive 1382 via secure interface 1578 confirmation of acceptance of contracts from financial engines. Acceptance of contracts from external financial engines may be received in a number of different ways, including through interactions with network interface 1370 or other external communications networks 1312.

Speech processor computer 1520 may receive 1338 from content engine 1340 content status information. Content status information may include a list of available services through the coupled network(s). Content status information may further include a list of services available within the node.

Speech processor computer 1520 may generate one or more channels of speech response content through coupling 1332 to modulator engine 1350. Modulator engine 1350 may further provide 1334 status and reliability information to speech processor computer 1520. Speech response content channels presented through coupling 1332 may be digital. Speech response content channels may be presented as bits or clusters of bits of a specific bit width.

Multiple channels may be multiplexed onto coupling 1332 by speech processor computer 1520. The multiplexing mechanism onto channel 1332 may perform time division multiplexing.

Speech processor computer 1520 may further interact 1312 with an external network. Such an interaction may involve at least one wireline physical transport layer, each using at least one of optical, infra-red and radio frequency regions of the electromagnetic spectrum. Network interactions 1312 may support message passing protocols, including, but not limited to, TCP-IP and may further support communications with the Internet and World Wide Web.

Figure 30:
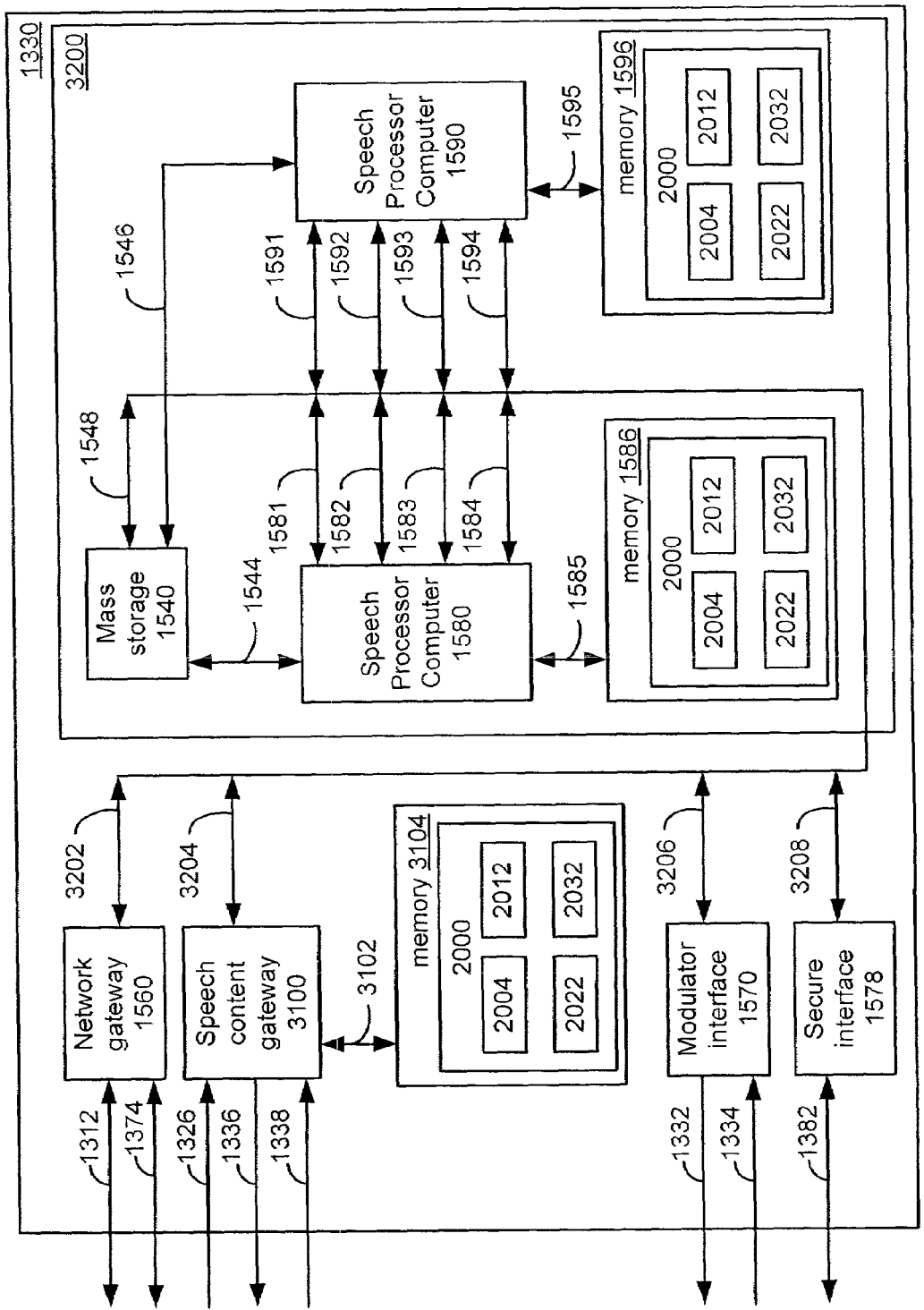
FIG. 30 depicts an alternative detailed block diagram of a speech engine 1330 as shown in FIG. 28A.

FIG. 30 depicts an alternative detailed block diagram of a speech engine 1330 as shown in FIG. 28A.

Speech engine 1330 includes server array 3200. Server array 3200 includes at least speech processor computer 1580 and speech processor computer 1590. At least one of speech processor computer 1580 and speech processor computer 1590 communicatively couples with speech gateway 3100.

Receiver 1322 provides 1326 a back channel to server array 3200 via speech content gateway 3100. Speech content gateway 3100 may further cache speech utterances from various user sites for server array 3200.

Speech content gateway 3100 may further include a computer accessibly coupled 3102 with memory 3104. Speech content gateway 3100 may be controlled by a program system containing program steps residing in memory 3104 for at least one of the operations of FIG. 10.

Speech processor computer 1580 and/or 1590 may communicatively interact 1382 with system management and billing 1380 via secure interface 1578. Speech processor computer 1580 and/or 1590 may send 1382 via secure interface 1578 requests for user account information, including, but not limited to, requests for credit information, authorization profiles for channel viewing, credit limits and parental safeguards. Speech processor computer 1580 and/or 1590 may send 1382 via secure interface 1578 user passwords, confirmation of commitments, commands regarding authorization levels of other users, such as children within a user's household.

Speech processor computer 1580 and/or 1590 within server array 3200 may receive 1382 via secure interface 1578 credit information, authorization profiles for channel viewing, credit limits, parental safeguards as well as confirmation of acceptance of contracts from financial engines.

Acceptance of contracts from external financial engines may be received in a number of different ways, including speech processor computer 1580 and/or 1590 interacting through network gateway 1560 with network interface 1374 and/or other external communications networks 1312.

Either speech processor computer 1580 or 1590 within server array 3200 may receive 1338 from content engine 1340 content status information.

Either speech processor computer 1580 or 1590 within server array 3200 may generate one or more channels of speech response content through modulator interface 1570 coupling 1332 to modulator engine 1350. Modulator engine 1350 may provide 1334 status and reliability information through modulator interface 1570 to at least one of speech processor computer 1580 and 1590 within server array 3200. Speech response content channels presented through modulator interface 1570 to coupling 1332 may be digital, presented as bits or clusters of bits of a specific bit width.

Multiple channels may be multiplexed through modulator interface 1570 onto coupling 1332 by server array 3200. The multiplexing mechanism onto channel 1332 may perform time division multiplexing. The multiplexing mechanism may be performed by modulator interface 1570.

At least one speech processor computer 1580 and 1590 within server array 3200 may communicatively interact 1374 with network interface 1370 via network gateway 1560.

At least one speech processor computer 1580 and 1590 within server array 3200 may interact 1312 with an external network involving at least one wireline physical transport layer. The wireline physical layer may support one or a combination of communication protocols using optical, infra-red and radio frequency regions of the electromagnetic spectrum. Network interactions 1312 may support message passing protocols, including but not limited to, TCP-IP, possibly including communications with the Internet and World Wide Web.

Speech processor computer 1580 and/or 1590 communicatively couples with mass storage 1540. Mass storage 1540 may include, but is not limited to, a disk, disk farm, or RAID organized by a file management system and/or by one or more database management systems.

Speech processor computer 1580 and/or Speech processor computer 1590 may perform at least some of the operations of FIG. 10 and be directed by program system 2000 containing program steps residing in memory 1586 and/or 1596 accessibly coupled 1585 and/or 1595 to the respective speech processor computer.

Speech processor computer 1580 may perform the same operations of FIG. 10 as speech processor computer 1590, possibly processing speech from different user sites.

Speech processor computer 1580 may perform different operations of FIG. 10 than speech processor computer 1590. By way of example, speech processor computer 1580 may perform receiving the back channel 2004 and partitioning the back channel into the multiple received identified speech channels 2012. Speech processor computer 1590 may perform processing the multiple received identified speech channels to create multiple identified speech contents 2022 and responding to the multiple identified speech contents 2032.

Speech engine 1330 may be controlled by a program system 2000 implementing the operations of FIG. 10 distributed as program steps residing in at least one of the memories 3104, 1586 and 1596. Each of the operations 2004, 2012, 2022, and 2032 may be implemented as program steps residing in memories 3104, 1586 and 1596.

By way of example, speech content gateway 3100 receives the back channel 2004. Speech processor computer 1580 partitions the back channel into the multiple received identified speech channels 2012. Speech processor computer 1590 processes the multiple received identified speech channels to create multiple identified speech contents 2022 and responds to the multiple identified speech contents 2032.

By way of an alternative example, speech content gateway 3100 receives the back channel 2004 and partitions the back channel into the multiple received identified speech channels 2012. Speech processor computers 1580 and 1590 each process the multiple received identified channels to create multiple identified speech contents 2022 and respond to the multiple identified speech contents 2032. Speech processor computers 1580 and 1590 perform these operations upon different identified speech channels based upon allocation decisions performed by speech content gateway 3100. To process a speech sample by the allocated speech processor computer into speech content, the processor computer must first contain in its local memory a copy of the grammar definition associated with the user site.

Figure 31:
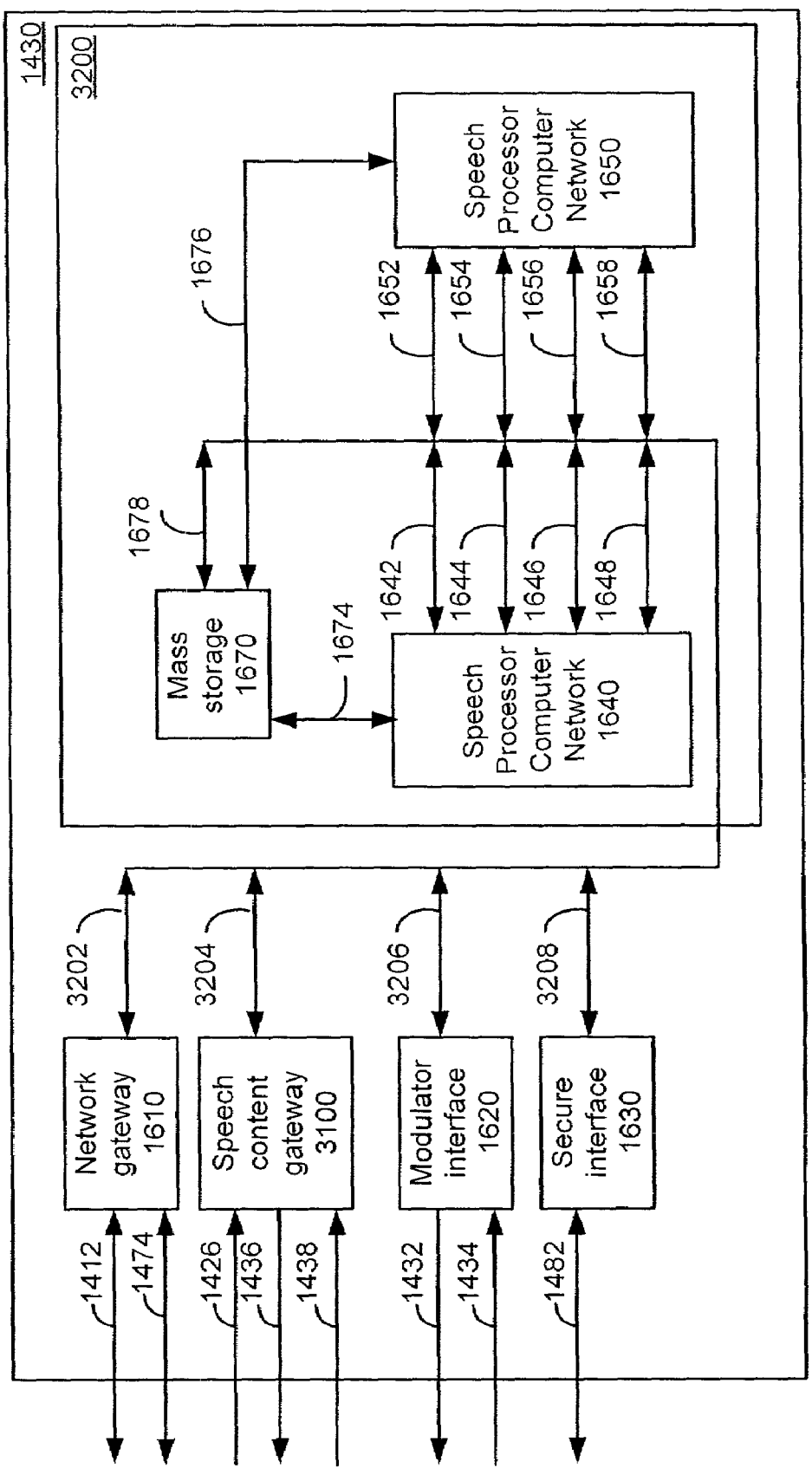
FIG. 31 depicts a second alternative detailed block diagram of a speech engine 1330 as shown in FIG. 28A.

FIG. 31 depicts a second alternative detailed block diagram of a speech engine 1430.

Server array 3200 at least includes speech processor computer networks 1640 and 1650. At least one computer contained in speech processor computer network 1640 and/or 1650 communicatively couples with speech gateway 3100.

At least one computer contained in speech processor computer network 1640 and/or 1650 performs at least some of the operations of FIG. 10 and may be directed by program system 2000 containing program steps residing in memory accessibly coupled to that computer.

Speech processor computer network 1640 may perform different operations of FIG. 10 than speech processor computer network 1650. By way of example, speech processor computer network 1640 processes the multiple received identified speech channels to create multiple identified speech contents 2022. Speech processor computer network 1650 responds to the multiple identified speech contents 2032.

Speech engine 1430 may be controlled by a program system implementing FIG. 10, distributed as program steps residing in memories accessibly coupled to at least one computer in one or more of the following: speech content gateway 3100, speech processor computer network 1640 and/or speech processor computer network 1650. Each of the operations 2004, 2012, 2022, and 2032 may be implemented as program steps residing in at least one of these memories.

By way of example, one or more computers in the speech content gateway 3100 receive the back channel 2004 and partition the back channel into the multiple received identified speech channels 2012. Computers in speech processor computer networks 1640 and/or 1650 process the multiple received identified speech channels to create multiple identified speech contents 2022 and respond to the multiple identified speech contents 2032. Computers in the speech processor computer networks perform these operations upon identified speech channels based upon allocation decisions performed by speech content gateway 3100.

At least one computer in speech processor computer network 1640 and/or 1650 communicatively interacts 1482 with system management and billing 1480 via secure interface 1630. That computer(s) may send 1382 via secure interface 1630 requests for user account information as well as commands regarding authorization levels of other users, such as children within a user's household. The user account information may include, but is not limited to, credit information, authorization profiles for channel viewing, credit limits, parental safeguards, user passwords, and confirmation of commitments. A computer in speech processor computer network 1640 and/or 1650 may receive 1482 via secure interface 1630 credit information, authorization profiles for channel viewing, credit limits, parental safeguards, as well as confirmation of acceptance of contracts from financial engines.

Acceptance of contracts from external financial engines may be received in a number of different ways, including through at least one computer in speech processor computer network 1640 and/or 1650 interacting through network gateway 1560 with network interface 1474 or with other external communications networks 1412.

At least one computer in speech processor computer network 1640 and/or 1650 may receive 1438 from content engine 1440 content status information.

At least one computer in speech processor computer network 1640 and/or 1650 generates one or more channels of speech response content through modulator interface 1620 coupling 1432 to modulator engine 1450. Modulator engine 1450 may provide 1434 status and reliability information through modulator interface 1620 to at least one computer in speech processor computer network 1640 and/or 1650.

At least one computer in speech processor computer network 1640 and/or 1650 communicatively interact 1474 with network interface 1470 via network gateway 1610. At least one computer in speech processor computer network 1640 and/or 1650 may interact 1412 with an external network.

Note that AgileTV™ Voice Processing Unit (AVPU) boxes 3000 may be included in speech engine 1430 and/or in speech processor computer network 1640 and/or 1650.

Figure 32A:
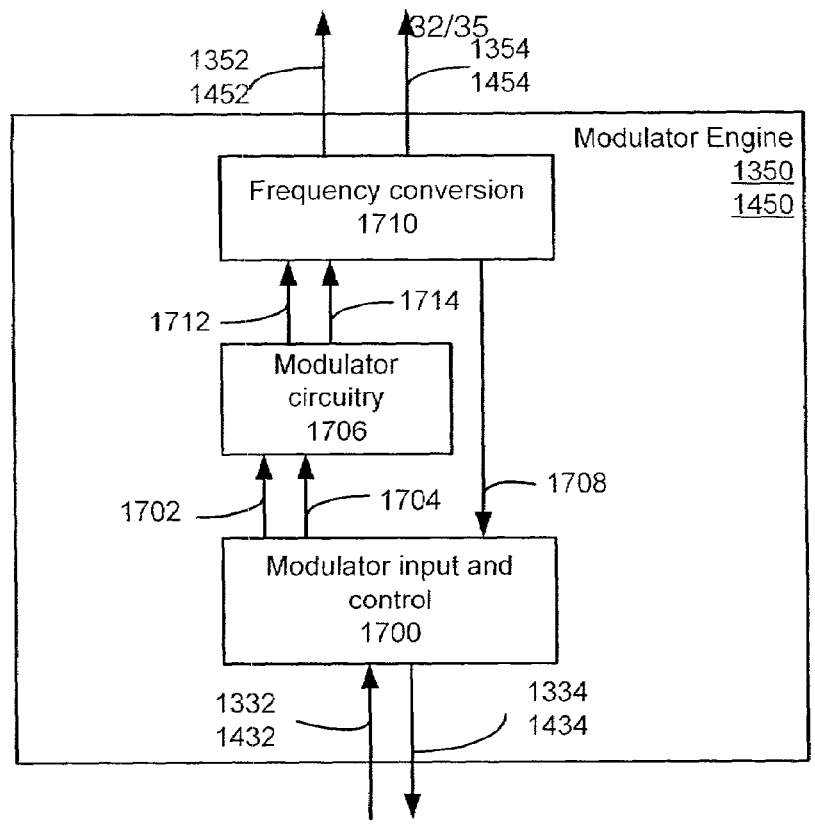
FIG. 32A depicts a block diagram of modulator engine 1350 of FIGS. 23 and 24, and modulator engine 1450 of FIGS. 26 and 27.

FIG. 32A depicts a block diagram of modulator engine 1350 of FIGS. 23 and 24, and modulator engine 1450 of FIGS. 26 and 27.

Speech engine 1330 or 1450 generates one or more channels of speech response content through coupling 1332 or 1432 to modulator engine 1350 or 1450, respectively. For the sake of simplifying the discussion, from the discussion of FIG. 32A focuses on its application in FIGS. 23 and 24. This is done strictly to clarify the discussion and is not meant to limit the scope of the claims.

Modulator engine 1350 may provide 1334 status and reliability information to speech engine 1330. Speech response content channels presented through coupling 1332 may be digital, presented as bits or clusters of bits.

Multiple channels are multiplexed onto coupling 1332 by speech engine 1330. The multiplexing mechanism onto channel 1332 may perform time division multiplexing. Modulator engine 1350 demultiplexes the multiple multiplexed channels received through coupling 1332, converting one or more demultiplexed channels into modulated channels or modulated collections of channels presented 1352 and 1354 to multiplexor engine 1360.

Note that the invention may target specific layers of a residential broadband network serving at least cable television needs for a user community. Modulator engine 1350 may satisfy specific requirements for a wireline node serving a Hybrid Fiber/Coaxial HFCOax node. Modulator engine 1450 may satisfy specific requirements for a wireline node serving a Headend or serving a metropolitan Headend.

Modulator engine 1350 may include modulator input and control circuit 1700 receiving one or more channels of speech response content through coupling 1332 and possibly providing 1334 status and reliability information to speech engine 1330.

Modulator input and control circuit 1700 may perform operations as disclosed in application Ser. No. 09/661,486, entitled N-way Demultiplexor, docket number AGLE0008, filed 14 Sep. 2000, and incorporated herein by reference.

Modulator input and control circuit 1700 generates at least one channel code stream 1702 provided to modulator circuit 1706. Modulator circuit 1706 uses the channel code stream 1702 to generate an intermediate frequency channel stream 1712 presented to frequency conversion circuit 1710.

By way of example, FIG. 32A depicts modulator input and control circuit 1700 generating a second channel code stream 1704 presented to modulator circuit 1706. Modulator circuit 1706 uses this second provided channel code stream 1704 to generate a corresponding intermediate frequency channel stream 1714 presented to frequency conversion circuit 1710.

Frequency conversion circuit 1710 receives at least one intermediate frequency channel stream 1712 and generates a frequency channel output stream 1352 presented to multiplexor engine 1360, as shown in FIGS. 23 and 24. Similarly in FIGS. 26 and 27, frequency conversion circuit 1710 receives at least one presented intermediate frequency channel stream 1712 and generates a frequency channel output stream 1452 presented to multiplexor engine 1460.

Frequency conversion circuit 1710 may receive a second presented intermediate frequency channel stream 1714 and generate a second frequency channel output stream 1354 presented to multiplexor engine 1360, as shown in FIGS. 23 and 24. Similarly in FIGS. 26 and 27, frequency conversion circuit 1710 may receive a second presented intermediate frequency channel stream 1714 and generate a second frequency channel output stream 1454 presented to multiplexor engine 1460.

Frequency conversion circuit 1710 may provide feedback 1708 to modulator input and control 1700, which may be part or all of the status and reliability information 1334 provided to speech engine 1330.

Alternatively feedback 1708 may be status and reliability information 1334 directly provided to speech engine 1330, rather than through modulator input and control 1700. This alternative has not been diagramed to simplify the discussion, but is not intended to limit the scope of the claims.

Modulator circuit 1706 generates intermediate frequency channel stream 1712 using provided channel code stream 1702.

Intermediate frequency channel stream 1712 may include presentation of a sinusoidal waveform represented as a digital stream, or as an analog stream. Presented channel code stream 1702 may include phase control information and/or include frequency control information include amplitude control information. The frequency control information may further regard an intermediate frequency carrier.

Control information may be presented in a separate channel stream.

The intermediate frequency channel stream generation mechanism may support coherent detection and use of the intermediate frequency carrier in a downstream user site receiver. The intermediate frequency channel stream generation mechanism may support modulation mechanisms, including at least, Phase Shift Keying (PSK), Frequency Shift Keying (FSK), Amplitude Shift Keying (ASK), Continuous Phase Modulation (CPM), hybrid combinations, Offset Quadrature PSK (OQPSK), Minimum Shift Keying (MSK), Quadrature Amplitude Modulation (QAM), Coded Orthogonal Frequency Division Multiplexing (COFDM) and Vestiginal Side Band (VSB), in particular 8 level VSB (8-VSB).

The intermediate frequency channel stream generation mechanism may support noncoherent detection in downstream user site receivers of the intermediate frequency carrier and/or detection mechanisms not requiring a carrier reference. The intermediate frequency channel stream generation mechanism may support modulation mechanisms, including at least, Differential Phase Shift Keying (DPSK), Frequency Shift Keying (FSK), Amplitude Shift Keying (ASK), and certain hybrid schemes of these mechanisms not requiring a carrier reference.

Intermediate frequency channel stream 1712 may include presentation of a wavelet function represented as a digital stream or as an analog stream, which may further include dilation control information and/or temporal offset control information and/or amplitude control information.

Intermediate frequency channel stream 1712 may include presentations of both sinusoidal and wavelet functions.

The invention may include multiple frequency conversion circuitry instances 1710 and multiple modulator circuitry instances 1706 in modulator engine 1350 with possibly different numbers of instances of frequency conversion circuitry 1710 and of modulator circuitry 1706.

The invention may include multiple frequency conversion circuitry instances 1710 and modulator circuitry instances 1706 in modulator engine 1450 with possibly different numbers of instances of frequency conversion circuitry 1710 and of modulator circuitry 1706.

Demultiplexing a 2.5 gigabit per second bit stream leaving the speech engine 1330 or 1430 may be performed by a preprocessor CPU creating two 16 bit streams. The preprocessor CPU may be part or all of a Broadcom BCM 12500 integrated circuit converting the Ethernet links, with approximately three gigabit bits per second, into two 16 bit 150–160 MHz digital streams.

Modulator input and control 1700 may include two preprocessor CPUs parsing the dual 16 bit interface streams into 96 channels of data, or alternatively, include this function performed by hardware.

Modulator circuitry 1706 may include multiple modulators and may include multiple instances of multiple channel modulators, which may implement an octal QAM (Quadrature Amplitude Modulator).

Clusters of 8 channels of data may be sent to each Octal QAM for conversion to a intermediate frequency signal presented to an associated multi-channel frequency upconverter 1710 to generate 8 discrete channels sharing the same output frequency. Each channel output is supplied to one or more nodes to the exclusion of other nodes.

One system wide channel may be devoted to the audio-video feedback of the speech recognition system, of which there are 96 instances of that single channel which are then multiplexed into 96 different fiber transmission lines, each with a unique speech recognition related television channel.

This is exploited much more efficiently than any known prior art. Because all these frequency up conversions target the same frequency band, the frequency conversion mechanism for multiple channels can share several critical components, such as local reference oscillators, which must otherwise be instantiated for each channel separately.

By performing the frequency conversion mechanism upon blocks of channels, an optimization is available in neighborhoods with extensive Internet usage. In such situations, a neighborhood may be allocated a second TV channel for Internet presentation. By reconfiguring one block of frequency converters to that second channel, up to 8 neighborhoods could receive a second television channel.

Configuring these frequency conversion mechanisms as a frequency agile block changes the channel frequency bands of all the channels of the frequency agile block simultaneously.

The cost savings are dramatic. Regarding reliability issues: there are far fewer parts, a simpler design and less heat, all tending to increase reliability.

There may be a hierarchy of multiplexors operating within content engine 1340 or 1440. System wide channels are multiplexed in the one set of multiplexors within the content engine 1340 or 1440. Node specific channels may be multiplexed in a second set of multiplexors within the content engine 1340 or 1440, which may be within a multiplexor engine such as 1460.

In a cable TV system using a VOD server, 8 to 16 channels per node are often used for delivery of video on demand. These node specific channels are multiplexed in a second set of multiplexors within the content engine 1340 or 1440 and may be further multiplexed in multiplexor engine 1460.

Each NTSC television channel has approximately 6 MHz of bandwidth, which through the use of the QAM64 modulators, delivers 27 M bps. The 2.5 Gigabit per second being delivered supports about 4500 Internet users.

Figure 32B:
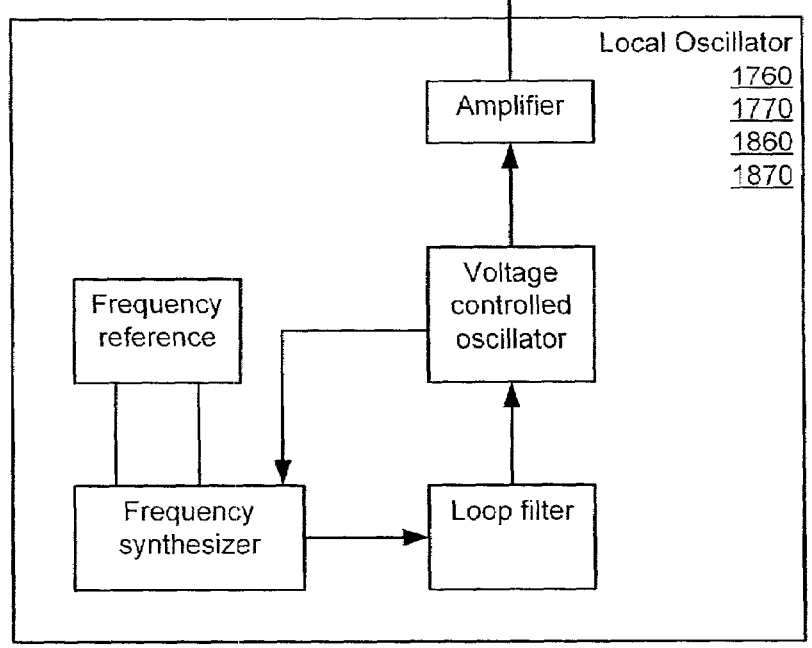
FIG. 32B depicts a block diagram of a local oscillator as is known in the art for use as a local oscillator depicted in FIGS. 33 and 34 as LO1 1760, LO1 1860, LO2 1770 or LO2 1870.
Figure 33:
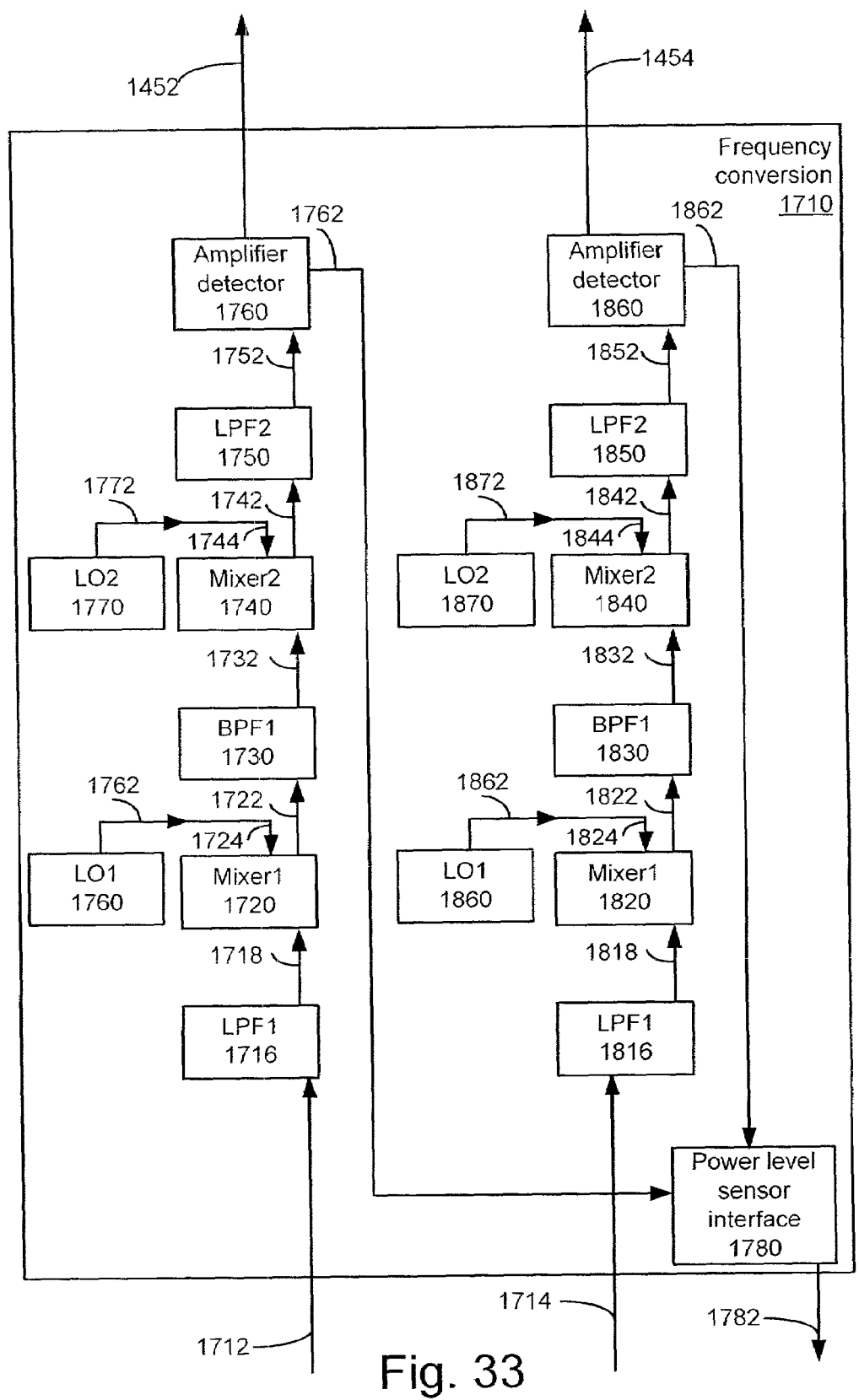
FIG. 33 depicts a detail block diagram of frequency conversion circuitry 1710 of FIG. 32A.
Figure 34:
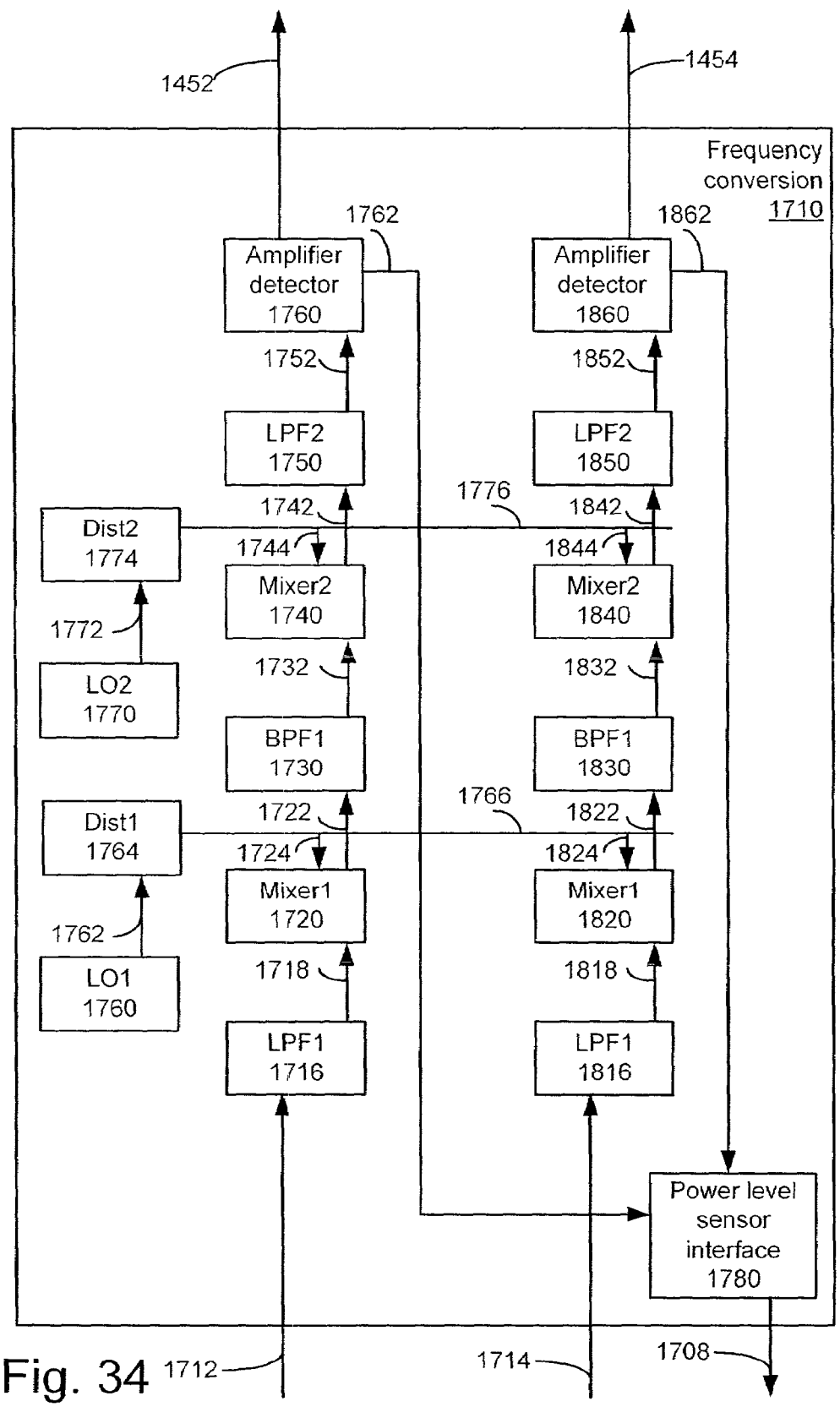
FIG. 34 depicts an alternative detail block diagram of frequency conversion circuitry 1710 of FIG. 32A.

FIG. 32B depicts a block diagram of a local oscillator as is known in the art for use as a local oscillator depicted in FIGS. 33 and 34 as LO1 1760, LO1 1860, LO2 1770 or LO2 1870.

The first Local Oscillator (LO1) 1760 or 1860 may operate at a fixed frequency 1762 in the range from 900 MHz to 1100 MHz. A second Local Oscillator (LO2) 1770 or 1870 may operate 1772 in a variable range from 1 to 2 GHz, depending on the desired output frequency range.

The Local Oscillators each comprise a voltage controlled oscillator, a frequency synthesizer and a loop filter. The frequency synthesizer requires a frequency reference. The output of the voltage controlled oscillator is amplified to create local oscillator output, which in various instances is labeled 1762, 1772, 1862 and 1872.

The frequency synthesizers are required to meet the demanding phase noise, frequency stability and frequency settability requirements of a modern digital cable television network. A substantial portion of the circuitry in the typical Upconverter 1710 is dedicated to the synthesizers of the local oscillators 1760, 1770, 1860 and 1870.

Specific applications in cable television require a common frequency but with multiple RF outputs such as broadcasting node specific video content or data over multiple nodes using a fixed channel frequency the current practice is to rely on individual RF modulators/Upconverters 1710 per node. Using individual modulator/Upconverters consumes a large amount of equipment rack space which, for many nodes, including most CATV headends, is a rare commodity.

FIG. 33 depicts a detail block diagram of frequency conversion circuitry 1710 of FIG. 32A.

A substantial portion of the circuitry in the typical Upconverter is dedicated to the synthesizers of the local oscillators 1860 and 1870.

The invention includes methods implementing a Common Carrier, Multiple Output RF Upconverter 1710, which include at least one of two methods by which to distribute Local Oscillator signals. The distribution methods provide a local oscillator signal from one local oscillator to multiple upconverter sections simultaneously, eliminating the frequency synthesizers and Voltage Controlled Oscillators typically required for each individual upconverter section. Eliminating these frequency synthesizers and local oscillators substantially reduces the board space and component count normally required for these functions.

By providing a distributed LO, only two LO synthesizers and VCO's are required per board where a board might support anywhere from 2 to 12 or more, upconverter sections.

FIG. 34 depicts an alternative detail block diagram of frequency conversion circuitry 1710 of FIG. 32A.

For the purposes of simplifying the discussion, the two methods of distributing local oscillator signals will be discussed as associated with the first and second local oscillator, respectively. This is done strictly to simplify the discussion and is not meant to limit the scope of the claims. The first distribution mechanism may be used to distribute the second local oscillator signal(s). The second distribution mechanism may be used to distribute the first local oscillator signal(s).

The first mechanism 1764 distributes the local oscillator signal using hybrid splitters 1766 where the RF output of each tap 1724 and 1824 is fed to the respective frequency conversion sections.

A second mechanism 1774 distributing local oscillator signals uses a distributive signal splitting scheme comprised of a series of hybrid directional couplers equally spaced along a signal distribution path. The Local Oscillator signal from the tap of each coupler is then fed to the LO input 1744 and 1844 of each upconverter section. At the 950 to 1100 MHz LO frequencies mentioned above, a directional coupler may be implemented using circuit board traces 1776 in specific geometric pattern, eliminating the need for additional physical components.

Both methods require the LO signals from the splitters or the directional couplers undergo amplification immediately after splitting using a common Monolithic Microwave Integrated Circuit (MMIC) and/or may be incorporated into mixers 1720, 1740, 1820 and 1840.

The Local Oscillator signal levels fed to the mixers are adjusted through the use of resistive attenuators to accommodate the LO drive level specified by the mixer manufacturer. For passive type mixers, the LO drive levels range from +13 dBm to +17 dBm. For active mixers such as a Gilbert Cell based devices, the LO drive levels vary widely, according to the configuration of the mixer. Many Gilbert Cell type mixers incorporate a LO amplifier, thereby requiring very low external LO drive levels, typically in the range from −10 dBm to +2 dBm.

The Common Carrier, Multiple Output type upconverter differs from the conventional CATV upconverter in that typically, conventional Upconverters are set up to output a separate frequency for each upconverter unit. In contrast, The Common Carrier, Multiple Output Upconverter outputs the same frequency for each upconverter unit.

The Intermediate Frequency (IF) inputs 1712 and 1724 to the Common Carrier, Multiple Output Upconverter may be either a 44 MHz or a 43.75 MHz (Center Frequency) Intermediate Frequency. The bandwidth of the IF is typically 6 MHz for U.S. applications and 7 to 8 MHz for international applications. The 55 MHz Low Pass Filters 1716 and 1816 serve two functions. First, they remove any second or third harmonics generated in the amplifier chain or D/A converter as in the case of QAM modulation in 1706. Second, they serve as de-glitching filters for applications that use a D/A converter to generate the 44 MHz IF such as a QAM modulator 1706.

The filtered 44 MHz IF 1718 and 1818 at the output of the 55 MHz filter 1716 and 1816 is fed to the RF input of the First Mixer 1720 and 1820 where it is mixed with the first Local Oscillator 1760. By way of example, assume the frequency of the First Local Oscillator 1760 is 903 MHz. The output 1722 and 1822 of First Mixer 1720 and 1820 contain an upper and lower sideband around this Local Oscillator frequency. These sidebands, located at 44 MHz above and 44 MHz below the 903 MHz Local Oscillator frequency, are amplified and fed to the 947 MHz bandpass filter BPF1 1730 and 1830. The 947 MHz bandpass filter 1730 and 1830 passes the 903+44 MHz (947 MHz) upper sideband and rejects the 903−44 MHz (859 MHz) lower sideband.

The filtered output 1732 and 1832 from 947 MHz filter 1730 and 1830 is fed into the RF input of second mixer 1740 and 1840 where it is mixed with the Local Oscillator 1770. The second Local Oscillator 1770 includes a wide bandwidth VCO controlled by a frequency synthesizer. The Second Local Oscillator 1770 may operate from 1.0 GHz to a little over 1.8 GHz with a frequency step size of 250 KHz. Output 1742 and 1842 from the second mixer 1740 and 1840 contains several frequency products, including the upper and lower sidebands.

The upper sideband is formed by adding 947 MHz to the frequency of the Second Local Oscillator 1770. If the frequency of the Second Local Oscillator 1770 is set to 1000 MHz, then the frequency of the upper sideband coming from the Second Mixer 1750 and 1850 is 947 MHz+Frequency of the Second Local Oscillator 1770 (1000 MHz) or 1947 MHz.

This sideband, which is unwanted, may be filtered out by the 950 MHz Lowpass filter 1750 and 1850 and is not seen at the RF output 1452 and 1454 of the frequency conversion circuitry. The frequency of the lower sideband, which is desired, is determined by the frequency of the second LO (1000 MHz) −947 MHz producing an output frequency of 53 MHz, which easily passes through the 950 MHz Lowpass filter.

If the frequency of the Second Local Oscillator 1770 was increased to 1807 MHz, then the lower sideband from the second mixer 1740 and 1840 would be 860 MHz, still able to pass through the 950 MHz Lowpass output filter 1750 and 1850. The outputs 1752 and 1852 from the 950 MHz Lowpass filter 1750 and 1850 are amplified in amplifier detector 1760 and 1860 to obtain the desired output level and sent 1452 and 1454 to the output connector. The amplifier detector may further include tapping off a small portion of the output power, using a directional coupler, to facilitate power measurement 1762 and 1862.

The Common Carrier, Multiple Output method differs from the conventional upconverter in at least the following ways. In the Common Carrier system, a single first Local Oscillator and second Local Oscillator drive each upconverter section in a multiple upconverter system. This is accomplished by splitting the Local Oscillator signal into as many lines as needed to drive the mixer in each section. After splitting the LO signal N times, the LO power is reduced and requires amplification to bring the level up for the respective mixer. By splitting both first and second Local Oscillator signals in this manner, the number of upconverter sections for a given board size can be increased dramatically.

Splitting the Local Oscillator can also be achieved using directional couplers. To maintain essentially consistent LO power along the distribution path, the directional coupler method uses couplers with varying tap values. Couplers closest to the VCO's have the highest tap values (Highest tap attenuation) and the couplers closest to the end have the lowest tap values.

The operations of the vertical chains of mixers and filters are essentially the same as described in FIG. 33.

In the first frequency conversion section of upconverter 1710 of both FIGS. 33 and 34, the second Local Oscillator (LO2) 1770 may comprise a wide bandwidth Voltage Controlled Oscillator, providing the frequency setting agility to span the 50 to 860 MHz frequency range mentioned above. Both Local Oscillators 1760 and 1770 may require high stability frequency synthesizers to meet phase noise, frequency stability and frequency settability requirements of a modern digital cable television network, by way of example.

Consider the second frequency conversion section of FIG. 34. Received intermediate frequency channel stream 1714 may be filtered 1816 to present a filtered intermediate frequency signal 1818 to Mixer1 1820.

Unlike FIG. 33, there is no first Local Oscillator (LO1) 1860 in the second frequency conversion section typically operates at a fixed frequency 1862 in the range from 900 MHz to 1100 MHz.

Unlike FIG. 33, there is no second Local Oscillator (LO2) 1870 operates 1872 in the range from 1 to 2 GHz, depending on the desired output frequency range.

Substantial circuitry of this Upconverter section is released from supporting the local oscillators 1860 and 1870, of FIG. 33.

Figure 35:
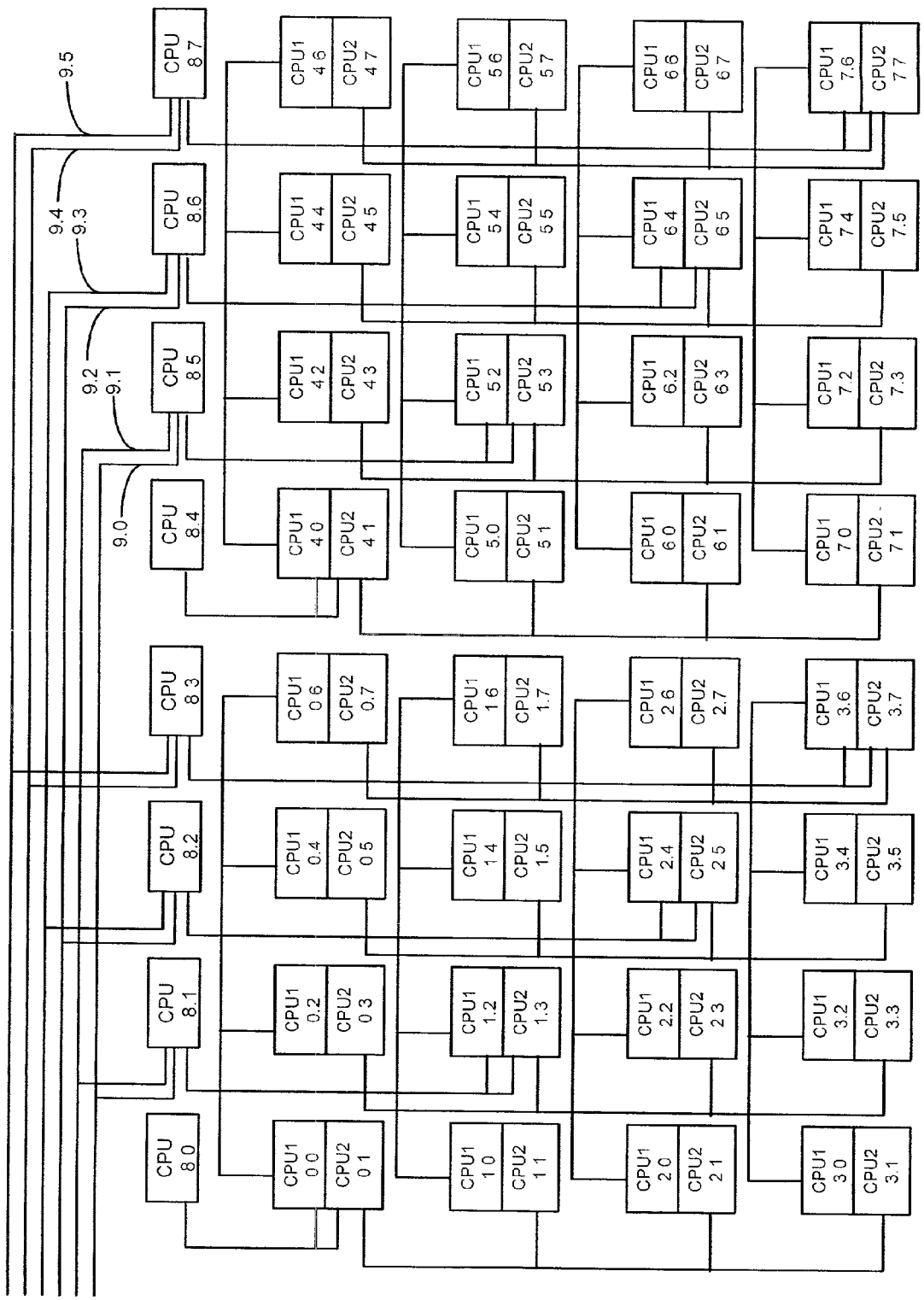
FIG. 35 depicts a detailed diagram of speech engine 1330 as shown in FIG. 23 or speech engine 1430 as shown in FIG. 27 containing two plex communications grids with dual, redundant gateways.

FIG. 35 depicts a detailed diagram of speech engine 1330 as shown in FIG. 23 or speech engine 1430 as shown in FIG. 27 containing two plex communications grids with dual, redundant gateways.

The numbering scheme is consistent with plex.cpp, an appendix to application Ser. No. 09/679,115, entitled "System and Method of a Multi-dimensional Plex Communication Network", docket number AGLE0003, filed 14 Oct. 2000, which is incorporated by reference herein.

ROM and mass storage is coupled to CPU 8.0, which is associated with node 0.0 of the first plex network. CPU 8.0 is reserved for certain control and security activities, such as maintaining the mass storage system and its interface, as well as initializing the rest of the plex communication grid to which it is coupled. Mass storage may include RAID mass storage systems.

Note that CPU 8.0 is coupled with both CPU1 0.0 and CPU2 0.1. This coupling may be achieved by various mechanisms, including but not limited to, a bridge circuit interface to a bus tightly coupling CPU1 and CPU2, implementing a bus standard such as LDT or PCI.

Similar couplings are shown for the following: CPU 8.1 coupled with CPU1 1.2 and CPU2 1.3. CPU 8.2 coupled with CPU1 2.4 and CPU2 2.5. CPU 8.3 coupled with CPU1 3.6 and CPU2 3.7. CPU 8.4 coupled with CPU1 4.0 and CPU2 4.1. CPU 8.5 coupled with CPU1 5.2 and CPU2 5.3. CPU 8.6 coupled with CPU1 6.4 and CPU2 6.5. CPU 8.7 coupled with CPU1 7.6 and CPU2 7.7.

ROM and mass storage are redundantly coupled to CPU 8.4, associated with the second plex network. This removes the possibility of a failure in the coupling between either the ROM or mass storage causing systemic failure in the speech engine as a whole. Software running on CPU 8.0 and CPU 8.4 may further support fail-over in the event of a failure of either CPU.

CPUs 8.0 and 8.4 act as dual, redundant secure interface gateways.

The control processors of the AgileTV™ engines may be treated differently by the message routing algorithms: No messages may be routed through the control processors, CPU 8.0 and 8.4, headed for a different destination. The CPU 8.0 and 8.4 IO lines may support internal management functions within the node of the cable network, specifically management and billing. This is advantageous for security, making it harder for hacker attacks to penetrate to the management and billing communications, since such attacks will not be able to directly communicate with CPU 8.0 and 8.4 or their IO lines.

Alternatively, special classes of communications may route through the control processor with defined protocols. Other types of communications may transit the node to which the control processor belongs, but may not terminate at the control processor. While it is common for large-scale networks to be partitioned, this partitioning approach is novel, providing very well characterized data paths for both management and billing communications.

It is advantageous that the control processor owns the disk resources, so that sensitive information such as credit card information does not go through less secure components of the plex network. Sensitive information goes directly from the disk resource through the control processor to the billing application.

Security may be heightened by use of at least one encryption standard including the AES algorithm recently proposed by the US government.

Input processors (8.1 and 8.5) perform the following: receiving incoming speech packets; buffering the received speech packets; detecting last packet of the received packet sequence to create a complete packet-sequence; and translating the received packet sequence to create a complete audio utterance.

The content gateway includes processors 8.1 and/or 8.5. After registering the application with the AgileTV™ engine, static menu content and dynamic content are provided to the AgileTV™ engine. A speech processor within the AgileTV™ engine sends messages to an application server within the content engine through the content gateway, indicating the current user location in the menu structure and the requested user actions. This triggers events in a real-time event driven program operating system executing within the application server.

CPUs 8.1 and 8.5 may also run a job assignment manager. The job assignment manager may further behave much like a finite state machine.

The IO and control CPUs, 8.1 to 8.7, may be seen as separate from the plex array of processors, or as components of specialized plex-nodes within the plex. The invention may include placing control and IO CPUs as a row of processing resources arranged on a diagonal of the array. The array may be square. Boot ROMs, RAID interfaces, additional communication and image processing capabilities may be additionally coupled to one or more of the IO and control CPUs.

A service modem may connect to a line outside the building of a node or head-end. Each installation may have this modem as a final backup communication channel to a remote service center. CPUs 8.0 and 8.4 may also have the dual modems on a telephone line connected to a remote service center.

CPUs 8.1 and 8.5 are input CPUs communicating the head-end receivers, local content servers such as VOD servers and IPG servers.

CPUs 8.2 and 8.6 are Internet interface processors providing firewall capability.

CPUs 8.3 and 8.7 drive the AgileTV™ modulator system 1350 or 1450 as shown in FIGS. 23, 24, 26 and 27.

External network interfaces 1312 and 1412 may include External OC-48 (2.5 Gigabit) and/or Gigabit Ethernet Internet lines. This is a central linkage to the Internet supporting 100M bit Ethernet or other communications protocol.

AgileTV™ engine 3000, 1330, and 1430 may include two planes of processors, connected by tunnels, each processor plane containing a row of processors coupled by the tunnels and positioned about the diagonal of each processor plane. A diagonal as used herein refers to a collection of locations within an array of at least two dimensions which collective contain nodes coupled to every pencil in every orthogonal pencil ####

Carrier class reliability of 99.999% is the baseline reliability for the plex communications networks. Simulation analyses by one of the inventors confirm that the redundancy inherent in multiple communication pencils intersecting at a plex-node provides significant fault tolerance. These simulations, using the plex.cpp program, indicate that for up to 25 system element failures, there were no message routing failures for 42 out of 43 experiments. The independent power supplies driving dual, plex planes further support these reliability objectives, since if one power supply fails, only half of the system fails. The other half of the system continues to perform, though performance is reduced.

A scaling methodology including another reliability mechanism is desirable. It is achieved at no appreciable increase in the usual systems overhead issues, latency, bandwidth, creating communication bottlenecks or adding significant additional computational loads to the network node components. Another IO processor is added for inter-engine plex-ing to couple multiple plex network hierarchies by the following method: Pick a plex-node, add an inter-processor communication interface internal to the plex-node and an another IO processor coupled to the inter-processor communications interface. The inter-processor communications interface may support a bus, which may be an LDT-compliant bus.

Putting two of these IO processors into the network shown in FIG. 35 supports another 6 gigabit Ethernet fibers. This supports a 4 by 4 plex of AgileTV™ engines or speech engines. Plex-nodes of this plex network would each contain an AgileTV™ engine or speech engine, containing two planes of 4 by 4 plex networks of plex-nodes each having at least two CPU's. Each CPU may contain at least dual instruction processors.

Such a system supports extremely large computing requirements, such as quantum mechanical modeling of long chain hydrocarbons, or a video server for a population such as a district of a city, e.g. Brooklyn.

The 4 by 4 plex of AgileTV™ speech engines readily fits into an 8 ft (2.6 meter) by 10 ft (3.3 meter) closet by 8 foot (2.6 meter) ceiling. The system is estimated to handle speech recognition for 560,000 cable subscribers with more than 30,000 users talking, with 20–30 gigabits bandwidth exchanged for the user community being served by such cable television systems. The system would exceed the raw compute performance of ASCI White, the world's fastest supercomputer installed at Lawrence Livermore Laboratories in the year 2000.

The AgileTV™ engine provides MPEG throttling techniques enabling support of more users than would otherwise be possible without such intelligent bandwidth management.

The AgileTV™ engine further supports designating a specific subset of plex-nodes, and coupling each plex-node of the subset to at least one additional processor. This provides communication to additional communication pencils connecting to other systems components, which may be additional plex communication networks of processor plex-nodes and may also enhance the security of multiple applications through partitioning.

Communication pencils intersecting at a plex-node provide a hierarchical connection methodology supporting arbitrarily large collections of concurrent computing resources. The communication delay to traverse such a system may grow on the order of the logarithm of the number of computing resource plex-nodes interconnected by these communication pencils.

The methodology using these innovations provides a remarkably large amount of computing resources coupling to almost any communications protocol.

The application of this methodology to cable television networks, with extremely limited upstream communication bandwidth, enables speech recognition over cable television, in turn enabling a breakthrough in user friendliness unattainable in the home entertainment environment today.

The further application of this methodology supporting user site addressing and the identification of user speech associated with the user site aids the responsiveness of such systems.

An internet browser may execute on a processor in the AgileTV™ engine, decomposing the browser view into pixel frames, which are processed into a MPEG stream, and sent to the frequency up converters, etc.

Consider speech actuated interactive game playing. Large motion video sequences may be placed on a game server. The playing of the appropriate motion video sequences may be controlled by speech commands using the game server as a local VOD server to the head-end node, communicating through a sufficiently high-speed and responsive communication mechanism, which could be the Internet.

Interactive gambling is supported across cable television networks.

Interactive shopping, based upon shopping content placed on a VOD server and activated through the speech recognition responses of the AgileTV™ engine, is supported.

Interactive auctioning is supported across cable television networks.

Interactive speech communications applications are supported across cable television networks.

The preceding embodiments of the invention have been provided by way of example and are not meant to constrain the scope of the following claims.

The invention claimed is:

1. A method of using a back channel containing a multiplicity of identified speech channels from a multiplicity of user sites presented to a speech processing system at a wireline node in a network supporting at least one of cable television delivery and video delivery, comprising the steps of:

receiving said back channel to create a received back channel;
partitioning said received back channel into a multiplicity of received identified speech channels;
processing said multiplicity of said received identified speech channels to create a multiplicity of identified speech content; and
responding to said identified speech content to create an identified speech content response that is unique, for each of said multiplicity of identified speech contents.

2. The method of claim 1,
wherein at least one of said identified speech channels has an associated user site; and
wherein the step partitioning said received back channel is further comprised of the step of:
  partitioning said received back channel into a multiplicity of said received identified speech channels from said associated user site;
wherein the step processing said multiplicity of said received identified speech channels is further comprised the step of:
  processing said multiplicity of said received identified speech channels from said associated user site to create a multiplicity of said identified speech contents; and
wherein the step responding to said identified speech content is further comprised the step of:
  responding to said identified speech content from said associated user site to create said identified speech content response for said associated user site.

3. The method of claim 2,
further comprising at least one member of the collection containing the steps of:
  determining said associated user site from said received identified speech channel;
  determining said associated user site from said identified speech content;
  determining said associated user site from said identified speech content and a speaker identification library;
  determining said associated user site from said identified speech content and a speech recognition library; and
  determining said associated user site from an identification within said speech channel.

4. The method of claim 2,
wherein the step responding to said identified speech contents from said associated user site is comprised of the steps of:
  processing said identified speech content response to create said identified user site response; and
  sending said identified user site response to said identified user site.

5. The method of claim 2,
wherein the step responding to said identified speech contents from said associated user site is comprised of the steps of:
  assessing said speech content response identified as to said user site to create a financial consequence identified as to said user site; and
  billing said user site based upon said financial consequence.

6. The method of claim 2,
wherein the step responding to said identified speech contents from said associated user site is comprised of the steps of:
  assessing said speech response to create a financial consequence identified with said user site;
  displaying said financial consequence to create a displayed financial consequence at said user site;
  confirming said displayed financial consequence from said user site to create a financial commitment; and
  billing said user site based upon said financial commitment.

7. The method of claim 6,
wherein the step responding to said identified speech contents from said associated user site is comprised of the steps of:
  identifying a user based upon said speech content identified as to said user site to create an identified user.

8. The method of claim 7,
wherein the step identifying said user is comprised of the steps of:
  fetching a user profile list based upon said user site, said user profile list containing at least one user profile;
  identifying said user based upon said speech content and based upon said user profile list to create an identified user.

9. The method of claim 8,
wherein the step assessing said speech response is further comprised of the step of:
  assessing said speech response based upon said identified user to create a financial consequence for said identified user.

10. The method of claim 2,
wherein said speech content response is comprised of a current response menu and a cumulative user site response is identified as to said user site for at least one of said user sites.

11. The method of claim 10,
wherein the step responding to said identified speech content from said associated user site further comprising at least one member of the collection comprising the steps of:
  responding to said speech content based upon said current response menu and based upon said cumulative user site response to create a new cumulative user site response; and
  assessing said speech content based upon said current response menu and based upon said cumulative user site response to create a new current response menu.

12. The method of claim 2,
wherein the step responding to said identified speech content from said associated user site is further comprised of the step of:
  responding to said speech content identified as to said user site based upon natural language to create a speech content response of said speech content identified with said user site.

13. The method of claim 2,
wherein the step processing said multiplicity of said received speech channels is further comprised for at least one of said user sites is further comprised of the step of:
  processing said received speech channels from said user site based upon natural language for said user site to create said speech content identified as to said user site.

14. A program system controlling at least part of a speech recognition system coupled to a wireline node in a network, said program system comprising the program steps of:

processing a multiplicity of received identified speech channels to create a multiplicity of identified speech content; and responding to said identified speech content to create an identified speech content response that is unique to each of said multiplicity of identified speech contents;

wherein said speech recognition system is provided said multiplicity of received identified speech channels based upon a received back channel at said wireline node from a multiplicity of user sites coupled to said network;

wherein each of said program steps reside in memory accessibly coupled to at least one computer included in said speech recognition system;

wherein said at least one computer communicatively couples through said wireline node to said multiplicity of user sites; and wherein said network supports at least one of the collection comprising: cable television delivery to said multiplicity of user sites; and video delivery to said multiplicity of user sites.

15. The program system of claim 14, wherein at least one of said identified speech channels has an associated user site; and wherein the program step processing said multiplicity of said received identified speech channels is further comprised of the program step of:

processing said multiplicity of said received identified speech channels from said associated user site to create a multiplicity of said identified speech content; and wherein the program step responding to said identified speech content is further comprised of the program step of:

responding to said identified speech content from said associated user site to create said identified speech content response for said associated user site.

16. The program system of claim 15, further comprising at least one member of the collection containing the program steps of:

determining said associated user site from said received identified speech channel;

determining said associated user site from said identified speech content;

determining said associated user site from said identified speech content and a speaker identification library;

determining said associated user site from said identified speech content and a speech recognition library; and determining said associated user site from an identification within said speech channel.

17. The program system of claim 15, wherein the program step responding to said identified speech content from said associated user site is comprised of the program steps of:

processing said identified speech content response to create said identified user site response; and sending said identified user site response to said identified user site.

18. The program system of claim 15, wherein the program step responding to said identified speech content from said associated user site is comprised of the program steps of:

assessing said speech content response identified as to said user site to create a financial consequence identified as to said user site; and billing said user site based upon said financial consequence.

19. The program system of claim 15, wherein the program step responding to said identified speech content from said associated user site is comprised of the program steps of:

assessing said speech response to create a financial consequence identified as to said user site;

displaying said financial consequence to create a displayed financial consequence at said user site;

confirming said displayed financial consequence from said user site to create a financial commitment; and billing said user site based upon said financial commitment.

20. The program system of claim 19, wherein the program step responding to said identified speech contents from said associated user site is comprised of the program steps of:

identifying a user based upon said speech content identified as to said user site to create an identified user.

21. The program system of claim 20, wherein the program step identifying said user is comprised of the program steps of:

fetching a user profile list based upon said user site, said user profile list containing at least one user profile;

identifying said user based upon said speech content and based upon said user profile list to create an identified user.

22. The program system of claim 21, wherein the program step assessing said speech response is further comprised of the program step of:

assessing said speech response based upon said identified user to create a financial consequence for said identified user.

23. The program system of claim 15, wherein said speech content response is comprised of a current response menu and a cumulative user site response identified as to said user site for at least one of said user sites.

24. The program system of claim 23, wherein the program step responding to said identified speech contents from said associated user site is further comprised of at least one member of the collection comprising the program steps of:

responding to said speech contents based upon said current response menu and based upon said cumulative user site response to create a new cumulative user site response; and assessing said speech contents based upon said current response menu and based upon said cumulative user site response to create a new current response menu.

25. The program system of claim 15, wherein the program step responding to said identified speech content from said associated user site is comprised, for at least one of said user sites, of the program step of:

responding to said speech content identified as to said user site based upon natural language to create a speech content response of said speech contents identified as to said user site.

26. The program system of claim 15,
wherein the program step processing said multiplicity of said received speech channels is further comprised, for at least one of said user sites, of the program step of:
processing said received speech channels from said user site based upon natural language for said user site to create said speech content identified as to said user site.

27. A system supporting speech recognition in a network, said system comprising:
a speech recognition system coupled to a wireline node in said network for receiving a back channel from a multiplicity of user sites coupled to said network, further comprising
a back channel receiver, for receiving said back channel to create a received back channel;
a speech channel partitioner, for partitioning said received back channel into a multiplicity of received identified speech channels; and
a processor network executing a program system comprised of program steps residing in memory accessibly coupled to at least one computer in said processor network;
wherein said program system is comprised of the program steps of:
processing said multiplicity of said received identified speech channels to create a multiplicity of identified speech content;
responding to said identified speech content to create an identified speech content response, for each of said multiplicity of said identified speech contents; and
wherein said network supports at least one of the collection comprising: cable television delivery to said multiplicity of user sites; and video delivery to said multiplicity of user sites.

28. The system of claim 27,
wherein at least one of said identified speech channels has an associated user site; and
wherein partitioning said received back channel is further comprised of:
partitioning said received back channel into a multiplicity of said received identified speech channels from said associated user site;
wherein the program step processing said multiplicity of said received identified speech channels is further comprised of the program step of:
processing said multiplicity of said received identified speech channels from said associated user site to create a multiplicity of said identified speech content; and
wherein the program step responding to said identified speech content is further comprised of the program step of:
responding to said identified speech content from said associated user site to create said identified speech content response for said associated user site.

29. The system of claim 28,
wherein said program system is further comprised of at least one of the collection comprising the program steps of:
determining said associated user site from said received identified speech channel;
determining said associated user site from said identified speech content;
determining said associated user site from said identified speech content and a speaker identification library;
determining said associated user site from said identified speech content and a speech recognition library; and
determining said associated user site from an identification within said speech channel.

30. The system of claim 28,
wherein the program step responding to said identified speech contents from said associated user site is comprised of the program steps of:
processing said identified speech content response to create said identified user site response; and
sending said identified user site response to said identified user site.

31. The system of claim 28,
wherein the program step responding to said identified speech contents from said associated user site is comprised of the program steps of:
assessing said speech content response identified as to said user site to create a financial consequence identified as to said user site; and
billing said user site based upon said financial consequence.

32. The system of claim 28,
wherein the program step responding to said identified speech content from said associated user site is comprised of the program steps of:
assessing said speech response to create a financial consequence identified as to said user site;
displaying said financial consequence to create a displayed financial consequence at said user site;
confirming said displayed financial consequence from said user site to create a financial commitment; and
billing said user site based upon said financial commitment.

33. The system of claim 32,
wherein the program step responding to said identified speech content from said associated user site is comprised of the program steps of:
identifying a user based upon said speech content identified as to said user site to create an identified user.

34. The system of claim 33,
wherein the program step identifying said user is comprised of the program steps of:
fetching a user profile list based upon said user site, said user profile list containing at least one user profile;
identifying said user based upon said speech content and based upon said user profile list to create an identified user.

35. The system of claim 34,
wherein the program step assessing said speech response is further comprised of the program step of:
assessing said speech response based upon said identified user to create a financial consequence for said identified user.

36. The system of claim 28,
wherein said speech content response is comprised of a current response menu and a cumulative user site response identified as to said user site for at least one of said user sites.

37. The system of claim 36,
wherein the program step responding to said identified speech content from said associated user site is further comprised of at least one member of the collection comprising the program steps of:
    responding to said speech content based upon said current response menu and based upon said cumulative user site response to create a new cumulative user site response; and
    assessing said speech contents based upon said current response menu and based upon said cumulative user site response to create a new current response menu.

38. The system of claim 28,
wherein the program step responding to said identified speech content from said associated user site is comprised, for at least one of said user sites, of the program step of:
    responding to said speech content identified as to said user site based upon natural language to create a speech content response of said speech contents identified as to said user site.

39. The system of claim 28,
wherein the program step processing said multiplicity of said received speech channels is further comprised, for at least one of said user sites, of the program step of:
    processing said received speech channels from said user site based upon natural language for said user site to create said speech content identified as to said user site.

40. The system of claim 28,
wherein said network includes a wired residential broadband network servicing at least part of said multiplicity of user sites.

41. The system of claim 40,
wherein said wired residential broadband network is a fiber-to-the-curb residential broadband network.

42. The system of claim 40,
wherein said wired residential broadband network is a fiber-to-the-home residential broadband network.

43. The system of claim 40,
wherein said wired residential broadband network is a switched-digital-video residential broadband network.

44. The system of claim 40,
wherein said wireline node is located proximate to a node in said wired residential broadband network.

45. The system of claim 40,
wherein said wireline node is located proximate to a Headend in said wired residential broadband network.

46. The system of claim 40,
wherein said wireline node is located proximate to a central office in said wired residential broadband network.

47. The system of claim 27,
wherein said speech recognition system further comprises a two-dimensional plex communication network communicatively coupled with a two-dimensional array of plex-nodes.

48. The system of claim 47,
wherein at least one of said plex-nodes is comprised of at least one computer communicatively coupled through said two-dimensional plex communication network to at least one of said multiplicity of user sites;
wherein said computer executes at least one of said program steps residing in memory accessibly coupled to said computer.

49. The system of claim 47,
wherein said back channel receiver is implemented in a first of said plex-nodes.

50. The system of claim 47,
wherein said speech channel partitioner is implemented in a second of said plex-nodes.

51. The system of claim 47,
wherein said two-dimensional communicatively coupled plex-node array and plex communications network contains said processor network.

52. The system of claim 47,
wherein said processor network contains said two-dimensional communicatively coupled plex-node array and plex communications network.

53. A method of operating at least part of a speech recognition system coupled to a wireline node in a network, comprising the steps of:
    processing a multiplicity of received identified speech channels to create a multiplicity of identified speech content; and
    responding to said identified speech content to create an identified speech content response that is unique to each of said multiplicity of identified speech contents;
wherein said speech recognition system is provided said multiplicity of received identified speech channels based upon a received back channel at said wireline node from a multiplicity of user sites coupled to said network;
wherein said network supports at least one of the collection comprising: cable television delivery to said multiplicity of user sites; and video delivery to said multiplicity of user sites.

54. The method of claim 53,
wherein at least one of said identified speech channels has an associated user site; and
wherein the step processing said multiplicity of said received identified speech channels is further comprised of the step of:
    processing said multiplicity of said received identified speech channels from said associated user site to create a multiplicity of said identified speech content; and
    wherein the step responding to said identified speech content is further comprised of the step of:
        responding to said identified speech content from said associated user site to create said identified speech content response for said associated user site.

55. The method of claim 54,
wherein the step responding to said identified speech content from said associated user site is comprised of the steps of:
    assessing said speech response to create a financial consequence identified as to said user site;
    displaying said financial consequence to create a displayed financial consequence at said user site;
    confirming said displayed financial consequence from said user site to create a financial commitment; and
    billing said user site based upon said financial commitment.

56. The method of claim 55,
wherein the step responding to said identified speech contents from said associated user site is comprised of the steps of:
    identifying a user based upon said speech content identified as to said user site to create an identified user.

57. The method of claim 56,
wherein the step identifying said user is comprised of the steps of:

fetching a user profile list based upon said user site, said user profile list containing at least one user profile;

identifying said user based upon said speech content and based upon said user profile list to create an identified user.

58. The method of claim 57, wherein the step assessing said speech response is further comprised of the step of:

assessing said speech response based upon said identified user to create a financial consequence for said identified user.

59. The method of claim 54, wherein said speech content response is comprised of a current response menu and a cumulative user site response identified as to said user site for at least one of said user sites.

60. The method of claim 59, wherein the step responding to said identified speech contents from said associated user site is further comprised of at least one member of the collection comprising the steps of:

responding to said speech contents based upon said current response menu and based upon said cumulative user site response to create a new cumulative user site response; and assessing said speech contents based upon said current response menu and based upon said cumulative user site response to create a new current response menu.

61. The method of claim 54, wherein the step responding to said identified speech content from said associated user site is comprised, for at least one of said user sites, of the step of:

responding to said speech content identified as to said user site based upon natural language to create a speech content response of said speech contents identified as to said user site.

62. The method of claim 54, wherein the step processing said multiplicity of said received speech channels is further comprised, for at least one of said user sites, of the step of:

processing said received speech channel from said user site based upon natural language for said user site to create said speech content identified as to said user site.

63. The method of claim 54, further comprising at least one member of the collection containing the steps of:

determining said associated user site from said received identified speech channel;

determining said associated user site from said identified speech content;

determining said associated user site from said identified speech content and a speaker identification library;

determining said associated user site from said identified speech content and a speech recognition library; and determining said associated user site from an identification within said speech channel.

64. The method of claim 54, wherein the step responding to said identified speech content from said associated user site is comprised of the steps of:

processing said identified speech content response to create said identified user site response; and sending said identified user site response to said identified user site.

65. The method of claim 54, wherein the step responding to said identified speech content from said associated user site is comprised of the steps of:

assessing said speech content response identified as to said user site to create a financial consequence identified as to said user site; and billing said user site based upon said financial consequence.

66. The method of claim 54, wherein each of said identified speech channels has an associated user site.

* * * * *